(12) United States Patent
Cote et al.

(10) Patent No.: US 9,213,161 B2
(45) Date of Patent: Dec. 15, 2015

(54) FIBER BODY HOLDER AND STRAIN RELIEF DEVICE

(71) Applicant: Corning Cable Systems LLC, Hickory, NC (US)

(72) Inventors: Monique Lise Cote, Ft. Worth, TX (US); Brent Michael Frazier, Haslet, TX (US); William Julius McPhil Giraud, Azle, TX (US); Raymond Glen Jay, Mansfield, TX (US); Brian Duane Kingsbury, Watauga, TX (US); Michael Heath Rasmussen, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 133 days.

(21) Appl. No.: 13/902,012

(22) Filed: May 24, 2013

(65) Prior Publication Data

US 2013/0266282 A1  Oct. 10, 2013

Related U.S. Application Data

(63) Continuation of application No. PCT/US2011/062353, filed on Nov. 29, 2011.

(60) Provisional application No. 61/418,106, filed on Nov. 30, 2010.

(51) Int. Cl.
*G02B 6/00* (2006.01)
*G02B 6/46* (2006.01)
(Continued)

(52) U.S. Cl.
CPC ............. *G02B 6/46* (2013.01); *G02B 6/4452* (2013.01); *G02B 6/4453* (2013.01); *G02B 6/3897* (2013.01)

(58) Field of Classification Search
CPC ........................ G02B 6/4471; G02B 6/4454
See application file for complete search history.

(56) References Cited

U.S. PATENT DOCUMENTS 620,013 A    2/1899   Barnes
2,528,910 A  11/1950  Poe
(Continued)

FOREIGN PATENT DOCUMENTS

AU    2010270959 A1   2/2012
CA       2029592 A1   5/1992
(Continued)

OTHER PUBLICATIONS

Unknown, Author, "QuickNet SFQ Series MTP Fiber Optic Cassettes," Panduit Specification Sheet, Jan. 2009, 2 pages.
(Continued)

*Primary Examiner* — Sung Pak

(57) ABSTRACT

A fiber optic apparatus including a retainer assembly having at least one retainer configured to toollessly, releasably retain a fiber body and or one or more optical fibers is disclosed. An attachment feature may toollessly, removably attach the retainer assembly to a mounting surface. The at least one retainer is configured to releasably retain the fiber body via mounting bosses on the fiber body. A stacking feature may be configured to removably attach a second retainer assembly to the retainer assembly. The at least one retainer may be configured to releasably retain the one or more optical fibers to strain relief the one of more optical fibers. The mounting surface may be fiber optic equipment. The fiber optic equipment may be a shelf mounted to a chassis in a fiber optic equipment rack.

31 Claims, 24 Drawing Sheets

(51) Int. Cl.
*G02B 6/44* (2006.01)
*G02B 6/38* (2006.01)

(56) References Cited

U.S. PATENT DOCUMENTS

| | | |
|---|---|---|
| 2,614,685 A | 10/1952 | Miller |
| 3,081,717 A | 3/1963 | Yurevich |
| 3,175,873 A | 3/1965 | Blomquist et al. |
| 3,212,192 A | 10/1965 | Bachmann et al. |
| 3,433,886 A | 3/1969 | Myers |
| 3,494,306 A | 2/1970 | Aguilar |
| 3,545,712 A | 12/1970 | Ellis |
| 3,568,263 A | 3/1971 | Meehan |
| 3,646,244 A | 2/1972 | Cole |
| 3,664,514 A | 5/1972 | Drake |
| 3,683,238 A | 8/1972 | Olds et al. |
| 3,701,835 A | 10/1972 | Eisele et al. |
| 3,880,396 A | 4/1975 | Freiberger et al. |
| 3,906,592 A | 9/1975 | Sakasegawa et al. |
| 3,991,960 A | 11/1976 | Tanaka |
| 4,047,797 A | 9/1977 | Arnold et al. |
| 4,059,872 A | 11/1977 | Delesandri |
| 4,119,285 A | 10/1978 | Bisping et al. |
| 4,148,454 A | 4/1979 | Carlson et al. |
| 4,239,316 A | 12/1980 | Spaulding |
| 4,244,638 A | 1/1981 | Little et al. |
| 4,285,486 A | 8/1981 | Von Osten et al. |
| 4,303,296 A | 12/1981 | Spaulding |
| 4,354,731 A | 10/1982 | Mouissie |
| 4,457,482 A | 7/1984 | Kitagawa |
| 4,525,012 A | 6/1985 | Dunner |
| 4,540,222 A | 9/1985 | Burrell |
| 4,561,615 A | 12/1985 | Medlin, Jr. |
| 4,564,163 A | 1/1986 | Barnett |
| 4,597,173 A | 7/1986 | Chino et al. |
| 4,611,875 A | 9/1986 | Clarke et al. |
| 4,635,886 A | 1/1987 | Santucci et al. |
| 4,645,292 A | 2/1987 | Sammueller |
| 4,657,340 A | 4/1987 | Tanaka et al. |
| 4,681,288 A | 7/1987 | Nakamura |
| 4,702,551 A | 10/1987 | Coulombe |
| 4,711,518 A | 12/1987 | Shank et al. |
| 4,736,100 A | 4/1988 | Vastagh |
| 4,744,629 A | 5/1988 | Bertoglio et al. |
| 4,747,020 A | 5/1988 | Brickley et al. |
| 4,752,110 A | 6/1988 | Blanchet et al. |
| 4,753,510 A | 6/1988 | Sezerman |
| 4,787,706 A | 11/1988 | Cannon, Jr. et al. |
| 4,792,203 A | 12/1988 | Nelson et al. |
| 4,798,432 A | 1/1989 | Becker et al. |
| 4,805,979 A | 2/1989 | Bossard et al. |
| 4,808,774 A | 2/1989 | Crane |
| 4,824,193 A | 4/1989 | Maeda et al. |
| 4,824,196 A | 4/1989 | Bylander |
| 4,826,277 A | 5/1989 | Weber et al. |
| 4,838,643 A | 6/1989 | Hodges et al. |
| 4,840,449 A | 6/1989 | Ghandeharizadeh |
| 4,865,280 A | 9/1989 | Wollar |
| 4,898,448 A | 2/1990 | Cooper |
| 4,900,123 A | 2/1990 | Barlow |
| 4,911,662 A | 3/1990 | Debortoli et al. |
| 4,913,514 A | 4/1990 | Then |
| 4,948,220 A | 8/1990 | Violo et al. |
| 4,949,376 A | 8/1990 | Nieves et al. |
| 4,971,421 A | 11/1990 | Ori |
| 4,986,625 A | 1/1991 | Yamada et al. |
| 4,988,831 A | 1/1991 | Wilson et al. |
| 4,991,928 A | 2/1991 | Zimmer |
| 4,995,688 A | 2/1991 | Anton et al. |
| 5,001,602 A | 3/1991 | Suffi et al. |
| 5,005,941 A | 4/1991 | Barlow et al. |
| 5,017,211 A | 5/1991 | Wenger et al. |
| 5,023,646 A | 6/1991 | Ishida et al. |
| 5,024,498 A | 6/1991 | Becker et al. |
| 5,028,114 A | 7/1991 | Krausse et al. |
| 5,037,175 A | 8/1991 | Weber |
| 5,048,918 A | 9/1991 | Daems et al. |
| 5,060,897 A | 10/1991 | Thalenfeld |
| 5,066,149 A | 11/1991 | Wheeler et al. |
| 5,067,784 A | 11/1991 | Debortoli et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,080,459 A | 1/1992 | Wettengel et al. |
| 5,100,221 A | 3/1992 | Carney et al. |
| 5,104,336 A | 4/1992 | Hatanaka et al. |
| 5,125,060 A | 6/1992 | Edmundson |
| 5,127,082 A | 6/1992 | Below et al. |
| 5,127,851 A | 7/1992 | Hilbert et al. |
| 5,129,030 A | 7/1992 | Petrunia |
| 5,129,607 A | 7/1992 | Satoh |
| 5,133,039 A | 7/1992 | Dixit |
| 5,138,678 A | 8/1992 | Briggs et al. |
| 5,138,688 A | 8/1992 | Debortoli |
| 5,142,598 A | 8/1992 | Tabone |
| 5,142,607 A | 8/1992 | Petrotta et al. |
| 5,150,277 A | 9/1992 | Bainbridge et al. |
| D330,368 S | 10/1992 | Bourgeois et al. |
| 5,152,760 A | 10/1992 | Latina |
| 5,153,910 A | 10/1992 | Mickelson et al. |
| 5,157,749 A | 10/1992 | Briggs et al. |
| 5,167,001 A | 11/1992 | Debortoli et al. |
| 5,170,452 A | 12/1992 | Ott |
| 5,189,723 A | 2/1993 | Johnson et al. |
| 5,199,099 A | 3/1993 | Dalgoutte |
| 5,204,929 A | 4/1993 | Machall et al. |
| 5,209,572 A | 5/1993 | Jordan |
| 5,214,735 A | 5/1993 | Henneberger et al. |
| 5,224,186 A | 6/1993 | Kishimoto et al. |
| 5,230,492 A | 7/1993 | Zwart et al. |
| 5,231,687 A | 7/1993 | Handley |
| 5,231,688 A | 7/1993 | Zimmer |
| 5,233,674 A | 8/1993 | Vladic |
| 5,239,609 A | 8/1993 | Auteri |
| 5,243,679 A | 9/1993 | Sharrow et al. |
| 5,253,320 A | 10/1993 | Takahashi et al. |
| 5,260,957 A | 11/1993 | Hakimi et al. |
| 5,261,633 A | 11/1993 | Mastro |
| 5,265,187 A | 11/1993 | Morin et al. |
| 5,274,729 A | 12/1993 | King et al. |
| 5,274,731 A | 12/1993 | White |
| 5,278,933 A | 1/1994 | Hunsinger et al. |
| 5,280,138 A | 1/1994 | Preston et al. |
| 5,285,515 A | 2/1994 | Milanowski et al. |
| 5,291,570 A | 3/1994 | Filgas et al. |
| 5,315,679 A | 5/1994 | Baldwin et al. |
| 5,317,663 A | 5/1994 | Beard et al. |
| 5,323,478 A | 6/1994 | Milanowski et al. |
| 5,323,480 A | 6/1994 | Mullaney et al. |
| 5,329,520 A | 7/1994 | Richardson |
| 5,333,193 A | 7/1994 | Cote et al. |
| 5,333,221 A | 7/1994 | Briggs et al. |
| 5,333,222 A | 7/1994 | Belenkiy et al. |
| 5,337,400 A | 8/1994 | Morin et al. |
| 5,339,379 A | 8/1994 | Kutsch et al. |
| 5,347,603 A | 9/1994 | Belenkiy et al. |
| 5,353,367 A | 10/1994 | Czosnowski et al. |
| 5,359,688 A | 10/1994 | Underwood |
| 5,363,466 A | 11/1994 | Milanowski et al. |
| 5,363,467 A | 11/1994 | Keith |
| 5,366,388 A | 11/1994 | Freeman et al. |
| 5,367,598 A | 11/1994 | Devenish, III et al. |
| 5,373,421 A | 12/1994 | Detsikas et al. |
| 5,383,051 A | 1/1995 | Delrosso et al. |
| 5,390,272 A | 2/1995 | Repta et al. |
| 5,398,295 A | 3/1995 | Chang et al. |
| 5,398,820 A | 3/1995 | Kiss |
| 5,399,814 A | 3/1995 | Staber et al. |
| 5,401,193 A | 3/1995 | Lo Cicero et al. |
| 5,402,515 A | 3/1995 | Vidacovich et al. |
| 5,408,557 A | 4/1995 | Hsu |
| RE34,955 E | 5/1995 | Anton et al. |

(56) References Cited

U.S. PATENT DOCUMENTS

| | | |
|---|---|---|
| 5,412,751 A | 5/1995 | Siemon et al. |
| 5,416,837 A | 5/1995 | Cote et al. |
| 5,418,874 A | 5/1995 | Carlisle et al. |
| 5,420,956 A | 5/1995 | Grugel et al. |
| 5,420,958 A | 5/1995 | Henson et al. |
| 5,421,532 A | 6/1995 | Richter |
| 5,438,641 A | 8/1995 | Malacarne |
| 5,442,725 A | 8/1995 | Peng |
| 5,442,726 A | 8/1995 | Howard et al. |
| 5,443,232 A | 8/1995 | Kesinger et al. |
| 5,444,804 A | 8/1995 | Yui et al. |
| 5,448,015 A | 9/1995 | Jamet et al. |
| 5,450,518 A | 9/1995 | Burek et al. |
| 5,458,019 A | 10/1995 | Trevino |
| 5,471,555 A | 11/1995 | Braga et al. |
| 5,479,505 A | 12/1995 | Butler et al. |
| 5,481,634 A | 1/1996 | Anderson et al. |
| 5,481,939 A | 1/1996 | Bernardini |
| 5,490,229 A | 2/1996 | Ghandeharizadeh et al. |
| 5,495,549 A | 2/1996 | Schneider et al. |
| 5,497,416 A | 3/1996 | Butler, III et al. |
| 5,497,444 A | 3/1996 | Wheeler |
| 5,511,144 A | 4/1996 | Hawkins et al. |
| 5,511,798 A | 4/1996 | Kawamoto et al. |
| 5,519,804 A | 5/1996 | Burek et al. |
| 5,530,786 A | 6/1996 | Radliff et al. |
| 5,535,970 A | 7/1996 | Gobbi |
| 5,538,213 A | 7/1996 | Brown |
| 5,542,015 A | 7/1996 | Hultermans |
| 5,546,495 A | 8/1996 | Bruckner et al. |
| 5,548,641 A | 8/1996 | Butler et al. |
| 5,553,183 A | 9/1996 | Bechamps |
| 5,553,186 A | 9/1996 | Allen |
| 5,563,971 A | 10/1996 | Abendschein |
| 5,572,617 A | 11/1996 | Bernhardt et al. |
| 5,575,680 A | 11/1996 | Suffi |
| 5,577,151 A | 11/1996 | Hoffer |
| 5,590,234 A | 12/1996 | Pulido |
| 5,595,507 A | 1/1997 | Braun et al. |
| 5,596,670 A | 1/1997 | Debortoli et al. |
| 5,600,020 A | 2/1997 | Wehle et al. |
| 5,602,954 A | 2/1997 | Nolf et al. |
| 5,608,606 A | 3/1997 | Blaney |
| 5,613,030 A | 3/1997 | Hoffer et al. |
| 5,617,501 A | 4/1997 | Miller et al. |
| 5,638,474 A | 6/1997 | Lampert et al. |
| 5,640,476 A | 6/1997 | Womack et al. |
| 5,640,482 A | 6/1997 | Barry et al. |
| 5,647,043 A | 7/1997 | Anderson et al. |
| 5,647,045 A | 7/1997 | Robinson et al. |
| 5,650,334 A | 7/1997 | Zuk et al. |
| 5,668,910 A | 9/1997 | Arnett |
| 5,668,911 A | 9/1997 | Debortoli |
| 5,671,273 A | 9/1997 | Lanquist |
| 5,689,605 A | 11/1997 | Cobb et al. |
| 5,689,607 A | 11/1997 | Vincent et al. |
| 5,692,079 A | 11/1997 | Iso |
| 5,694,511 A | 12/1997 | Pimpinella et al. |
| 5,701,380 A | 12/1997 | Larson et al. |
| 5,704,573 A | 1/1998 | de Beers et al. |
| 5,708,742 A | 1/1998 | Beun et al. |
| 5,708,751 A | 1/1998 | Mattei |
| 5,710,851 A | 1/1998 | Walter et al. |
| 5,717,810 A | 2/1998 | Wheeler |
| 5,734,776 A | 3/1998 | Puetz |
| 5,740,300 A | 4/1998 | Hodge |
| 5,742,982 A | 4/1998 | Dodd et al. |
| 5,751,874 A | 5/1998 | Chudoba et al. |
| 5,751,882 A | 5/1998 | Daems et al. |
| 5,754,724 A | 5/1998 | Peterson et al. |
| 5,758,003 A | 5/1998 | Wheeler et al. |
| 5,758,004 A | 5/1998 | Alarcon et al. |
| 5,761,026 A | 6/1998 | Robinson et al. |
| 5,765,698 A | 6/1998 | Bullivant |
| 5,769,908 A | 6/1998 | Koppelman |
| 5,774,612 A | 6/1998 | Belenkiy et al. |
| 5,778,122 A | 7/1998 | Giebel et al. |
| 5,778,130 A | 7/1998 | Walters et al. |
| 5,781,686 A | 7/1998 | Robinson et al. |
| 5,788,087 A | 8/1998 | Orlando |
| 5,790,741 A | 8/1998 | Vincent et al. |
| 5,793,920 A | 8/1998 | Wilkins et al. |
| 5,793,921 A | 8/1998 | Wilkins et al. |
| 5,796,908 A | 8/1998 | Vicory |
| 5,806,687 A | 9/1998 | Ballesteros et al. |
| 5,823,646 A | 10/1998 | Arizpe et al. |
| 5,825,955 A | 10/1998 | Ernst et al. |
| 5,825,961 A | 10/1998 | Wilkins et al. |
| 5,828,807 A | 10/1998 | Tucker et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,870,519 A | 2/1999 | Jenkins et al. |
| 5,874,733 A | 2/1999 | Silver et al. |
| 5,877,565 A | 3/1999 | Hollenbach et al. |
| 5,880,864 A | 3/1999 | Williams et al. |
| 5,881,200 A | 3/1999 | Burt |
| 5,883,995 A | 3/1999 | Lu |
| 5,884,003 A | 3/1999 | Cloud et al. |
| 5,887,095 A | 3/1999 | Nagase et al. |
| 5,887,106 A | 3/1999 | Cheeseman et al. |
| 5,892,877 A | 4/1999 | Meyerhoefer |
| 5,894,540 A | 4/1999 | Drewing |
| 5,901,220 A | 5/1999 | Garver et al. |
| 5,903,693 A | 5/1999 | Brown |
| 5,906,342 A | 5/1999 | Kraus |
| 5,909,298 A | 6/1999 | Shimada et al. |
| 5,913,006 A | 6/1999 | Summach |
| 5,914,976 A | 6/1999 | Jayaraman et al. |
| 5,915,055 A | 6/1999 | Bennett et al. |
| 5,923,804 A | 7/1999 | Rosson |
| 5,930,425 A | 7/1999 | Abel et al. |
| 5,933,557 A | 8/1999 | Ott |
| 5,940,563 A | 8/1999 | Kobayashi et al. |
| 5,943,460 A | 8/1999 | Mead et al. |
| 5,945,633 A | 8/1999 | Ott et al. |
| 5,946,440 A | 8/1999 | Puetz |
| 5,949,946 A | 9/1999 | Debortoli et al. |
| 5,953,962 A | 9/1999 | Hewson |
| 5,956,439 A | 9/1999 | Pimpinella |
| 5,956,444 A | 9/1999 | Duda et al. |
| 5,956,449 A | 9/1999 | Otani et al. |
| 5,966,492 A | 10/1999 | Bechamps et al. |
| 5,969,294 A | 10/1999 | Eberle et al. |
| 5,975,769 A | 11/1999 | Larson et al. |
| 5,978,540 A | 11/1999 | Bechamps et al. |
| 5,980,303 A | 11/1999 | Lee et al. |
| 5,987,203 A | 11/1999 | Abel et al. |
| 5,993,071 A | 11/1999 | Hultermans |
| 5,995,700 A | 11/1999 | Burek et al. |
| 5,999,393 A | 12/1999 | Brower |
| 6,001,831 A | 12/1999 | Papenfuhs et al. |
| 6,009,224 A | 12/1999 | Allen |
| 6,009,225 A | 12/1999 | Ray et al. |
| 6,011,831 A | 1/2000 | Nieves et al. |
| 6,027,252 A | 2/2000 | Erdman et al. |
| 6,027,352 A | 2/2000 | Byrne |
| 6,041,042 A | 3/2000 | Bussiere |
| 6,044,193 A | 3/2000 | Szentesi et al. |
| 6,049,963 A | 4/2000 | Boe |
| 6,058,235 A | 5/2000 | Hiramatsu et al. |
| 6,061,492 A | 5/2000 | Strause et al. |
| 6,078,661 A | 6/2000 | Arnett et al. |
| 6,079,881 A | 6/2000 | Roth |
| 6,088,497 A | 7/2000 | Phillips et al. |
| 6,118,075 A * | 9/2000 | Baker et al. ............... 174/72 A |
| 6,118,868 A | 9/2000 | Daoud |
| 6,127,627 A | 10/2000 | Daoud |
| 6,130,983 A | 10/2000 | Cheng |
| 6,134,370 A | 10/2000 | Childers et al. |
| 6,141,222 A | 10/2000 | Toor et al. |
| 6,149,313 A | 11/2000 | Giebel et al. |
| 6,149,315 A | 11/2000 | Stephenson |

(56) References Cited

U.S. PATENT DOCUMENTS

| | | | |
|---|---|---|---|
| 6,151,432 A | 11/2000 | Nakajima et al. | |
| 6,160,946 A | 12/2000 | Thompson et al. | |
| 6,170,784 B1 | 1/2001 | MacDonald et al. | |
| 6,172,782 B1 | 1/2001 | Kobayashi | |
| 6,175,079 B1 | 1/2001 | Johnston et al. | |
| 6,181,861 B1 | 1/2001 | Wenski et al. | |
| 6,188,687 B1 | 2/2001 | Mussman et al. | |
| 6,188,825 B1 | 2/2001 | Bandy et al. | |
| 6,192,180 B1 | 2/2001 | Kim et al. | |
| 6,200,170 B1 | 3/2001 | Amberg et al. | |
| 6,201,919 B1 | 3/2001 | Puetz et al. | |
| 6,201,920 B1 | 3/2001 | Noble et al. | |
| 6,208,796 B1 | 3/2001 | Williams Vigliaturo | |
| 6,212,324 B1 | 4/2001 | Lin et al. | |
| 6,215,938 B1 | 4/2001 | Reitmeier et al. | |
| 6,216,987 B1 | 4/2001 | Fukuo | |
| 6,227,717 B1 | 5/2001 | Ott et al. | |
| 6,229,948 B1 | 5/2001 | Blee et al. | |
| 6,234,683 B1 | 5/2001 | Waldron et al. | |
| 6,234,685 B1 | 5/2001 | Carlisle et al. | |
| 6,236,795 B1 | 5/2001 | Rodgers | |
| 6,240,229 B1 | 5/2001 | Roth | |
| 6,243,522 B1 | 6/2001 | Allan et al. | |
| 6,245,998 B1 | 6/2001 | Curry et al. | |
| 6,247,851 B1 | 6/2001 | Ichihara | |
| 6,250,816 B1 | 6/2001 | Johnston et al. | |
| 6,259,850 B1 | 7/2001 | Crosby, Jr. et al. | |
| 6,263,141 B1 | 7/2001 | Smith | |
| 6,265,680 B1 | 7/2001 | Robertson | |
| 6,269,212 B1 | 7/2001 | Schiattone | |
| 6,273,532 B1 | 8/2001 | Chen et al. | |
| 6,275,641 B1 | 8/2001 | Daoud | |
| 6,278,829 B1 | 8/2001 | BuAbbud et al. | |
| 6,278,831 B1 | 8/2001 | Henderson et al. | |
| D448,005 S | 9/2001 | Klein, Jr. et al. | |
| 6,289,618 B1 | 9/2001 | Kump et al. | |
| 6,292,614 B1 | 9/2001 | Smith et al. | |
| 6,301,424 B1 | 10/2001 | Hwang | |
| 6,305,848 B1 | 10/2001 | Gregory | |
| 6,307,997 B1 | 10/2001 | Walters et al. | |
| 6,318,824 B1 | 11/2001 | LaGrotta et al. | |
| 6,321,017 B1 | 11/2001 | Janus et al. | |
| 6,322,279 B1 | 11/2001 | Yamamoto et al. | |
| 6,324,575 B1 | 11/2001 | Jain et al. | |
| 6,325,549 B1 | 12/2001 | Shevchuk | |
| 6,327,059 B1 | 12/2001 | Bhalla et al. | |
| RE37,489 E | 1/2002 | Anton et al. | |
| 6,343,313 B1 | 1/2002 | Salesky et al. | |
| 6,344,615 B1 | 2/2002 | Nolf et al. | |
| 6,347,888 B1 | 2/2002 | Puetz | |
| 6,353,696 B1 | 3/2002 | Gordon et al. | |
| 6,353,697 B1 * | 3/2002 | Daoud | 385/136 |
| 6,357,712 B1 | 3/2002 | Lu | |
| 6,359,228 B1 | 3/2002 | Strause et al. | |
| 6,363,198 B1 | 3/2002 | Braga et al. | |
| 6,363,200 B1 | 3/2002 | Thompson et al. | |
| 6,370,309 B1 | 4/2002 | Daoud | |
| 6,371,419 B1 | 4/2002 | Ohnuki | |
| 6,375,129 B2 | 4/2002 | Koziol | |
| 6,377,218 B1 | 4/2002 | Nelson et al. | |
| 6,379,052 B1 | 4/2002 | De Jong et al. | |
| 6,381,642 B1 | 4/2002 | O'Donnell et al. | |
| 6,385,374 B2 | 5/2002 | Kropp | |
| 6,385,381 B1 | 5/2002 | Janus et al. | |
| 6,389,214 B1 | 5/2002 | Smith et al. | |
| 6,392,140 B1 | 5/2002 | Yee et al. | |
| 6,397,166 B1 | 5/2002 | Leung et al. | |
| 6,398,149 B1 | 6/2002 | Hines et al. | |
| 6,406,314 B1 | 6/2002 | Byrne | |
| 6,410,850 B1 | 6/2002 | Abel et al. | |
| 6,411,767 B1 | 6/2002 | Burrous et al. | |
| 6,412,986 B1 | 7/2002 | Ngo et al. | |
| 6,418,262 B1 | 7/2002 | Puetz et al. | |
| 6,419,519 B1 | 7/2002 | Young | |
| 6,424,781 B1 | 7/2002 | Puetz et al. | |
| 6,425,694 B1 | 7/2002 | Szilagyi et al. | |
| 6,427,045 B1 | 7/2002 | Matthes et al. | |
| 6,431,762 B1 | 8/2002 | Taira et al. | |
| 6,434,313 B1 | 8/2002 | Clapp, Jr. et al. | |
| 6,438,310 B1 | 8/2002 | Lance et al. | |
| 6,452,925 B1 | 9/2002 | Sistanizadeh et al. | |
| 6,456,773 B1 | 9/2002 | Keys | |
| 6,464,402 B1 | 10/2002 | Andrews et al. | |
| 6,466,724 B1 | 10/2002 | Glover et al. | |
| 6,469,905 B1 | 10/2002 | Hwang | |
| D466,087 S | 11/2002 | Cuny et al. | |
| 6,478,472 B1 | 11/2002 | Anderson et al. | |
| 6,480,487 B1 | 11/2002 | Wegleitner et al. | |
| 6,480,660 B1 | 11/2002 | Reitmeier et al. | |
| 6,483,977 B2 | 11/2002 | Battey et al. | |
| 6,484,958 B1 | 11/2002 | Xue et al. | |
| 6,494,550 B1 | 12/2002 | Chen et al. | |
| 6,496,640 B1 | 12/2002 | Harvey et al. | |
| 6,504,988 B1 | 1/2003 | Trebesch et al. | |
| 6,507,980 B2 | 1/2003 | Bremicker | |
| 6,510,274 B1 | 1/2003 | Wu et al. | |
| 6,532,332 B2 | 3/2003 | Solheid et al. | |
| 6,533,472 B1 | 3/2003 | Dinh et al. | |
| 6,535,397 B2 | 3/2003 | Clark et al. | |
| 6,539,147 B1 | 3/2003 | Mahony | |
| 6,539,160 B2 | 3/2003 | Battey et al. | |
| 6,542,688 B1 | 4/2003 | Battey et al. | |
| 6,544,075 B1 | 4/2003 | Liao | |
| 6,550,977 B2 | 4/2003 | Hizuka | |
| 6,554,485 B1 | 4/2003 | Beatty et al. | |
| 6,560,334 B1 | 5/2003 | Mullaney et al. | |
| 6,567,601 B2 | 5/2003 | Daoud et al. | |
| 6,568,542 B1 | 5/2003 | Chen | |
| 6,571,048 B1 | 5/2003 | Bechamps et al. | |
| 6,577,595 B1 | 6/2003 | Counterman | |
| 6,577,801 B2 | 6/2003 | Broderick et al. | |
| 6,579,014 B2 | 6/2003 | Melton et al. | |
| 6,584,267 B1 | 6/2003 | Caveney et al. | |
| 6,585,423 B1 | 7/2003 | Vergeest | |
| 6,587,630 B2 | 7/2003 | Spence et al. | |
| 6,588,938 B1 | 7/2003 | Lampert et al. | |
| 6,591,051 B2 | 7/2003 | Solheid et al. | |
| 6,591,053 B2 | 7/2003 | Fritz | |
| 6,592,266 B1 | 7/2003 | Hankins et al. | |
| 6,597,670 B1 | 7/2003 | Tweedy et al. | |
| 6,600,106 B2 | 7/2003 | Standish et al. | |
| 6,600,866 B2 | 7/2003 | Gatica et al. | |
| 6,601,997 B2 | 8/2003 | Ngo | |
| 6,612,515 B1 | 9/2003 | Tinucci et al. | |
| 6,612,874 B1 | 9/2003 | Stout et al. | |
| 6,614,978 B1 | 9/2003 | Caveney | |
| 6,614,980 B1 | 9/2003 | Mahony | |
| 6,621,975 B2 | 9/2003 | Laporte et al. | |
| 6,622,873 B2 | 9/2003 | Hegrenes et al. | |
| 6,624,389 B1 | 9/2003 | Cox | |
| 6,625,374 B2 | 9/2003 | Holman et al. | |
| 6,625,375 B1 | 9/2003 | Mahony | |
| 6,631,237 B2 | 10/2003 | Knudsen et al. | |
| 6,640,042 B2 * | 10/2003 | Araki et al. | 385/137 |
| RE38,311 E | 11/2003 | Wheeler | |
| 6,644,863 B1 | 11/2003 | Azami et al. | |
| 6,647,197 B1 | 11/2003 | Marrs et al. | |
| 6,648,520 B2 | 11/2003 | McDonald et al. | |
| 6,654,536 B2 | 11/2003 | Battey et al. | |
| 6,668,127 B1 | 12/2003 | Mahony | |
| 6,669,149 B2 | 12/2003 | Akizuki | |
| 6,677,520 B1 | 1/2004 | Kim et al. | |
| 6,679,604 B1 | 1/2004 | Bove et al. | |
| 6,687,450 B1 | 2/2004 | Kempeneers et al. | |
| 6,693,552 B1 | 2/2004 | Herzig et al. | |
| 6,695,620 B1 | 2/2004 | Huang | |
| 6,701,056 B1 | 3/2004 | Burek et al. | |
| 6,710,366 B1 | 3/2004 | Lee et al. | |
| 6,715,619 B2 | 4/2004 | Kim et al. | |
| 6,719,149 B2 | 4/2004 | Tomino | |
| 6,721,482 B1 | 4/2004 | Glynn | |
| 6,728,462 B2 | 4/2004 | Wu et al. | |
| 6,741,784 B1 | 5/2004 | Guan | |
| 6,741,785 B2 | 5/2004 | Barthel et al. | |

(56) References Cited

U.S. PATENT DOCUMENTS

| | | | |
|---|---|---|---|
| 6,746,037 B1 | 6/2004 | Kaplenski et al. |
| 6,748,154 B2 | 6/2004 | O'Leary et al. |
| 6,748,155 B2 | 6/2004 | Kim et al. |
| 6,758,600 B2 | 7/2004 | Del Grosso et al. |
| 6,768,860 B2 | 7/2004 | Liberty |
| 6,771,861 B2 | 8/2004 | Wagner et al. |
| 6,773,297 B2 | 8/2004 | Komiya |
| 6,778,525 B1 | 8/2004 | Baum et al. |
| 6,778,752 B2 | 8/2004 | Laporte et al. |
| 6,786,647 B1 | 9/2004 | Hinds et al. |
| 6,786,743 B2 | 9/2004 | Huang |
| 6,786,896 B1 | 9/2004 | Madhani et al. |
| 6,788,871 B2 | 9/2004 | Taylor |
| 6,792,190 B2 | 9/2004 | Xin et al. |
| 6,792,191 B1 | 9/2004 | Clapp, Jr. et al. |
| 6,798,751 B1 | 9/2004 | Voit et al. |
| 6,804,447 B2 | 10/2004 | Smith et al. |
| 6,810,194 B2 | 10/2004 | Griffiths et al. |
| 6,813,412 B2 | 11/2004 | Lin |
| 6,816,660 B2 | 11/2004 | Nashimoto |
| 6,818,834 B1 | 11/2004 | Lin |
| 6,819,856 B2 | 11/2004 | Dagley et al. |
| 6,819,857 B2 | 11/2004 | Douglas et al. |
| 6,822,874 B1 | 11/2004 | Marler |
| 6,826,174 B1 | 11/2004 | Erekson et al. |
| 6,826,346 B2 | 11/2004 | Sloan et al. |
| 6,826,631 B2 | 11/2004 | Webb |
| 6,830,489 B2 | 12/2004 | Aoyama |
| 6,839,428 B2 | 1/2005 | Brower et al. |
| 6,839,438 B1 | 1/2005 | Riegelsberger et al. |
| 6,840,815 B2 | 1/2005 | Musolf et al. |
| 6,845,207 B2 | 1/2005 | Schray |
| 6,847,614 B2 | 1/2005 | Banker et al. |
| 6,848,862 B1 | 2/2005 | Schlig |
| 6,850,685 B2 | 2/2005 | Tinucci et al. |
| 6,853,637 B1 | 2/2005 | Norrell et al. |
| 6,854,894 B1 | 2/2005 | Yunker et al. |
| 6,856,334 B1 | 2/2005 | Fukui |
| 6,856,505 B1 | 2/2005 | Venegas et al. |
| 6,863,444 B2 | 3/2005 | Anderson et al. |
| 6,865,331 B2 | 3/2005 | Mertesdorf |
| 6,865,334 B2 | 3/2005 | Cooke et al. |
| 6,866,541 B2 | 3/2005 | Barker et al. |
| 6,868,216 B1 | 3/2005 | Gehrke |
| 6,869,227 B2 | 3/2005 | Del Grosso et al. |
| 6,870,734 B2 | 3/2005 | Mertesdorf et al. |
| 6,870,997 B2 | 3/2005 | Cooke |
| 6,879,545 B2 | 4/2005 | Cooke et al. |
| 6,915,058 B2 | 7/2005 | Pons |
| 6,920,273 B2 | 7/2005 | Knudsen |
| 6,920,274 B2 | 7/2005 | Rapp et al. |
| 6,923,406 B2 | 8/2005 | Akizuki |
| 6,925,241 B2 | 8/2005 | Bohle et al. |
| 6,934,451 B2 | 8/2005 | Cooke et al. |
| 6,934,456 B2 | 8/2005 | Ferris et al. |
| 6,935,598 B2 | 8/2005 | Sono et al. |
| 6,937,807 B2 | 8/2005 | Franklin et al. |
| 6,944,383 B1 | 9/2005 | Herzog et al. |
| 6,944,389 B2 | 9/2005 | Giraud et al. |
| 6,945,701 B2 | 9/2005 | Trezza et al. |
| 6,952,530 B2 | 10/2005 | Helvajian et al. |
| 6,963,690 B1 | 11/2005 | Kassal et al. |
| 6,968,107 B2 | 11/2005 | Belardi et al. |
| 6,968,111 B2 | 11/2005 | Trebesch et al. |
| 6,985,665 B2 | 1/2006 | Baechtle |
| 6,993,237 B2 | 1/2006 | Cooke et al. |
| 7,000,784 B2 * | 2/2006 | Canty et al. ............ 211/26 |
| 7,005,582 B2 | 2/2006 | Muller et al. |
| 7,006,748 B2 | 2/2006 | Dagley et al. |
| 7,007,296 B2 | 2/2006 | Rakib |
| 7,025,275 B2 | 4/2006 | Huang et al. |
| 7,027,695 B2 | 4/2006 | Cooke et al. |
| 7,027,706 B2 | 4/2006 | Diaz et al. |
| 7,031,588 B2 | 4/2006 | Cowley et al. |
| 7,035,510 B2 | 4/2006 | Zimmel et al. |
| 7,038,137 B2 | 5/2006 | Grubish et al. |
| 7,048,447 B1 | 5/2006 | Patel et al. |
| 7,054,513 B2 | 5/2006 | Herz et al. |
| 7,066,748 B2 | 6/2006 | Bricaud et al. |
| 7,068,907 B2 | 6/2006 | Schray |
| 7,070,459 B2 | 7/2006 | Denovich et al. |
| 7,077,710 B2 | 7/2006 | Haggay et al. |
| 7,079,744 B2 | 7/2006 | Douglas et al. |
| 7,090,406 B2 | 8/2006 | Melton et al. |
| 7,090,407 B2 | 8/2006 | Melton et al. |
| 7,094,095 B1 | 8/2006 | Caveney |
| 7,097,047 B2 | 8/2006 | Lee et al. |
| 7,101,093 B2 | 9/2006 | Hsiao et al. |
| 7,102,884 B2 | 9/2006 | Mertesdorf et al. |
| 7,103,255 B2 | 9/2006 | Reagan et al. |
| 7,110,654 B2 | 9/2006 | Dillat |
| 7,111,990 B2 | 9/2006 | Melton et al. |
| 7,113,679 B2 | 9/2006 | Melton et al. |
| 7,113,686 B2 | 9/2006 | Bellekens et al. |
| 7,113,687 B2 | 9/2006 | Womack et al. |
| 7,116,491 B1 | 10/2006 | Willey et al. |
| 7,116,883 B2 | 10/2006 | Kline et al. |
| 7,118,281 B2 | 10/2006 | Chiu et al. |
| 7,118,405 B2 | 10/2006 | Peng |
| 7,120,347 B2 | 10/2006 | Blackwell, Jr. et al. |
| 7,120,348 B2 | 10/2006 | Trebesch et al. |
| 7,120,349 B2 | 10/2006 | Elliott |
| 7,127,143 B2 | 10/2006 | Elkins, II et al. |
| 7,128,471 B2 | 10/2006 | Wilson |
| 7,136,555 B2 | 11/2006 | Theuerkorn et al. |
| 7,139,462 B1 | 11/2006 | Richtman |
| 7,140,903 B2 | 11/2006 | Pulizzi et al. |
| 7,147,383 B2 | 12/2006 | Sullivan |
| 7,170,466 B2 | 1/2007 | Janoschka |
| 7,171,099 B2 | 1/2007 | Barnes et al. |
| 7,171,121 B1 | 1/2007 | Skarica et al. |
| 7,181,142 B1 | 2/2007 | Xu et al. |
| 7,186,134 B2 | 3/2007 | Togami et al. |
| 7,193,783 B2 | 3/2007 | Willey et al. |
| 7,194,181 B2 | 3/2007 | Holmberg et al. |
| 7,195,521 B2 | 3/2007 | Musolf et al. |
| 7,200,314 B2 | 4/2007 | Womack et al. |
| 7,200,316 B2 | 4/2007 | Giraud et al. |
| 7,201,595 B1 | 4/2007 | Morello |
| 7,217,040 B2 | 5/2007 | Crews et al. |
| 7,218,526 B2 | 5/2007 | Mayer |
| 7,220,065 B2 | 5/2007 | Han et al. |
| 7,221,832 B2 | 5/2007 | Tinucci |
| 7,228,036 B2 | 6/2007 | Elkins, II et al. |
| 7,228,047 B1 | 6/2007 | Szilagyi et al. |
| 7,231,125 B2 | 6/2007 | Douglas et al. |
| 7,234,878 B2 | 6/2007 | Yamauchi et al. |
| 7,236,677 B2 | 6/2007 | Escoto et al. |
| 7,239,789 B2 | 7/2007 | Grubish et al. |
| 7,245,809 B1 | 7/2007 | Gniadek et al. |
| 7,259,325 B2 | 8/2007 | Pincu et al. |
| 7,266,283 B2 | 9/2007 | Kline et al. |
| 7,270,485 B1 | 9/2007 | Robinson et al. |
| 7,272,291 B2 | 9/2007 | Bayazit et al. |
| 7,274,852 B1 | 9/2007 | Smrha et al. |
| 7,284,785 B2 | 10/2007 | Gotou et al. |
| 7,287,913 B2 | 10/2007 | Keenum et al. |
| 7,289,731 B2 | 10/2007 | Thinguldstad |
| 7,292,769 B2 | 11/2007 | Watanabe et al. |
| 7,298,950 B2 | 11/2007 | Frohlich |
| 7,300,216 B2 | 11/2007 | Morse et al. |
| 7,300,308 B2 | 11/2007 | Laursen et al. |
| 7,302,149 B2 | 11/2007 | Swam et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,310,471 B2 | 12/2007 | Bayazit et al. |
| 7,310,472 B2 | 12/2007 | Haberman |
| 7,315,681 B2 | 1/2008 | Kewitsch |
| 7,325,975 B2 | 2/2008 | Yamada et al. |
| 7,330,624 B2 | 2/2008 | Isenhour et al. |
| 7,330,625 B2 | 2/2008 | Barth |
| 7,330,626 B2 | 2/2008 | Kowalczyk et al. |
| 7,330,629 B2 | 2/2008 | Cooke et al. |

(56) References Cited

U.S. PATENT DOCUMENTS

| | | |
|---|---|---|
| 7,331,718 B2 | 2/2008 | Yazaki et al. |
| 7,340,145 B2 | 3/2008 | Allen |
| 7,349,615 B2 | 3/2008 | Frazier et al. |
| 7,352,946 B2 | 4/2008 | Heller et al. |
| 7,352,947 B2 | 4/2008 | Phung et al. |
| 7,373,071 B2 | 5/2008 | Douglas et al. |
| 7,376,321 B2 | 5/2008 | Bolster et al. |
| 7,376,323 B2 | 5/2008 | Zimmel |
| 7,391,952 B1 | 6/2008 | Ugolini et al. |
| 7,397,996 B2 | 7/2008 | Herzog et al. |
| 7,400,813 B2 | 7/2008 | Zimmel |
| 7,404,736 B2 | 7/2008 | Herbst et al. |
| 7,409,137 B2 | 8/2008 | Barnes |
| 7,414,198 B2 | 8/2008 | Stansbie et al. |
| 7,417,188 B2 | 8/2008 | McNutt et al. |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,428,363 B2 | 9/2008 | Leon et al. |
| 7,435,090 B1 | 10/2008 | Schriefer et al. |
| 7,437,049 B2 | 10/2008 | Krampotich |
| 7,439,453 B2 | 10/2008 | Murano et al. |
| 7,454,113 B2 | 11/2008 | Barnes |
| 7,460,757 B2 | 12/2008 | Hoehne et al. |
| 7,460,758 B2 | 12/2008 | Xin |
| 7,461,981 B2 | 12/2008 | Yow, Jr. et al. |
| 7,462,779 B2 | 12/2008 | Caveney et al. |
| 7,463,810 B2 | 12/2008 | Bayazit et al. |
| 7,463,811 B2 | 12/2008 | Trebesch et al. |
| 7,469,090 B2 | 12/2008 | Ferris et al. |
| 7,471,867 B2 | 12/2008 | Vogel et al. |
| 7,474,828 B2 | 1/2009 | Leon et al. |
| 7,477,824 B2 | 1/2009 | Reagan et al. |
| 7,477,826 B2 | 1/2009 | Mullaney et al. |
| 7,480,438 B2 | 1/2009 | Douglas et al. |
| 7,488,205 B2 | 2/2009 | Spisany et al. |
| 7,493,002 B2 | 2/2009 | Coburn et al. |
| 7,496,269 B1 | 2/2009 | Lee |
| 7,499,622 B2 | 3/2009 | Castonguay et al. |
| 7,499,623 B2 | 3/2009 | Barnes et al. |
| 7,507,111 B2 | 3/2009 | Togami et al. |
| 7,509,015 B2 | 3/2009 | Murano |
| 7,509,016 B2 | 3/2009 | Smith et al. |
| 7,510,421 B2 | 3/2009 | Fransen et al. |
| 7,522,804 B2 | 4/2009 | Araki et al. |
| 7,523,898 B1 | 4/2009 | Barry et al. |
| 7,526,171 B2 | 4/2009 | Caveney et al. |
| 7,526,172 B2 | 4/2009 | Gniadek et al. |
| 7,526,174 B2 | 4/2009 | Leon et al. |
| 7,529,458 B2 | 5/2009 | Spisany et al. |
| 7,534,958 B2 | 5/2009 | McNutt et al. |
| 7,536,075 B2 | 5/2009 | Zimmel |
| 7,540,666 B2 | 6/2009 | Luther et al. |
| 7,542,645 B1 | 6/2009 | Hua et al. |
| 7,544,085 B2 | 6/2009 | Baldwin et al. |
| 7,552,899 B2 | 6/2009 | Chen et al. |
| 7,555,193 B2 | 6/2009 | Rapp et al. |
| 7,558,458 B2 | 7/2009 | Gronvall et al. |
| 7,565,051 B2 | 7/2009 | Vongseng |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,577,331 B2 | 8/2009 | Laurisch et al. |
| 7,596,293 B2 | 9/2009 | Isenhour et al. |
| 7,603,020 B1 | 10/2009 | Wakileh et al. |
| 7,607,938 B2 | 10/2009 | Clark et al. |
| 7,609,967 B2 | 10/2009 | Hochbaum et al. |
| 7,613,377 B2 | 11/2009 | Gonzales et al. |
| 7,614,903 B1 | 11/2009 | Huang |
| 7,620,287 B2 | 11/2009 | Appenzeller et al. |
| 7,641,398 B2 | 1/2010 | O'Riorden et al. |
| 7,668,430 B2 | 2/2010 | McClellan et al. |
| 7,668,433 B2 | 2/2010 | Bayazit et al. |
| 7,672,561 B1 | 3/2010 | Keith et al. |
| 7,676,135 B2 | 3/2010 | Chen |
| 7,689,079 B2 | 3/2010 | Burnham et al. |
| 7,694,926 B2 | 4/2010 | Allen et al. |
| 7,697,811 B2 | 4/2010 | Murano et al. |
| 7,706,294 B2 | 4/2010 | Natarajan et al. |
| 7,715,125 B2 | 5/2010 | Willey |
| 7,715,683 B2 | 5/2010 | Kowalczyk et al. |
| 7,734,138 B2 | 6/2010 | Bloodworth et al. |
| 7,740,409 B2 | 6/2010 | Bolton et al. |
| 7,743,495 B2 | 6/2010 | Mori et al. |
| 7,748,911 B2 | 7/2010 | Keenum et al. |
| 7,751,674 B2 | 7/2010 | Hill |
| 7,751,675 B2 | 7/2010 | Holmberg et al. |
| 7,756,371 B1 | 7/2010 | Burnham et al. |
| 7,756,382 B2 | 7/2010 | Saravanos et al. |
| 7,760,984 B2 | 7/2010 | Solheid et al. |
| 7,764,858 B2 | 7/2010 | Bayazit et al. |
| 7,764,859 B2 | 7/2010 | Krampotich et al. |
| 7,769,266 B2 | 8/2010 | Morris |
| 7,805,044 B2 | 9/2010 | Reagan et al. |
| 7,809,232 B2 | 10/2010 | Reagan et al. |
| 7,809,235 B2 | 10/2010 | Reagan et al. |
| 7,811,136 B1 | 10/2010 | Hsieh et al. |
| 7,822,310 B2 | 10/2010 | Castonguay et al. |
| 7,837,495 B2 | 11/2010 | Baldwin et al. |
| 7,850,372 B2 | 12/2010 | Nishimura et al. |
| 7,853,112 B2 | 12/2010 | Zimmel et al. |
| 7,856,166 B2 | 12/2010 | Biribuze et al. |
| 7,862,369 B2 | 1/2011 | Gimenes et al. |
| 7,869,685 B2 | 1/2011 | Hendrickson et al. |
| 7,876,580 B2 | 1/2011 | Mayer |
| 7,899,298 B2 | 3/2011 | Cox et al. |
| 7,914,332 B2 | 3/2011 | Song et al. |
| 7,942,589 B2 | 5/2011 | Yazaki et al. |
| 7,945,135 B2 | 5/2011 | Cooke et al. |
| 7,945,136 B2 | 5/2011 | Cooke et al. |
| 7,945,138 B2 | 5/2011 | Hill et al. |
| 7,970,250 B2 | 6/2011 | Morris |
| 7,991,252 B2 | 8/2011 | Cheng et al. |
| 8,009,959 B2 | 8/2011 | Barnes et al. |
| 8,014,171 B2 | 9/2011 | Kelly et al. |
| 8,014,646 B2 | 9/2011 | Keith et al. |
| 8,020,813 B1 | 9/2011 | Clark et al. |
| 8,059,932 B2 | 11/2011 | Hill et al. |
| 8,093,499 B2 | 1/2012 | Hoffer et al. |
| 8,107,785 B2 | 1/2012 | Berglund et al. |
| 8,131,126 B2 | 3/2012 | Kowalczyk et al. |
| 8,184,938 B2 | 5/2012 | Cooke et al. |
| 8,206,043 B2 | 6/2012 | Thirugnanam et al. |
| 8,206,058 B2 | 6/2012 | Vrondran et al. |
| 8,220,881 B2 | 7/2012 | Keith |
| 8,226,305 B2 | 7/2012 | Thirugnanam et al. |
| 8,249,410 B2 | 8/2012 | Andrus et al. |
| 8,251,591 B2 | 8/2012 | Barnes et al. |
| 8,270,798 B2 | 9/2012 | Dagley et al. |
| 8,280,216 B2 | 10/2012 | Cooke et al. |
| 8,285,104 B2 | 10/2012 | Davis et al. |
| 8,301,004 B2 | 10/2012 | Cooke et al. |
| 8,331,752 B2 | 12/2012 | Biribuze |
| 8,353,494 B2 | 1/2013 | Peng et al. |
| 8,369,679 B2 | 2/2013 | Wakileh et al. |
| 8,391,666 B2 | 3/2013 | Hetzer et al. |
| 8,472,773 B2 | 6/2013 | de Jong |
| 8,491,331 B2 | 7/2013 | Follingstad |
| 8,528,872 B2 | 9/2013 | Mattlin et al. |
| 8,537,477 B2 | 9/2013 | Shioda |
| 8,538,226 B2 | 9/2013 | Makrides-Saravanos et al. |
| 8,559,783 B2 | 10/2013 | Campos et al. |
| 8,824,850 B2 | 9/2014 | Garcia et al. |
| 2001/0010741 A1 | 8/2001 | Hizuka |
| 2001/0029125 A1 | 10/2001 | Morita et al. |
| 2002/0010818 A1 | 1/2002 | Wei et al. |
| 2002/0012353 A1 | 1/2002 | Gerszberg et al. |
| 2002/0014571 A1 | 2/2002 | Thompson |
| 2002/0034290 A1 | 3/2002 | Pershan |
| 2002/0037139 A1 | 3/2002 | Asao et al. |
| 2002/0064364 A1 | 5/2002 | Battey et al. |
| 2002/0131730 A1 | 9/2002 | Keeble et al. |
| 2002/0136519 A1* | 9/2002 | Tinucci et al. ............ 385/134 |
| 2002/0141724 A1 | 10/2002 | Ogawa et al. |

(56) References Cited

U.S. PATENT DOCUMENTS

| | | |
|---|---|---|
| 2002/0150372 A1 | 10/2002 | Schray |
| 2002/0172467 A1 | 11/2002 | Anderson et al. |
| 2002/0180163 A1 | 12/2002 | Muller et al. |
| 2002/0181918 A1 | 12/2002 | Spence et al. |
| 2002/0181922 A1 | 12/2002 | Xin et al. |
| 2002/0191939 A1 | 12/2002 | Daoud et al. |
| 2002/0194596 A1 | 12/2002 | Srivastava |
| 2003/0002802 A1 | 1/2003 | Trezza et al. |
| 2003/0007743 A1 | 1/2003 | Asada |
| 2003/0007767 A1 | 1/2003 | Douglas et al. |
| 2003/0011855 A1 | 1/2003 | Fujiwara |
| 2003/0021539 A1 | 1/2003 | Kwon et al. |
| 2003/0036748 A1 | 2/2003 | Cooper et al. |
| 2003/0051026 A1 | 3/2003 | Carter et al. |
| 2003/0066998 A1 | 4/2003 | Lee |
| 2003/0086675 A1 | 5/2003 | Wu et al. |
| 2003/0095753 A1 | 5/2003 | Wada et al. |
| 2003/0123834 A1* | 7/2003 | Burek et al. .................. 385/137 |
| 2003/0147604 A1 | 8/2003 | Tapia et al. |
| 2003/0156552 A1 | 8/2003 | Banker et al. |
| 2003/0174996 A1 | 9/2003 | Henschel et al. |
| 2003/0180004 A1 | 9/2003 | Cox et al. |
| 2003/0180012 A1 | 9/2003 | Deane et al. |
| 2003/0183413 A1 | 10/2003 | Kato |
| 2003/0199201 A1 | 10/2003 | Mullaney et al. |
| 2003/0210882 A1 | 11/2003 | Barthel et al. |
| 2003/0223723 A1 | 12/2003 | Massey et al. |
| 2003/0223725 A1 | 12/2003 | Laporte et al. |
| 2003/0235387 A1 | 12/2003 | Dufour |
| 2004/0001717 A1 | 1/2004 | Bennett et al. |
| 2004/0013389 A1 | 1/2004 | Taylor |
| 2004/0013390 A1 | 1/2004 | Kim et al. |
| 2004/0022494 A1 | 2/2004 | Liddle et al. |
| 2004/0024934 A1 | 2/2004 | Webb |
| 2004/0067036 A1 | 4/2004 | Clark et al. |
| 2004/0074852 A1 | 4/2004 | Knudsen et al. |
| 2004/0086238 A1 | 5/2004 | Finona et al. |
| 2004/0086252 A1 | 5/2004 | Smith et al. |
| 2004/0120679 A1 | 6/2004 | Vincent et al. |
| 2004/0147159 A1 | 7/2004 | Urban et al. |
| 2004/0151465 A1 | 8/2004 | Krampotich et al. |
| 2004/0175090 A1 | 9/2004 | Vastmans et al. |
| 2004/0192115 A1 | 9/2004 | Bugg |
| 2004/0196841 A1 | 10/2004 | Tudor et al. |
| 2004/0208459 A1 | 10/2004 | Mizue et al. |
| 2004/0228598 A1 | 11/2004 | Allen et al. |
| 2004/0240827 A1 | 12/2004 | Daoud et al. |
| 2004/0240882 A1 | 12/2004 | Lipski et al. |
| 2004/0264873 A1 | 12/2004 | Smith et al. |
| 2005/0002633 A1 | 1/2005 | Solheid et al. |
| 2005/0008131 A1 | 1/2005 | Cook |
| 2005/0026497 A1 | 2/2005 | Holliday |
| 2005/0036749 A1 | 2/2005 | Vogel et al. |
| 2005/0067358 A1 | 3/2005 | Lee et al. |
| 2005/0069248 A1 | 3/2005 | Jasti et al. |
| 2005/0074990 A1 | 4/2005 | Shearman et al. |
| 2005/0076149 A1 | 4/2005 | McKown et al. |
| 2005/0083959 A1 | 4/2005 | Binder |
| 2005/0107086 A1 | 5/2005 | Tell et al. |
| 2005/0111809 A1 | 5/2005 | Giraud et al. |
| 2005/0123261 A1 | 6/2005 | Bellekens et al. |
| 2005/0129379 A1 | 6/2005 | Reagan et al. |
| 2005/0178573 A1 | 8/2005 | James |
| 2005/0201073 A1 | 9/2005 | Pincu et al. |
| 2005/0232566 A1 | 10/2005 | Rapp et al. |
| 2005/0233647 A1 | 10/2005 | Denovich et al. |
| 2005/0254757 A1 | 11/2005 | Ferretti, III et al. |
| 2005/0281526 A1 | 12/2005 | Vongseng et al. |
| 2005/0285493 A1 | 12/2005 | Hu et al. |
| 2006/0007562 A1 | 1/2006 | Willey et al. |
| 2006/0018448 A1 | 1/2006 | Stevens et al. |
| 2006/0018622 A1 | 1/2006 | Caveney |
| 2006/0034048 A1 | 2/2006 | Xu |
| 2006/0039290 A1 | 2/2006 | Roden et al. |
| 2006/0044774 A1 | 3/2006 | Vasavda et al. |
| 2006/0045458 A1 | 3/2006 | Sasaki et al. |
| 2006/0072606 A1 | 4/2006 | Posthuma |
| 2006/0077968 A1 | 4/2006 | Pitsoulakis et al. |
| 2006/0093303 A1 | 5/2006 | Reagan et al. |
| 2006/0103270 A1 | 5/2006 | Bergesch et al. |
| 2006/0127026 A1 | 6/2006 | Beck |
| 2006/0133736 A1 | 6/2006 | Sullivan |
| 2006/0133759 A1 | 6/2006 | Mullaney et al. |
| 2006/0147171 A1 | 7/2006 | Dofher |
| 2006/0147172 A1 | 7/2006 | Luther et al. |
| 2006/0153517 A1 | 7/2006 | Reagan et al. |
| 2006/0160377 A1 | 7/2006 | Huang |
| 2006/0165365 A1 | 7/2006 | Feustel et al. |
| 2006/0165366 A1 | 7/2006 | Feustel et al. |
| 2006/0191700 A1 | 8/2006 | Herzog et al. |
| 2006/0193590 A1 | 8/2006 | Puetz et al. |
| 2006/0193591 A1 | 8/2006 | Rapp et al. |
| 2006/0198098 A1 | 9/2006 | Clark et al. |
| 2006/0204179 A1 | 9/2006 | Patel et al. |
| 2006/0215980 A1 | 9/2006 | Bayazit et al. |
| 2006/0225912 A1 | 10/2006 | Clark et al. |
| 2006/0228087 A1 | 10/2006 | Bayazit et al. |
| 2006/0269194 A1 | 11/2006 | Luther et al. |
| 2006/0269205 A1 | 11/2006 | Zimmel |
| 2006/0269206 A1 | 11/2006 | Zimmel |
| 2006/0269208 A1 | 11/2006 | Allen et al. |
| 2006/0275008 A1 | 12/2006 | Xin |
| 2006/0275009 A1 | 12/2006 | Ellison et al. |
| 2006/0285812 A1 | 12/2006 | Ferris et al. |
| 2007/0003204 A1 | 1/2007 | Makrides-Saravanos et al. |
| 2007/0025070 A1 | 2/2007 | Jiang et al. |
| 2007/0031099 A1 | 2/2007 | Herzog et al. |
| 2007/0033629 A1 | 2/2007 | McGranahan et al. |
| 2007/0047891 A1* | 3/2007 | Bayazit et al. ................ 385/135 |
| 2007/0047894 A1 | 3/2007 | Holmberg et al. |
| 2007/0058641 A1 | 3/2007 | Cicchetti et al. |
| 2007/0086723 A1 | 4/2007 | Sasaki et al. |
| 2007/0104447 A1 | 5/2007 | Allen |
| 2007/0110373 A1 | 5/2007 | Dudek et al. |
| 2007/0131628 A1 | 6/2007 | Mimlitch, III et al. |
| 2007/0183732 A1 | 8/2007 | Wittmeier et al. |
| 2007/0189692 A1 | 8/2007 | Zimmel et al. |
| 2007/0196071 A1 | 8/2007 | Laursen et al. |
| 2007/0221793 A1 | 9/2007 | Kusuda et al. |
| 2007/0237484 A1 | 10/2007 | Reagan et al. |
| 2007/0257159 A1 | 11/2007 | Nelson et al. |
| 2007/0266192 A1 | 11/2007 | Campini et al. |
| 2007/0274718 A1 | 11/2007 | Bridges et al. |
| 2008/0011514 A1 | 1/2008 | Zheng et al. |
| 2008/0025683 A1 | 1/2008 | Murano |
| 2008/0031585 A1 | 2/2008 | Solheid et al. |
| 2008/0063350 A1 | 3/2008 | Trebesch et al. |
| 2008/0068788 A1 | 3/2008 | Ozawa et al. |
| 2008/0069511 A1 | 3/2008 | Blackwell, Jr. et al. |
| 2008/0069512 A1 | 3/2008 | Barnes et al. |
| 2008/0078899 A1 | 4/2008 | Chen et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0085094 A1 | 4/2008 | Krampotich |
| 2008/0089656 A1 | 4/2008 | Wagner et al. |
| 2008/0095502 A1 | 4/2008 | McColloch |
| 2008/0095541 A1 | 4/2008 | Dallesasse |
| 2008/0100440 A1 | 5/2008 | Downie et al. |
| 2008/0106871 A1 | 5/2008 | James |
| 2008/0112681 A1 | 5/2008 | Battey et al. |
| 2008/0118207 A1 | 5/2008 | Yamamoto et al. |
| 2008/0121423 A1 | 5/2008 | Vogel et al. |
| 2008/0124039 A1 | 5/2008 | Gniadek et al. |
| 2008/0131068 A1 | 6/2008 | Mertesdorf et al. |
| 2008/0145013 A1 | 6/2008 | Escoto et al. |
| 2008/0152294 A1 | 6/2008 | Hirano et al. |
| 2008/0166094 A1 | 7/2008 | Bookbinder et al. |
| 2008/0166131 A1 | 7/2008 | Hudgins et al. |
| 2008/0175541 A1 | 7/2008 | Lu et al. |
| 2008/0175550 A1 | 7/2008 | Coburn et al. |
| 2008/0175551 A1 | 7/2008 | Smrha et al. |
| 2008/0175552 A1 | 7/2008 | Smrha et al. |
| 2008/0193091 A1 | 8/2008 | Herbst |

(56) References Cited

U.S. PATENT DOCUMENTS

| | | |
|---|---|---|
| 2008/0205823 A1 | 8/2008 | Luther et al. |
| 2008/0205843 A1 | 8/2008 | Castonguay et al. |
| 2008/0205844 A1 | 8/2008 | Castonguay et al. |
| 2008/0212928 A1 | 9/2008 | Kowalczyk et al. |
| 2008/0219632 A1 | 9/2008 | Smith et al. |
| 2008/0219634 A1 | 9/2008 | Rapp et al. |
| 2008/0236858 A1 | 10/2008 | Quijano |
| 2008/0247723 A1 | 10/2008 | Herzog et al. |
| 2008/0267573 A1 | 10/2008 | Douglas et al. |
| 2008/0285934 A1 | 11/2008 | Standish et al. |
| 2008/0292261 A1 | 11/2008 | Kowalczyk et al. |
| 2008/0296060 A1 | 12/2008 | Hawley et al. |
| 2008/0298763 A1 | 12/2008 | Appenzeller et al. |
| 2008/0310810 A1 | 12/2008 | Gallagher |
| 2009/0010607 A1 | 1/2009 | Elisson et al. |
| 2009/0016685 A1 | 1/2009 | Hudgins et al. |
| 2009/0022470 A1 | 1/2009 | Krampotich |
| 2009/0038845 A1 | 2/2009 | Fransen et al. |
| 2009/0060439 A1 | 3/2009 | Cox et al. |
| 2009/0060440 A1 | 3/2009 | Wright et al. |
| 2009/0067800 A1 | 3/2009 | Vazquez et al. |
| 2009/0074371 A1 | 3/2009 | Bayazit et al. |
| 2009/0080849 A1 | 3/2009 | Hankins et al. |
| 2009/0097813 A1 | 4/2009 | Hill |
| 2009/0110347 A1 | 4/2009 | Jacobsson |
| 2009/0121092 A1 | 5/2009 | Keith |
| 2009/0136194 A1 | 5/2009 | Barnes |
| 2009/0136195 A1 | 5/2009 | Smrha et al. |
| 2009/0136196 A1 | 5/2009 | Trebesch et al. |
| 2009/0146342 A1 | 6/2009 | Haney et al. |
| 2009/0148117 A1 | 6/2009 | Laurisch |
| 2009/0166404 A1 | 7/2009 | German et al. |
| 2009/0169163 A1 | 7/2009 | Abbott, III et al. |
| 2009/0175588 A1 | 7/2009 | Brandt et al. |
| 2009/0180749 A1 | 7/2009 | Douglas et al. |
| 2009/0184221 A1 | 7/2009 | Sculler |
| 2009/0185782 A1 | 7/2009 | Parikh et al. |
| 2009/0191891 A1 | 7/2009 | Ma et al. |
| 2009/0194647 A1 | 8/2009 | Keith |
| 2009/0196563 A1 | 8/2009 | Mullsteff et al. |
| 2009/0202214 A1 | 8/2009 | Holmberg et al. |
| 2009/0207577 A1 | 8/2009 | Fransen et al. |
| 2009/0208178 A1 | 8/2009 | Kowalczyk et al. |
| 2009/0208210 A1 | 8/2009 | Trojer et al. |
| 2009/0212679 A1 | 8/2009 | Frousiakis et al. |
| 2009/0214171 A1 | 8/2009 | Coburn et al. |
| 2009/0220200 A1 | 9/2009 | Sheau Tung Wong et al. |
| 2009/0220204 A1 | 9/2009 | Ruiz |
| 2009/0226142 A1 | 9/2009 | Barnes et al. |
| 2009/0238531 A1 | 9/2009 | Holmberg et al. |
| 2009/0245743 A1 | 10/2009 | Cote et al. |
| 2009/0252472 A1 | 10/2009 | Solheid et al. |
| 2009/0257726 A1 | 10/2009 | Redmann et al. |
| 2009/0257727 A1 | 10/2009 | Laurisch et al. |
| 2009/0257754 A1 | 10/2009 | Theodoras, II et al. |
| 2009/0263096 A1 | 10/2009 | Solheid et al. |
| 2009/0263122 A1 | 10/2009 | Helkey et al. |
| 2009/0267865 A1 | 10/2009 | Miller et al. |
| 2009/0269016 A1 | 10/2009 | Korampally et al. |
| 2009/0269018 A1 | 10/2009 | Frohlich et al. |
| 2009/0269019 A1 | 10/2009 | Andrus et al. |
| 2009/0274429 A1 | 11/2009 | Krampotich et al. |
| 2009/0274430 A1 | 11/2009 | Krampotich et al. |
| 2009/0274432 A1 | 11/2009 | Iwaya |
| 2009/0290842 A1 | 11/2009 | Bran De Leon et al. |
| 2009/0290843 A1 | 11/2009 | Reagan et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0003000 A1 | 1/2010 | Rapp et al. |
| 2010/0012671 A1 | 1/2010 | Vrondran et al. |
| 2010/0027953 A1 | 2/2010 | Russell |
| 2010/0054681 A1 | 3/2010 | Biribuze et al. |
| 2010/0054682 A1 | 3/2010 | Cooke et al. |
| 2010/0054683 A1 | 3/2010 | Cooke et al. |
| 2010/0054684 A1 | 3/2010 | Cooke et al. |
| 2010/0054685 A1 | 3/2010 | Cooke et al. |
| 2010/0054686 A1 | 3/2010 | Cooke et al. |
| 2010/0054687 A1 | 3/2010 | Ye et al. |
| 2010/0061693 A1 | 3/2010 | Bran De Leon et al. |
| 2010/0074587 A1 | 3/2010 | Loeffelholz et al. |
| 2010/0080517 A1 | 4/2010 | Cline et al. |
| 2010/0086267 A1 | 4/2010 | Cooke et al. |
| 2010/0086274 A1 | 4/2010 | Keith |
| 2010/0111483 A1 | 5/2010 | Reinhardt et al. |
| 2010/0119201 A1 | 5/2010 | Smrha et al. |
| 2010/0129035 A1 | 5/2010 | Teo |
| 2010/0142544 A1 | 6/2010 | Chapel et al. |
| 2010/0142910 A1 | 6/2010 | Hill et al. |
| 2010/0150518 A1 | 6/2010 | Leon et al. |
| 2010/0158467 A1 | 6/2010 | Hou et al. |
| 2010/0166377 A1 | 7/2010 | Nair et al. |
| 2010/0178022 A1 | 7/2010 | Schroeder et al. |
| 2010/0202740 A1 | 8/2010 | Barlowe et al. |
| 2010/0202745 A1 | 8/2010 | Sokolowski et al. |
| 2010/0202748 A1 | 8/2010 | Pierce et al. |
| 2010/0220967 A1 | 9/2010 | Cooke et al. |
| 2010/0220968 A1 | 9/2010 | Dagley et al. |
| 2010/0247051 A1 | 9/2010 | Kowalczyk et al. |
| 2010/0266245 A1 | 10/2010 | Sabo |
| 2010/0278499 A1 | 11/2010 | Mures et al. |
| 2010/0296790 A1 | 11/2010 | Cooke et al. |
| 2010/0296791 A1 | 11/2010 | Makrides-Saravanos et al. |
| 2010/0310225 A1 | 12/2010 | Anderson et al. |
| 2010/0310226 A1 | 12/2010 | Wakileh et al. |
| 2010/0316334 A1 | 12/2010 | Kewitsch |
| 2010/0322554 A1 | 12/2010 | Barnes et al. |
| 2010/0322579 A1 | 12/2010 | Cooke et al. |
| 2010/0322580 A1 | 12/2010 | Beamon et al. |
| 2010/0322581 A1 | 12/2010 | Cooke et al. |
| 2010/0322582 A1 | 12/2010 | Cooke et al. |
| 2010/0322583 A1 | 12/2010 | Cooke et al. |
| 2010/0329624 A1 | 12/2010 | Zhou et al. |
| 2011/0008004 A1 | 1/2011 | Liao et al. |
| 2011/0058786 A1 | 3/2011 | Zimmel |
| 2011/0069931 A1 | 3/2011 | Cote et al. |
| 2011/0073730 A1 | 3/2011 | Kitchen |
| 2011/0085774 A1 | 4/2011 | Murphy et al. |
| 2011/0085776 A1 | 4/2011 | Biribuze et al. |
| 2011/0097053 A1 | 4/2011 | Smith et al. |
| 2011/0097977 A1 | 4/2011 | Bubnick et al. |
| 2011/0129185 A1 | 6/2011 | Lewallen et al. |
| 2011/0129186 A1 | 6/2011 | Lewallen et al. |
| 2011/0186532 A1 | 8/2011 | Wu |
| 2011/0192631 A1 | 8/2011 | Burek et al. |
| 2011/0211799 A1 | 9/2011 | Conner et al. |
| 2011/0217014 A1 | 9/2011 | Dominique |
| 2011/0217016 A1 | 9/2011 | Mullsteff |
| 2011/0222821 A1 | 9/2011 | Pitwon et al. |
| 2011/0249950 A1 | 10/2011 | Chapa Ramirez et al. |
| 2011/0268404 A1 | 11/2011 | Cote et al. |
| 2011/0268405 A1 | 11/2011 | Cote et al. |
| 2011/0268407 A1 | 11/2011 | Cowen et al. |
| 2011/0268408 A1 | 11/2011 | Giraud et al. |
| 2011/0268413 A1 | 11/2011 | Cote et al. |
| 2011/0280535 A1* | 11/2011 | Womack ..................... 385/135 |
| 2011/0280537 A1 | 11/2011 | Cowen et al. |
| 2012/0020629 A1 | 1/2012 | Shiratori et al. |
| 2012/0025683 A1 | 2/2012 | Mattlin et al. |
| 2012/0051707 A1 | 3/2012 | Barnes et al. |
| 2012/0057838 A1 | 3/2012 | Hill et al. |
| 2012/0106899 A1 | 5/2012 | Choi |
| 2012/0183263 A1 | 7/2012 | Wu |
| 2012/0183289 A1 | 7/2012 | Lou et al. |
| 2012/0219263 A1 | 8/2012 | Beamon et al. |
| 2012/0288244 A1 | 11/2012 | Wu et al. |
| 2012/0288248 A1 | 11/2012 | Chapa Ramirez et al. |
| 2012/0301083 A1 | 11/2012 | Carter et al. |
| 2013/0004136 A1 | 1/2013 | Brower et al. |
| 2013/0058616 A1 | 3/2013 | Cote et al. |
| 2013/0077927 A1 | 3/2013 | O'Connor |
| 2013/0214108 A1 | 8/2013 | Irudayaraj et al. |
| 2013/0243386 A1 | 9/2013 | Pimentel et al. |
| 2013/0266282 A1 | 10/2013 | Cote et al. |

(56) References Cited

U.S. PATENT DOCUMENTS

| | | |
|---|---|---|
| 2013/0308916 A1 | 11/2013 | Buff et al. |
| 2014/0003782 A1 | 1/2014 | Blackwell, Jr. et al. |
| 2014/0010510 A1 | 1/2014 | Blackard |
| 2014/0112628 A1 | 4/2014 | Keenum et al. |

FOREIGN PATENT DOCUMENTS

| | | | |
|---|---|---|---|
| CA | 2186314 A1 | 4/1997 |
| CA | 2765835 A1 | 1/2011 |
| CH | 688705 A5 | 1/1998 |
| CN | 102460258 A | 5/2012 |
| DE | 8711970 U1 | 10/1987 |
| DE | 3726718 A1 | 2/1989 |
| DE | 3726719 A1 | 2/1989 |
| DE | 4030301 A1 | 3/1992 |
| DE | 4231181 C1 | 8/1993 |
| DE | 20115940 U1 | 1/2002 |
| DE | 10338848 A1 | 3/2005 |
| DE | 202005009932 U1 | 11/2005 |
| DE | 202007000556 U1 | 10/2007 |
| DE | 102007024476 A1 | 11/2008 |
| DE | 202010009385 U1 | 9/2010 |
| EP | 29512 A1 | 6/1981 |
| EP | 0105597 A2 | 4/1984 |
| EP | 0250900 A2 | 1/1988 |
| EP | 0408266 A2 | 1/1991 |
| EP | 0474091 A1 | 8/1991 |
| EP | 0468671 A1 | 1/1992 |
| EP | 0490698 A1 | 6/1992 |
| EP | 0529830 A1 | 3/1993 |
| EP | 0544004 A1 | 6/1993 |
| EP | 0547778 A1 | 6/1993 |
| EP | 0581527 A1 | 2/1994 |
| EP | 0620462 A1 | 10/1994 |
| EP | 0693699 A1 | 1/1996 |
| EP | 0720322 A2 | 7/1996 |
| EP | 0776557 B1 | 6/1997 |
| EP | 0940700 A2 | 9/1999 |
| EP | 0949522 A2 | 10/1999 |
| EP | 1041417 A2 | 10/2000 |
| EP | 1056177 A1 | 11/2000 |
| EP | 1065542 A1 | 1/2001 |
| EP | 1162485 A2 | 12/2001 |
| EP | 1203974 A2 | 5/2002 |
| EP | 1289319 A2 | 3/2003 |
| EP | 1310816 A2 | 5/2003 |
| EP | 1316829 A2 | 6/2003 |
| EP | 1367308 A1 | 12/2003 |
| EP | 1621907 A1 | 2/2006 |
| EP | 1777563 A1 | 4/2007 |
| EP | 2060942 A2 | 5/2009 |
| EP | 2159613 A2 | 3/2010 |
| FR | 1586331 A | 2/1970 |
| FR | 2123728 A5 | 9/1972 |
| FR | 2378378 A1 | 8/1978 |
| GB | 2241591 A | 9/1991 |
| GB | 2277812 A | 11/1994 |
| GB | 2367379 A | 4/2002 |
| GB | 2377839 A | 1/2003 |
| JP | 3060994 A | 3/1991 |
| JP | 3172806 A | 7/1991 |
| JP | 3281378 A | 12/1991 |
| JP | 5045541 A | 2/1993 |
| JP | 06018749 A | 1/1994 |
| JP | 7308011 A | 11/1995 |
| JP | 7318761 A | 12/1995 |
| JP | 8007308 A | 1/1996 |
| JP | 8248235 A | 9/1996 |
| JP | 8248237 A | 9/1996 |
| JP | 3487946 A | 10/1996 |
| JP | 8254620 A | 10/1996 |
| JP | 3279474 A | 10/1997 |
| JP | 9258033 A | 10/1997 |
| JP | 9258055 A | 10/1997 |
| JP | 2771870 B2 | 7/1998 |
| JP | 3448448 A | 8/1998 |
| JP | 10227919 A | 8/1998 |
| JP | 3478944 A | 12/1998 |
| JP | 10332945 A | 12/1998 |
| JP | 10339817 A | 12/1998 |
| JP | 11023858 A | 1/1999 |
| JP | 2000098138 A | 4/2000 |
| JP | 2000098139 A | 4/2000 |
| JP | 2000241631 A | 9/2000 |
| JP | 2001004849 A | 1/2001 |
| JP | 3160322 B2 | 4/2001 |
| JP | 2001133636 A | 5/2001 |
| JP | 3173962 B2 | 6/2001 |
| JP | 3176906 B2 | 6/2001 |
| JP | 2001154030 A | 6/2001 |
| JP | 2001159714 A | 6/2001 |
| JP | 2002022974 A | 1/2002 |
| JP | 2002077236 A | 3/2002 |
| JP | 2002116337 A | 4/2002 |
| JP | 2002169035 A | 6/2002 |
| JP | 3312893 B2 | 8/2002 |
| JP | 2002305389 A | 10/2002 |
| JP | 3344701 B2 | 11/2002 |
| JP | 2003029054 A | 1/2003 |
| JP | 3403573 B2 | 5/2003 |
| JP | 2003169026 A | 6/2003 |
| JP | 2003215353 A | 7/2003 |
| JP | 2003344701 A | 12/2003 |
| JP | 3516765 B2 | 4/2004 |
| JP | 2004144808 A | 5/2004 |
| JP | 2004514931 A | 5/2004 |
| JP | 3542939 B2 | 7/2004 |
| JP | 2004246147 A | 9/2004 |
| JP | 2004361652 A | 12/2004 |
| JP | 2004361893 A | 12/2004 |
| JP | 3107704 U | 2/2005 |
| JP | 2005055748 A | 3/2005 |
| JP | 2005062569 A | 3/2005 |
| JP | 2005084241 A | 3/2005 |
| JP | 2005148327 A | 6/2005 |
| JP | 2005257937 A | 9/2005 |
| JP | 3763645 B2 | 4/2006 |
| JP | 3778021 B2 | 5/2006 |
| JP | 2006126513 A | 5/2006 |
| JP | 2006126516 A | 5/2006 |
| JP | 3794540 B2 | 7/2006 |
| JP | 2006227041 A | 8/2006 |
| JP | 3833638 B2 | 10/2006 |
| JP | 2006276782 A | 10/2006 |
| JP | 2006292924 A | 10/2006 |
| JP | 3841344 B2 | 11/2006 |
| JP | 3847533 B2 | 11/2006 |
| JP | 200747336 A | 2/2007 |
| JP | 3896035 B2 | 3/2007 |
| JP | 2007067458 A1 | 3/2007 |
| JP | 3934052 B2 | 6/2007 |
| JP | 3964191 B2 | 8/2007 |
| JP | 3989853 B2 | 10/2007 |
| JP | 4026244 B2 | 12/2007 |
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A | 7/2008 |
| JP | 2008180817 A1 | 8/2008 |
| JP | 4184329 B2 | 11/2008 |
| JP | 2008271017 A | 11/2008 |
| JP | 2008542822 T | 11/2008 |
| JP | 2009503582 T | 1/2009 |
| JP | 2009229506 A | 10/2009 |
| JP | 2012065019 A | 3/2012 |
| KR | 20110037404 A | 4/2011 |
| WO | 9105281 A1 | 4/1991 |
| WO | 9326070 A1 | 12/1993 |
| WO | 9520175 A1 | 7/1995 |
| WO | 9636896 A1 | 11/1996 |

(56) References Cited

FOREIGN PATENT DOCUMENTS

| | | | |
|---|---|---|---|
| WO | 9638752 | A1 | 12/1996 |
| WO | 9712268 | A1 | 4/1997 |
| WO | 9722025 | A1 | 6/1997 |
| WO | 9736197 | A1 | 10/1997 |
| WO | 9744605 | A1 | 11/1997 |
| WO | 9825416 | A1 | 6/1998 |
| WO | 9927404 | A1 | 6/1999 |
| WO | 0005611 | A2 | 2/2000 |
| WO | 0127660 | A2 | 4/2001 |
| WO | 0130007 | A2 | 4/2001 |
| WO | 0180596 | A1 | 10/2001 |
| WO | 0242818 | A1 | 5/2002 |
| WO | 03009527 | A2 | 1/2003 |
| WO | 03014943 | A2 | 2/2003 |
| WO | 2004052066 | A1 | 6/2004 |
| WO | 2005020400 | A1 | 3/2005 |
| WO | 2006076062 | A | 7/2006 |
| WO | 2006108024 | A1 | 10/2006 |
| WO | 2007050515 | A1 | 5/2007 |
| WO | 2007079074 | A2 | 7/2007 |
| WO | 2007089682 | A2 | 8/2007 |
| WO | 2007149215 | A2 | 12/2007 |
| WO | 2008027201 | A2 | 3/2008 |
| WO | 2008063054 | A2 | 5/2008 |
| WO | 2008113054 | A2 | 9/2008 |
| WO | 2008157248 | A1 | 12/2008 |
| WO | 2009026688 | A1 | 3/2009 |
| WO | 2009029485 | A1 | 3/2009 |
| WO | 2009030360 | A1 | 3/2009 |
| WO | 2009120280 | A2 | 10/2009 |
| WO | 2010024847 | A2 | 3/2010 |
| WO | 2010080745 | A1 | 7/2010 |
| WO | 2011005461 | A1 | 1/2011 |

OTHER PUBLICATIONS

Unknown Author, "Cellular Specialties introduces the first simulated in-building location-based tracking solution," smart-grid.tmenet.com/news, Sep. 14, 2009, 2 pages.
Unknown Author, "CDMA Co-Pilot Transmitter," Cellular Specialties, Inc., Aug. 2009, 2 pages.
International Search Report for PCT/US2010/038986 mailed Aug. 18, 2010, 1 page.
Notice of Allowance for U.S. Appl. No. 12/871,052 mailed Sep. 18, 2013, 9 pages.
Non-final Office Action for U.S. Appl. No. 12/953,039 mailed Sep. 12, 2013, 8 pages.
Non-final Office Action for U.S. Appl. No. 12/946,139 mailed Oct. 2, 2013, 18 pages.
Final Office Action for U.S. Appl. No. 12/394,114 mailed Oct. 4, 2013, 10 pages.
Non-final Office Action for U.S. Appl. No. 12/818,986 mailed Oct. 4, 2013, 19 pages.
Non-final Office Action for U.S. Appl. No. 13/901,074 mailed Oct. 9, 2013, 6 pages.
Advisory Action for U.S. Appl. No. 12/953,134 mailed Nov. 4, 2013, 3 pages.
Final Office Action for U.S. Appl. No. 12/952,960 mailed Oct. 29, 2013, 8 pages.
Notice of Allowance for U.S. Appl. No. 13/292,130 mailed Oct. 18, 2013, 9 pages.
International Search Report and Written Opinion for PCT/US2011/035683 mailed Sep. 8, 2011, 15 pages.
International Search Report and Written Opinion for PCT/US2010/039218 mailed Oct. 27, 2010, 13 pages.
First Office Action for Chinese patent application 201080032453.2 issued Mar. 26, 2013, 6 pages.
Chinese Search Report for Chinese patent application 201080032453.2 mailed May 15, 2013, 2 pages.
First Office Action for Chinese patent application 201080031621.6 mailed Sep. 26, 2013, 9 pages.
Chinese Search Report for Chinese patent application 201080031621.6 mailed Sep. 13, 2013, 2 pages.
Ramdas, "Modern File Systems and Storage," Proceedings of the 2nd International SANE Conference, May 22-25, 2000, MECC, Maastricht, The Netherlands, Copyright Rodney R. Ramdas, 10 pages.
International Search Report and Written Opinion for PCT/US2011/035684 mailed Jul. 1, 2011, 11 pages.
International Search Report and Written Opinion for PCT/US11/61754 mailed Mar. 26, 2012, 9 pages.
Author Unknown, "144 Fiber Patch Panel 1U," Technical Data, ADTEK Group Limited, 2009, 2 pages.
Advisory Action for U.S. Appl. No. 12/394,114 mailed Jan. 2, 2014, 3 pages.
Notice of Allowance for U.S. Appl. No. 12/871,052 mailed Dec. 24, 2013, 9 pages.
Final Office Action for U.S. Appl. No. 12/953,039 mailed Dec. 27, 2013, 10 pages.
Advisory Action for U.S. Appl. No. 12/952,960 mailed Jan. 8, 2014, 3 pages.
Advisory Action for U.S. Appl. No. 12/952,912 mailed Nov. 26, 2013, 3 pages.
Examiner's Answer to the Appeal Brief for U.S. Appl. No. 12/953,118 mailed Dec. 3, 2013, 6 pages.
Non-final Office Action for U.S. Appl. No. 13/597,549 mailed Jan. 14, 2014, 9 pages.
Final Office Action for U.S. Appl. No. 12/732,487 mailed Dec. 6, 2013, 24 pages.
Final Office Action for U.S. Appl. No. 12/956,446 mailed Dec. 23, 2013, 12 pages.
Non-final Office Action for U.S. Appl. No. 12/953,536 mailed Dec. 17, 2013, 21 pages.
Non-final Office Action for U.S. Appl. No. 12/819,065 mailed Dec. 3, 2013, 8 pages.
International Search Report and Written Opinion for PCT/US2011/062353 mailed Apr. 10, 2012, 15 pages.
International Search Report for PCT/US2009/066779 mailed Aug. 27, 2010, 3 pages.
"MPO Fiber Optic Rack Panels now available from L-com Connectivity Products," article dated Jun. 4, 2007, 16 pages, http://www.l-com.com/content/Article.aspx?Type=P&ID=438.
"19 Rack Panel with 16 MPO Fiber Optic Couplers—1U high," product page, accessed Oct. 23, 2012, 2 pages, http://www.l-com.com/item.aspx?id=9767#.UlbgG8XXay5.
"Drawing for L-co, 1U Panel with 16 MTP couplers," May 15, 2007, 1 page, http://www.l-com.com/multimedia/eng_drawings/PR17516MTP.pdf.
"RapidNet Fibre MTP VHD Cassette," Brochure, Date Unknown, 1 page, http://www.hellermanntyton.se/documents/5000/576_fiber_1U.pdf.
"MPO for Gigabit Ethernet/FAS-NET MTP Solution," Brochure, Date Unknown, 11 pages, http://www.infinique.com/upload/13182286190.pdf.
"Hubbell OptiChannel High Density 144 Port 1U Fiber Enclosure," Brochure, Date Unknown, 2 pages, http://www.hubbell-premise.com/literature/PLDF010.pdf.
Non-final Office Action for U.S. Appl. No. 12/771,473 mailed Oct. 4, 2012, 6 pages.
Non-final Office Action for U.S. Appl. No. 12/819,081 mailed Aug. 21, 2012, 12 pages.
Notice of Allowance for U.S. Appl. No. 12/417,325 mailed Aug. 22, 2012, 7 pages.
Notice of Panel Decision for Pre-Appeal Brief for U.S. Appl. No. 12/417,325 mailed Aug. 8, 2012, 2 pages.
Advisory Action for U.S. Appl. No. 12/417,325 mailed Jun. 29, 2012, 3 pages.
Advisory Action for U.S. Appl. No. 12/417,325 mailed Jun. 12, 2012, 3 pages.
Final Office Action for U.S. Appl. No. 12/417,325 mailed Apr. 16, 2012, 6 pages.
Final Office Action for U.S. Appl. No. 12/417,325 mailed Feb. 7, 2012, 7 pages.

(56) References Cited

OTHER PUBLICATIONS

Non-final Office Action for U.S. Appl. No. 12/417,325 mailed Jun. 15, 2011, 6 pages.
Notice of Allowance for U.S. Appl. No. 12/487,929 mailed Sep. 12, 2012, 4 pages.
Notice of Allowance for U.S. Appl. No. 12/487,929 mailed Jun. 13, 2012, 8 pages.
Advisory Action for U.S. Appl. No. 12/487,929 mailed Apr. 17, 2012, 3 pages.
Final Office Action for U.S. Appl. No. 12/487,929 mailed Feb. 14, 2012, 6 pages.
Final Office Action for U.S. Appl. No. 12/487,929 mailed Dec. 5, 2011, 7 pages.
Non-final Office Action for U.S. Appl. No. 12/487,929 mailed May 23, 2011, 7 pages.
Notice of Allowance for U.S. Appl. No. 12/415,253 mailed Mar. 11, 2011, 7 pages.
Non-final Office Action for U.S. Appl. No. 12/415,253 mailed Jul. 12, 2010, 11 pages.
Final Office Action for U.S. Appl. No. 12/415,253 mailed Apr. 16, 2010, 9 pages.
Non-final Office Action for U.S. Appl. No. 12/415,253 mailed Sep. 30, 2009, 8 pages.
Non-final Office Action for U.S. Appl. No. 12/641,617 mailed Oct. 5, 2012, 21 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Non-final Office Action for U.S. Appl. No. 12/751,884 mailed Jul. 2, 2012, 9 pages.
Non-final Office Action for U.S. Appl. No. 12/871,052 mailed Aug. 13, 2012, 8 pages.
International Search Report for PCT/US2013/041268 mailed Aug. 20, 2013, 5 pages.
Notice of Allowance for U.S. Appl. No. 13/292,130 mailed Feb. 14, 2014, 7 pages.
Final Office Action for U.S. Appl. No. 12/707,889 mailed Feb. 11, 2014, 17 pages.
Non-final Office Action for U.S. Appl. No. 12/940,699 mailed Feb. 3, 2014, 10 pages.
Notice of Allowance for U.S. Appl. No. 12/952,960 mailed Feb. 13, 2014, 7 pages.
Notice of Allowance and Applicant-Initiated Interview Summary for U.S. Appl. No. 12/771,473 mailed Feb. 27, 2014, 8 pages.
Non-final Office Action for U.S. Appl. No. 13/081,856 mailed Nov. 26, 2013, 11 pages.
Non-final Office Action for U.S. Appl. No. 13/688,675 mailed Jan. 31, 2014, 13 pages.
Non-final Office Action for U.S. Appl. No. 13/663,975 mailed Jan. 31, 2014, 18 pages.
Non-final Office Action for U.S. Appl. No. 12/394,114 mailed Mar. 21, 2014, 9 pages.
Final Office Action for U.S. Appl. No. 12/940,585 mailed Mar. 18, 2014, 15 pages.
Non-final Office Action for U.S. Appl. No. 12/953,101 mailed Apr. 3, 2014, 9 pages.
Advisory Action for U.S. Appl. No. 12/956,446 mailed Mar. 20, 2014, 3 pages.
Final Office Action for U.S. Appl. No. 13/603,894 mailed Mar. 20, 2014, 15 pages.
Advisory Action for U.S. Appl. No. 12/953,039 mailed Mar. 6, 2014, 3 pages.
International Search Report for PCT/US2012/023622 mailed Mar. 9, 2012, 4 pages.
International Search Report for PCT/US2012/023635 mailed Sep. 14, 2012, 3 pages.
International Search Report for PCT/US2012/023626 mailed May 22, 2012, 4 pages.
Notice of Allowance for U.S. Appl. No. 13/951,916 mailed Dec. 16, 2013, 12 pages.
International Preliminary Report on Patentability for PCT/US2012/052958 mailed Mar. 13, 2014, 14 pages.
Non-final Office Action for U.S. Appl. No. 12/947,883 mailed Sep. 6, 2013, 9 pages.
Final Office Action for U.S. Appl. No. 12/947,883 mailed Mar. 31, 2014, 13 pages.
International Search Report for PCT/US2011/030446 mailed Jul. 14, 2011, 2 pages.
International Search Report for PCT/US2011/030448 mailed Jul. 20, 2011, 2 pages.
International Search Report for PCT/US2011/030466 mailed Aug. 5, 2011, 2 pages.
International Search Report for PCT/US2012/052958 mailed Mar. 1, 2013, 7 pages.
International Search Report for PCT/US2013/041266 mailed Aug. 20, 2013, 4 pages.
Non-final Office Action for U.S. Appl. No. 13/621,958 mailed Feb. 13, 2014, 10 pages.
Non-final Office Action for U.S. Appl. No. 13/649,417 mailed Feb. 13, 2014, 10 pages.
Non-final Office Action for U.S. Appl. No. 13/663,949 mailed Feb. 3, 2014, 19 pages.
Non-final Office Action for U.S. Appl. No. 12/953,003 mailed Apr. 14, 2014, 13 pages.
Non-final Office Action for U.S. Appl. No. 12/953,039 mailed Apr. 15, 2014, 8 pages.
Final Office Action for U.S. Appl. No. 12/946,139 mailed Apr. 22, 2014, 18 pages.
Final Office Action for U.S. Appl. No. 13/597,549 mailed Apr. 24, 2014, 10 pages.
Final Office Action for U.S. Appl. No. 13/901,074 mailed May 9, 2014, 7 pages.
Non-final Office Action for U.S. Appl. No. 12/946,217 mailed Jul. 26, 2012, 25 pages.
Final Office Action for U.S. Appl. No. 12/946,217 mailed Mar. 18, 2013, 48 pages.
Non-final Office Action for U.S. Appl. No. 12/946,217 mailed Oct. 3, 2013, 47 pages.
Final Office Action for U.S. Appl. No. 12/946,217 mailed Apr. 25, 2014, 40 pages.
Non-final Office Action for U.S. Appl. No. 13/833,876 mailed Apr. 24, 2014, 7 pages.
Notice of Allowance for U.S. Appl. No. 12/953,536 mailed May 20, 2014, 9 pages.
Advisory Action for U.S. Appl. No. 12/707,889 mailed Jun. 11, 2014, 4 pages.
Advisory Action for U.S. Appl. No. 12/940,585 mailed Jun. 17, 2014, 3 pages.
Advisory Action for U.S. Appl. No. 12/947,883 mailed Jun. 19, 2014, 3 pages.
Non-final Office Action for U.S. Appl. No. 12/732,487 mailed Jun. 20, 2014, 24 pages.
Non-final Office Action for U.S. Appl. No. 13/621,958 mailed Jun. 20, 2014, 13 pages.
Final Office Action for U.S. Appl. No. 13/649,417 mailed Jun. 25, 2014, 9 pages.
Non-final Office Action for U.S. Appl. No. 12/952,960 mailed Jun. 26, 2014, 13 pages.
Non-final Office Action for U.S. Appl. No. 13/746,938 mailed Jul. 11, 2014, 9 pages.
Non-final Office Action for U.S. Appl. No. 12/751,895 mailed May 20, 2014, 9 pages.
Notice of Allowance for U.S. Appl. No. 13/533,093 mailed Jul. 8, 2014, 9 pages.
Notice of Allowance for U.S. Appl. No. 13/597,549 mailed Jul. 8, 2014, 8 pages.
Notice of Allowance for U.S. Appl. No. 13/455,646 mailed Jun. 2, 2014, 9 pages.
Non-final Office Action for U.S. Appl. No. 12/819,065 mailed Jul. 18, 2014, 10 pages.

(56) References Cited

OTHER PUBLICATIONS

Final Office Action for U.S. Appl. No. 12/818,986 mailed Jul. 18, 2014, 27 pages.
Final Office Action for U.S. Appl. No. 13/081,856 mailed Jul. 2, 2014, 8 pages.
Notice of Allowance for U.S. Appl. No. 12/221,117 mailed Jul. 16, 2014, 7 pages.
Decision on Appeal for U.S. Appl. No. 12/221,117 mailed Jul. 1, 2014, 7 pages.
Author Unknown, "FiberManager Frame Cross-connect Configuration Fiber Tracing Option: Installation and Maintenance," Siecor Corporation, A0402884, Release 04.00, Jul. 1995, 80 pages.
Author Unknown, "FOS-FDF", Corning Cable Systems, SRP-003-305, Issue 4, Mar. 2001, 17 pages.
Author Unknown, "Optical Management Shelf (OMS)," Corning Cable Systems, Standard Recommended Procedure (SRP) 003-600, Issue 3, Apr. 2004, 9 pages.
Author Unknown, "Single Shelf HDF Installation," Standard Recommended Procedure (SRP) 003-377, Corning Cable Systems, Issue 5, Aug. 2001, pp. 1-12.
Final Office Action for U.S. Appl. No. 12/953,039 mailed Jul. 25, 2014, 10 pages.
Advisory Action for U.S. Appl. No. 12/953,039 mailed Oct. 3, 2014, 3 pages.
Notice of Allowance for U.S. Appl. No. 12/953,536 mailed Aug. 28, 2014, 9 pages.
Final Office Action for U.S. Appl. No. 13/901,074 mailed Sep. 5, 2014, 7 pages.
Final Office Action for U.S. Appl. No. 13/663,975 mailed Aug. 14, 2014, 42 pages.
Corrected Notice of Allowance for U.S. Appl. No. 13/533,093 mailed Sep. 2, 2014, 7 pages.
Notice of Allowance for U.S. Appl. No. 13/649,417 mailed Sep. 8, 2014, 7 pages.
Examiner's Answer to the Appeal for U.S. Appl. No. 12/952,912 mailed Sep. 11, 2014, 15 pages.
Advisory Action and Examiner-Initiated Interview Summary for U.S. Appl. No. 13/081,856 mailed Sep. 16, 2014, 4 pages.
Notice of Allowance for U.S. Appl. No. 13/455,646 mailed Sep. 26, 2014, 9 pages.
Non-Final Office Action for U.S. Appl. No. 13/663,949 mailed Sep. 25, 2014, 21 pages.
Non-Final Office Action for U.S. Appl. No. 13/688,675 mailed Sep. 30, 2014, 9 pages.
Notice of Allowance for U.S. Appl. No. 13/597,549 mailed Oct. 3, 2014, 8 pages.
Decision on Appeal for U.S. Appl. No. 11/320,062 mailed Aug. 14, 2014, 8 pages.
Final Office Action for U.S. Appl. No. 12/953,101 mailed Oct. 20, 2014, 14 pages.
Notice of Allowance for U.S. Appl. No. 13/533,093 mailed Oct. 17, 2014, 9 pages.
Notice of Allowance for U.S. Appl. No. 12/732,487 mailed Oct. 7, 2014, 8 pages.
Non-Final Office Action for U.S. Appl. No. 13/567,288 mailed Oct. 8, 2014, 7 pages.
Advisory Action for U.S. Appl. No. 12/818,986 mailed Oct. 15, 2014, 5 pages.
Examiner's Answer to the Appeal Brief for U.S. Appl. No. 12/953,134 mailed Aug. 1, 2014, 7 pages.
Annex to Form PCT/ISA/2006, Communication Relating to the Results of the Partial International Search, for PCT/US2009/004549 mailed Feb. 10, 2010, 2 pages.
Annex to Form PCT/ISA/206, Communication Relating to the Results of the Partial International Search, for PCT/US2009/004548 mailed Jan. 19, 2010, 2 pages.
Corning Cable Systems, "Corning Cable Systems Products for BellSouth High Density Shelves," Jun. 2000, 2 pages.
Corning Cable Systems, "Corning Cable Systems Quick Reference Guide for Verizon FTTP FDH Products," Jun. 2005, 4 pages.
Conner, M. "Passive Optical Design for RFOG and Beyond," Braodband Properties, Apr. 2009, pp. 78-81.
Corning Evolant, "Eclipse Hardware Family," Nov. 2009, 1 page.
Corning Evolant, "Enhanced Management Frame," Dec. 2009, 1 page.
Corning Evolant, "Enhanced Management Frame (EMF)," Specification Sheet, Nov. 2009, 24 pages.
Corning Cable Systems, "Evolant Solutions for Evolving Networks: Fiber Optic Hardware," Oct. 2002, 2 pages.
Corning Cable Systems, "Fiber Optic Hardware with Factory-Installed Pigtails: Features and Benefits," Nov. 2010, 12 pages.
Corning Cable Systems, "FiberManager System 1- and 3-Position Compact Shelves," Jan. 2003, 4 pages.
Corning Cable Systems, "FiberManager System Frame and Components," Jan. 2003, 12 pages.
Corning Cable Systems, "High Density Frame," Jul. 2001, 2 pages.
Corning Cable Systems, "High Density Frame (HDF) Connector-Splice Shelves and Housings," May 2003, 4 pages.
International Search Report for PCT/US10/35529 mailed Jul. 23, 2010, 2 pages.
International Search Report for PCT/US10/35563 mailed Jul. 23, 2012, 1 page.
International Search Report for PCT/US2008/002514 mailed Aug. 8, 2008, 2 pages.
International Search Report for PCT/US2008/010317 mailed Mar. 4, 2008, 2 pages.
International Search Report for PCT/US2009/001692 mailed Nov. 24, 2009, 5 pages.
International Search Report for PCT/US2010/024888 mailed Jun. 23, 2010, 5 pages.
International Search Report for PCT/US2010/027402 mailed Jun. 16, 2010, 2 pages.
Corning Cable Systems, "MTX Frames and Accessories," Feb. 2006, 4 pages.
Panduit, "Lock-in LC Duplex Clip," Accessed Mar. 22, 2012, 1 page.
International Search Report for PCT/US06/49351 mailed Apr. 25, 2008, 1 page.
International Search Report for PCT/US09/57069 mailed Mar. 24, 2010, 2 pages.
International Search Report for PCT/US2009/057244 mailed Nov. 9, 2009 3 pages.
International Search Report for PCTUS2009004548 mailed Mar. 19, 2010, 5 pages.
International Search Report for PCTUS2009004549 mailed Apr. 20, 2010, 6 pages.
Siecor, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
Written Opinion for PCT/US2010/023901 mailed Aug. 25, 2011, 8 pages.
Advisory Action for U.S. Appl. No. 12/221,117 mailed Aug. 24, 2011, 3 pages.
Examiner's Answer to Appeal Brief for U.S. Appl. No. 12/221,117 mailed Mar. 29, 2012, 16 pages.
Final Office Action for U.S. Appl. No. 12/221,117 mailed Feb. 19, 2010, 7 pages.
Final Office Action for U.S. Appl. No. 12/221,117 mailed Jun. 10, 2011, 8 pages.
Non-final Office Action for U.S. Appl. No. 12/221,117 mailed Jul. 14, 2010, 7 pages.
Non-final Office Action for U.S. Appl. No. 12/221,117 mailed Jun. 9, 2009, 5 pages.
Non-final Office Action for U.S. Appl. No. 12/221,117 mailed Dec. 21, 2010, 7 pages.
Advisory Action for U.S. Appl. No. 12/394,483 mailed Feb. 16, 2012, 3 pages.

(56) References Cited

OTHER PUBLICATIONS

Final Office Action for U.S. Appl. No. 12/394,483 mailed Dec. 6, 2011, 14 pages.
Non-final Office Action for U.S. Appl. No. 12/394,483 mailed Jun. 17, 2011, 11 pages.
Advisory Action for U.S. Appl. No. 12/950,234 mailed Dec. 21, 2011, 3 pages.
Non-final Office Action for U.S. Appl. No. 12/950,234 mailed Jun. 17, 2011, 7 pages.
Non-final Office Action for U.S. Appl. No. 12/950,234 mailed Mar. 12, 2012, 10 pages.
Final Office Action for U.S. Appl. No. 12/950,234 mailed Oct. 14, 2011, 10 pages.
Advisory Action mailed May 12, 2011, for U.S. Appl. No. 12/323,423, 3 pages.
Final Rejection mailed Mar. 3, 2011, for U.S. Appl. No. 12/323,423, 17 pages.
Non-Final Rejection mailed Aug. 5, 2011, for U.S. Appl. No. 12/323,423, 13 pages.
International Search Report for PCT/US2010/023901 mailed Jun. 11, 2010, 3 pages.
Notice of Allowance for U.S. Appl. No. 12/576,769 mailed May 31, 2012, 9 pages.
Non-final Office Action for U.S. Appl. No. 12/576,806 mailed Dec. 13, 2011, 6 pages.
Notice of Allowance for U.S. Appl. No. 12/576,806 mailed Apr. 18, 2012, 5 pages.
Non-Final Rejection mailed Sep. 7, 2010, for U.S. Appl. No. 12/323,423, 18 pages.
Notice of Allowance for U.S. Appl. No. 12/323,423 mailed Jan. 24, 2012, 8 pages.
Examiner's Answer mailed Mar. 4, 2011, for U.S. Appl. No. 12/323,415, 11 pages.
Final Rejection mailed Jun. 25, 2010, for U.S. Appl. No. 12/323,415, 10 pages.
Non-Final Rejection mailed Aug. 5, 2011, for U.S. Appl. No. 12/323,415, 41 pages.
Non-final Office Action for U.S. Appl. No. 12/323,415 mailed Apr. 23, 2012, 11 pages.
Non-Final Rejection mailed Dec. 10, 2009, for U.S. Appl. No. 12/323,415, 7 pages.
Examiner's Answer to Appeal Brief for U.S. Appl. No. 11/320,062 mailed Dec. 8, 2011, 8 pages.
Final Office Action for U.S. Appl. No. 11/320,062 mailed Mar. 8, 2011, 8 pages.
Non-final Office Action for U.S. Appl. No. 11/320,062 mailed Jan. 15, 2010, 11 pages.
Non-final Office Action for U.S. Appl. No. 12/320,062 mailed Sep. 30, 2010, 7 pages.
Final Office Action for U.S. Appl. No. 11/439,086 mailed Feb. 4, 2010, 14 pages.
Non-final Office Action for U.S. Appl. No. 11/439,086 mailed May 3, 2010, 11 pages.
Non-final Office Action for U.S. Appl. No. 11/439,086 mailed Sep. 21, 2009, 10 pages.
Final Office Action for U.S. Appl. No. 12/079,481 mailed Mar. 18, 2010, 10 pages.
Non-final Office Action for U.S. Appl. No. 12/079,481 mailed Dec. 26, 2008, 9 pages.
Non-final Office Action for U.S. Appl. No. 12/079,481 mailed Sep. 16, 2009, 10 pages.
Notice of Allowance for U.S. Appl. No. 12/079,481 mailed Jun. 3, 2010, 6 pages.
Notice of Allowance for U.S. Appl. No. 12/079,481 mailed Oct. 4, 2010, 4 pages.
Final Office Action for U.S. Appl. No. 12/394,114 mailed Dec. 22, 2011, 8 pages.
Non-final Office Action for U.S. Appl. No. 12/394,114 mailed Mar. 16, 2012, 8 pages.
Non-final Office Action for U.S. Appl. No. 12/394,114 mailed Sep. 1, 2011, 7 pages.
Non-final Office Action for U.S. Appl. No. 12/323,373 mailed May 3, 2012, 7 pages.
Non-final Office Action for U.S. Appl. No. 11/809,474 mailed Apr. 8, 2008, 13 pages.
Non-final Office Action for U.S. Appl. No. 11/809,474 mailed Nov. 13, 2008, 10 pages.
Notice of Allowance for U.S. Appl. No. 11/809,474 mailed Jul. 6, 2009, 6 pages.
Final Office Action for U.S. Appl. No. 11/320,031 mailed Mar. 8, 2011, 8 pages.
Non-final Office Action for U.S. Appl. No. 11/320,031 mailed Jan. 5, 2010, 16 pages.
Non-final Office Action for U.S. Appl. No. 11/320,031 mailed Sep. 30, 2010, 7 pages.
Notice of Allowance for U.S. Appl. No. 11/320,031 mailed Nov. 15, 2011, 7 pages.
Non-final Office Action for U.S. Appl. No. 12/157,622 mailed Mar. 31, 2009, 9 pages.
Non-final Office Action for U.S. Appl. No. 12/157,622 mailed Oct. 15, 2009, 9 pages.
Notice of Allowance for U.S. Appl. No. 12/157,622 mailed Apr. 22, 2010, 4 pages.
Non-final Office Action for U.S. Appl. No. 12/323,395 mailed Dec. 8, 2011, 7 pages.
Non-final Office Action for U.S. Appl. No. 12/415,454 mailed Mar. 2, 2012, 5 pages.
Non-final Office Action for U.S. Appl. No. 12/415,454 mailed Sep. 6, 2011, 7 pages.
Notice of Allowance for U.S. Appl. No. 12/415,454 mailed Jan. 13, 2012, 5 pages.
Non-final Office Action for U.S. Appl. No. 12/576,769 mailed Feb. 2, 2012, 23 pages.
Notice of Allowance for U.S. Appl. No. 12/415,454 mailed Jun. 19, 2012, 5 pages.
Non-final Office Action for U.S. Appl. No. 13/603,894 mailed Oct. 3, 2013, 9 pages.
Final Office Action for U.S. Appl. No. 12/394,114 mailed Oct. 25, 2012, 8 pages.
Non-final Office Action for U.S. Appl. No. 12/915,682 mailed Oct. 24, 2012, 8 pages.
Non-final Office Action for U.S. Appl. No. 12/818,986 mailed Feb. 3, 2012, 12 pages.
Final Office Action for U.S. Appl. No. 12/818,986 mailed Oct. 18, 2012, 13 pages.
Non-final Office Action for U.S. Appl. No. 12/952,960 mailed Oct. 4, 2012, 11 pages.
Non-final Office Action for U.S. Appl. No. 12/953,134 mailed Sep. 25, 2012, 8 pages.
Non-final Office Action for U.S. Appl. No. 12/953,039 mailed Jan. 11, 2013, 6 pages.
Non-final Office Action for U.S. Appl. No. 12/952,912 mailed Dec. 28, 2012, 9 pages.
Non-final Office Action for U.S. Appl. No. 12/953,118 mailed Jan. 7, 2013, 9 pages.
Non-final Office Action for U.S. Appl. No. 12/953,536 mailed Jan. 2, 2013, 20 pages.
Non-final Office Action for U.S. Appl. No. 12/707,889 mailed Jan. 2, 2013, 7 pages.
European Search Report for patent application 10790017.7 mailed Nov. 8, 2012, 7 pages.
Examination Report for European patent application 09789090.9-2216 mailed Aug. 29, 2011, 4 pages.
Examination Report for European patent application 09789090.9-2216 mailed Mar. 30, 2012, 6 pages.
Written Opinion of the International Searching Authority for International patent application PCT/US2009004548, mailed Apr. 5, 2011, 6 pages.
European Search Report for European patent application 09789090.9-2217 mailed Jan. 24, 2013, 5 pages.
Non-final Office Action for U.S. Appl. No. 12/946,139 mailed Jul. 26, 2012, 12 pages.

(56) References Cited

OTHER PUBLICATIONS

Final Office Action for U.S. Appl. No. 12/946,139 mailed Feb. 15, 2013, 17 pages.
Non-final Office Action for U.S. Appl. No. 12/751,884 mailed Feb. 15, 2013, 5 pages.
Non-final Office Action for U.S. Appl. No. 12/394,114 mailed Feb. 27, 2013, 8 pages.
Non-final Office Action for U.S. Appl. No. 12/819,065 mailed Mar. 4, 2013, 7 pages.
Final Office Action for U.S. Appl. No. 12/952,960 mailed Mar. 7, 2013, 13 pages.
Notice of Allowance for U.S. Appl. No. 12/732,487 mailed Mar. 19, 2013, 11 pages.
Non-final Office Action for U.S. Appl. No. 12/953,134 mailed Mar. 21, 2013, 9 pages.
Final Office Action for U.S. Appl. No. 12/641,617 mailed May 10, 2013, 21 pages.
Notice of Allowance for U.S. Appl. No. 13/090,621 mailed Apr. 22, 2013, 8 pages.
Final Office Action for U.S. Appl. No. 12/953,039 mailed May 1, 2013, 8 pages.
Final Office Action for U.S. Appl. No. 12/953,118 mailed May 3, 2013, 11 pages.
Final Office Action for U.S. Appl. No. 12/915,682 mailed Apr. 18, 2013, 9 pages.
Advisory Action for U.S. Appl. No. 12/952,960 mailed May 15, 2013, 2 pages.
Non-final Office Action for U.S. Appl. No. 12/952,960 mailed Jun. 20, 2013, 13 pages.
Non-final Office Action for U.S. Appl. No. 12/953,536 mailed Jun. 6, 2013, 21 pages.
Non-final Office Action for U.S. Appl. No. 11/820,300 mailed Apr. 25, 2012, 10 pages.
Final Office Action for U.S. Appl. No. 12/871,052 mailed Jul. 1, 2013, 12 pages.
Non-final Office Action for U.S. Appl. No. 12/940,699 mailed Jun. 26, 2013, 9 pages.
Notice of Allowance for U.S. Appl. No. 13/090,621 mailed Jun. 25, 2013, 8 pages.
Non-final Office Action for U.S. Appl. No. 12/956,475 mailed Oct. 4, 2012, 7 pages.
Non-final Office Action for U.S. Appl. No. 13/302,067 mailed Jun. 7, 2013, 13 pages.
Final Office Action for U.S. Appl. No. 12/771,473 mailed Jul. 19, 2013, 7 pages.
Notice of Allowance for U.S. Appl. No. 12/751,884 mailed Jul. 17, 2013, 8 pages.
Non-final Office Action for U.S. Appl. No. 12/940,585 mailed Aug. 16, 2013, 14 pages.
Final Office Action for U.S. Appl. No. 12/953,134 mailed Aug. 23, 2013, 11 pages.
Ex parte Quayle Action for U.S. Appl. No. 12/953,164 mailed Aug. 16, 2013, 5 pages.
Non-final Office Action for U.S. Appl. No. 12/732,487 mailed Jul. 17, 2013, 22 pages.
Advisory Action for U.S. Appl. No. 12/953,039 mailed Jul. 12, 2013, 3 pages.
Advisory Action for U.S. Appl. No. 12/953,118 mailed Jul. 12, 2013, 3 pages.
Advisory Action for U.S. Appl. No. 12/641,617 mailed Jul. 29, 2013, 3 pages.
Advisory Action for U.S. Appl. No. 12/771,473 mailed Oct. 2, 2013, 3 pages.
Final Office Action for U.S. Appl. No. 12/952,912 mailed Aug. 30, 2013, 15 pages.
Notice of Allowance for U.S. Appl. No. 12/641,617 mailed Sep. 4, 2013, 9 pages.
Non-final Office Action for U.S. Appl. No. 12/956,446 mailed Dec. 5, 2014, 12 pages.
Advisory Action for U.S. Appl. No. 13/663,975 mailed Dec. 24, 2014, 7 pages.
Final Office Action for U.S. Appl. No. 12/394,114 mailed Oct. 31, 2014, 10 pages.
Non-final Office Action for U.S. Appl. No. 12/940,699 mailed Oct. 28, 2014, 9 pages.
Non-final Office Action for U.S. Appl. No. 12/953,039 mailed Nov. 12, 2014, 8 pages.
Notice of Allowance for U.S. Appl. No. 12/952,960 mailed Nov. 10, 2014, 7 pages.
Notice of Allowance for U.S. Appl. No. 13/081,856 mailed Oct. 29, 2014, 10 pages.
Notice of Allowance for U.S. Appl. No. 13/833,876 mailed Nov. 7, 2014, 7 pages.
Advisory Action for U.S. Appl. No. 13/901,074 mailed Nov. 24, 2014, 3 pages.
Notice of Allowance for U.S. Appl. No. 12/751,895 mailed Nov. 19, 2014, 8 pages.
Advisory Action for U.S. Appl. No. 12/394,114 mailed Jan. 16, 2015, 3 pages.
Notice of Allowance and Examiner-Initiated Interview Summary for U.S. Appl. No. 12/947,883 mailed Jan. 13, 2015, 11 pages.
Non-final Office Action for U.S. Appl. No. 12/818,986 mailed Jan. 5, 2015, 21 pages.
Notice of Allowance for U.S. Appl. No. 13/649,417 mailed Jan. 8, 2015, 7 pages.
Non-final Office Action for U.S. Appl. No. 12/946,217 mailed Dec. 29, 2014, 50 pages.
Notice of Allowance and Examiner-Initiated Interview Summary for U.S. Appl. No. 12/940,585 mailed Feb. 27, 2015, 16 pages.
Notice of Allowance for U.S. Appl. No. 12/953,101 mailed Feb. 20, 2015, 9 pages.
Final Office Action for U.S. Appl. No. 12/953,003 mailed Feb. 12, 2015, 14 pages.
Final Office Action for U.S. Appl. No. 12/953,039 mailed Feb. 23, 2015, 9 pages.
Notice of Allowance for U.S. Appl. No. 13/688,675 mailed Jan. 26, 2015, 7 pages.
Final Office Action for U.S. Appl. No. 12/819,065 mailed Mar. 12, 2015, 13 pages.
Examiner's Answer to the Appeal Brief for U.S. Appl. No. 12/946,139 mailed Feb. 5, 2015, 12 pages.
Notice of Allowance for U.S. Appl. No. 12/707,889 mailed Feb. 17, 2015, 7 pages.
Non-final Office Action for U.S. Appl. No. 13/081,856 mailed Feb. 9, 2015, 8 pages.
Non-final Office Action for U.S. Appl. No. 13/952,014 mailed Jul. 30, 2015, 9 pages.
Non-final Office Action for U.S. Appl. No. 12/956,446 mailed Jul. 31, 2015, 14 pages.
Non-final Office Action for U.S. Appl. No. 12/394,114 mailed Aug. 12, 2015, 8 pages.
Non-final Office Action for U.S. Appl. No. 12/953,039 mailed Sep. 3, 2015, 8 pages.
Final Office Action for U.S. Appl. No. 13/081,856 mailed Sep. 8, 2015, 10 pages.
Examiner's Answer to the Appeal Brief for U.S. Appl. No. 13/663,975 mailed Oct. 5, 2015, 14 pages.
Non-final Office Action for U.S. Appl. No. 12/819,065 mailed Aug. 26, 2015, 13 pages.

* cited by examiner

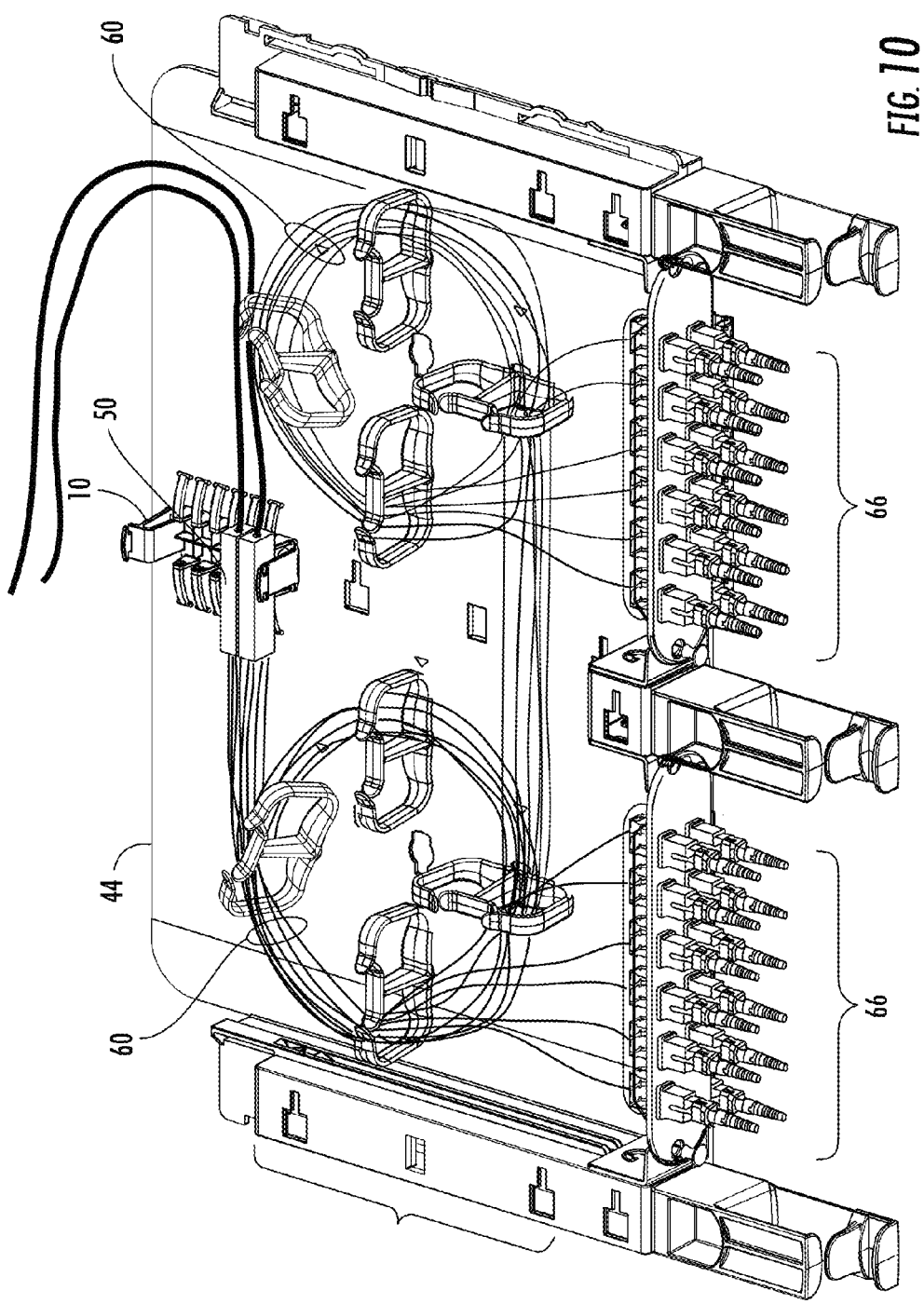

FIBER BODY HOLDER AND STRAIN RELIEF DEVICE

CROSS-REFERENCE TO RELATED APPLICATIONS

This application is a continuation of International Application No. PCT/US11/62353 filed Nov. 29, 2011, which claims the benefit of priority to U.S. Application No. 61/418,106, filed Nov. 30, 2010, both applications being incorporated herein by reference.

This application is related to co-pending U.S. patent application Ser. No. 12/940,585, filed Nov. 5, 2010, the disclosure of which is relied upon and incorporated herein by reference in its entirety.

This application is related to co-pending U.S. patent application Ser. No. 12/940,699, filed Nov. 5, 2010, the disclosure of which is relied upon and incorporated herein by reference in its entirety.

BACKGROUND

1. Field of the Disclosure

The disclosure relates to an optical fiber body holder, and more particularly to a fiber body holder that is toolessly, removably attachable to fiber optic equipment, is stackable with other fiber body holders, and provides strain relief for optical fibers. The fiber body holder removably attaches to the fiber optic equipment via an attachment feature, and includes a retainer assembly to toolesslly, releasably retain fiber bodies. The fiber body holder may be configured such that another fiber body holder may be toolessly, removably attached to the fiber body holder in a stacked orientation, thereby, expanding the capacity for the fiber optic equipment to releasably retain fiber bodies.

2. Technical Background

Benefits of optical fiber include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point.

One of the concerns in working with or installing optical fiber is the delicate nature of certain of the smaller diameter optical fiber, for example 250 μm fiber. This diameter of fiber is typically encountered in outside plant and other loose tube applications. Often this size fiber is spliced to another like fiber which can entail large loops of slack of this small diameter fiber. To help with this, installers often use a "fan-out body" which is a component in which, as an example, a 250 μm fiber may be inserted into a 900 μm fiber sleeve, thereby increasing the diameter of the workable fiber. Other types of fan-out bodies are available, including without limitation, one that may be used to convert 900 μm fibers to a ribbon cable. Additionally, other types of fiber bodies, for example, furcation bodies, may be used. Furcation bodies furcate, or separate, individual optical fibers from a fiber optic cable.

SUMMARY

Embodiments disclosed in the detailed description include a fiber optic apparatus for holding fiber bodies. The fiber optic apparatus includes a retainer assembly having at least one retainer configured to toolessly, releasably retain a fiber body, and an attachment feature configured to toolessly, removably attach the retainer assembly. The at least one retainer is configured to releasably retain the fiber body via mounting bosses on the fiber body. The at least one retainer may have a channel configured to receive at least one of the mounting bosses of the fiber body. The channel may have opposing sides. Each side of the opposing sides may have at least one retaining dimple adapted to releasably retain the mounting boss in the channel. The retaining dimple may insert into a passage formed in the mounting boss, or may position adjacent to the mounting boss to restrict the mounting boss from releasing from the channel. The mounting bosses may friction fit between the opposing sides. At least one rubber insert may be configured to receive and releasably retain the mounting bosses. The at least one rubber insert may attach to at least one of the sides and extend between the opposing sides. The at least one rubber insert may be a first rubber insert and a second rubber insert. The first rubber insert may attach to and extend from one side, and the second rubber insert may attach to and extend from the other side. The first rubber insert and the second rubber insert may be configured to releasably retain the mounting boss between the first rubber insert and the second rubber insert.

A stacking feature may be configured to removably attach a second retainer assembly to the retainer assembly via an attachment feature configured to removably attach the second retainer assembly. The stacking feature and the attachment feature configured to removably attach the second retainer assembly may form a hinge. A stand-off may be configured to raise the at least one retainer above a mounting surface when the retainer assembly is removably attached to the mounting surface. A support may be configured to support a stand-off of a second retainer assembly when the second retainer assembly is removably attached to the retainer assembly. The retainer assembly and the second retainer assembly may be similarly constructed. The retainer assembly and the second retainer assembly may be interchangeable.

The fiber optic apparatus may include a bracket with the attachment feature connected to the bracket. The bracket has a first side and a second side. The first side and the second side are connected to form an L shape. The bracket is toolesslly, removably attachable to a mounting surface in a first orientation by the first side, and toolessly, removably attachable to the mounting surface in the second orientation by the second side. The retainer assembly may be toolessly, removably attachable to the bracket, and, thereby, to the mounting surface by the attachment feature at the first side. The retainer assembly may be toolessly, removably attachable to the bracket, and, thereby, to the mounting surface by an attachment feature at the second side.

At least one fastener may be included and adapted to receive at least one of a tie wrap and a Velcro strap. The at least one fastener may be an arm. The at least one fastener may be an aperture. The at least one retainer may be configured to releasably retain one or more optical fibers to strain relief the one of more optical fibers.

Embodiments disclosed in the detailed description include a first retainer assembly having at least one retainer configured to toolessly, releasably retain a fiber body, and a second retainer assembly having at least one retainer configured to toolessly, releasably retain a fiber body. The fiber optic assembly may include a first attachment feature configured to toolessly, removably attaching the first retainer assembly, and a second attachment feature configured to toolessly, removably attaching the second retainer assembly. A first stacking feature may be configured to toolessly, removably attach the second retainer assembly to the first retainer assembly via the second attachment feature. The first attachment feature may removably attach the first retainer assembly to a mounting surface. The mounting surface may be fiber optic equipment. The fiber optic equipment may be a shelf mounted to a chassis in a fiber optic equipment rack.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 10 is a top, perspective view of the retainer assembly and the attachment feature of FIG. 1 with a fiber body retained in the retainer assembly and with other components and optical fibers;

FIG. 11 is a top perspective view of an exemplary embodiment of a retainer assembly and an attachment feature;

DETAILED DESCRIPTION

Figure 1:
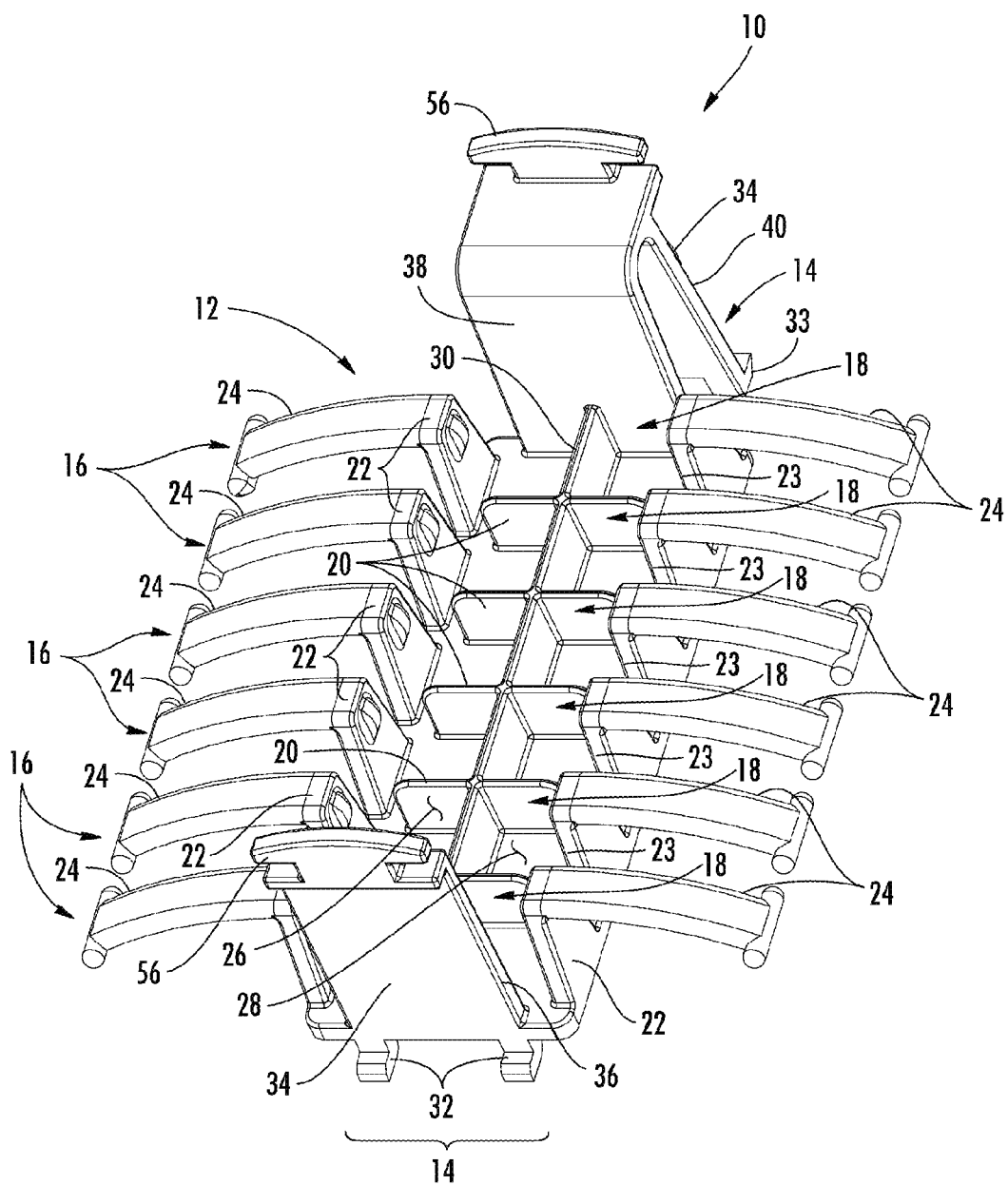
FIG. 1 is a top perspective view of an exemplary embodiment of a retainer assembly and an attachment feature.

Reference will now be made in detail to the present preferred embodiment(s), examples of which are illustrated in the accompanying drawings. Whenever possible, the same reference numerals will be used throughout the drawings to refer to the same or like parts.

As used herein, the terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated.

The designation "U" refers to a standard equipment shelf size of a fiber optic equipment rack or a cabinet. This may also be referred to as "RU." For example, an equipment rack may support 42 1U-sized shelves, with "U" equal to a standard 1.75 inches in height and nineteen (19) inches in width. In certain applications, the width of "U" may be twenty-three (23) inches. Typically, the more rack space (the more "U's") a housing takes up, the higher the fiber capacity in the housing. It is often desirable from either a manufacturing standpoint or an installation standpoint to have the ability to conveniently convert from a 1U housing to a 2U housing.

Further, as used herein, the term "fiber body" shall be understood to mean and describe a fan-out body, a furcation body or device, strain relief device, and the like, including, without limitation, components that furcated, separate, en-sleeve, or in any manner combine or un-combine optical fibers with respect to other optical fibers, fiber optic cables, coverings or jackets, and/or clamp or retain one or more optical fibers or fiber optic cables.

FIGS. 1-24B illustrate exemplary embodiments of a fiber optic apparatus for use as a holder for fiber bodies. For purposes of describing the embodiments, the term "fiber body" shall be used herein and should be understood to mean and include, without limitation, furcation bodies, fan-out bodies, and the like. A fiber body holder may be toolessly and removably attached to a mounting surface, for example, fiber optic equipment, including 1U to 4U sized shelves and stackable shelves, and may be configured to hold and support one or more fiber bodies. The fiber body holder comprises a retainer assembly with a plurality of retainers each of which may be configured to releasably retain a fiber body. In this way, a technician may toolessly install a fiber body into and release a fiber body from the retainer without affecting other fiber bodies. Additionally, the fiber body holder comprises an attachment feature for removably attaching the retainer assembly to the mounting surface. The technician can remove from the fiber body holder from the mounting surface to install or release the fiber body from the retainer, or to relocate the fiber body holder on the mounting surface. Further, another fiber body holder may be toolessly removably attached to the fiber body holder, which may be in a stacked orientation.

In this regard, FIGS. 1-10 illustrate an exemplary embodiment of a fiber optic apparatus for use as a fiber body holder. The fiber body holder has a retainer assembly with at least one retainer formed as a channel disposed between extension members. The channel is configured to releasably retain a fiber body disposed therein via mounting bosses on the fiber body. An attachment feature connected to brackets comprising end sections provide for the ability of a technician toollessly to grip the fiber body holder and to attach the fiber body holder to and remove the fiber body holder from the mounting surface. If additional capacity is needed or desired to support additional fiber bodies, a stacking feature may be configured to removably attach a second retainer assembly by removably attaching a second fiber body holder on top of the fiber body holder.

FIG. 1 illustrates a top, perspective view of the embodiment of the fiber body holder 10. The fiber body holder 10 has a retainer assembly 12 and an attachment feature 14. In the embodiment shown in FIG. 1, the retainer assembly 12 has a plurality of retainers 16. Each retainer 16 has a channel 18 formed by end walls 20 and side walls 22. Spaces 23 between the side walls 22 allow the side walls 22 to flex which will be described in more detail below. Extension members 24 extending from the side walls 22. The end walls 24 are divided into first and second segments 26, 28 by a center wall 30 which intersects the end walls 24. The attachment feature 14 has tabs 32, 33 and is connected to bracket 34 comprising first and second end sections 36, 38, and latch 40. Latch 40 is resilient allowing a technician can grip the bracket 34 by the first end section 36 and the latch 40, squeeze the fiber body holder 10 between the first end section 36 and the latch 40 so that the tabs 32, 33 can be inserted into receivers disposed in a mounting surface (not shown) to toolessly, removably attach the fiber body holder 10, and, thereby, the retainer assembly 12, to the mounting surface. This will be described in more detail with reference to FIGS. 2 and 3, below.

Figure 2:
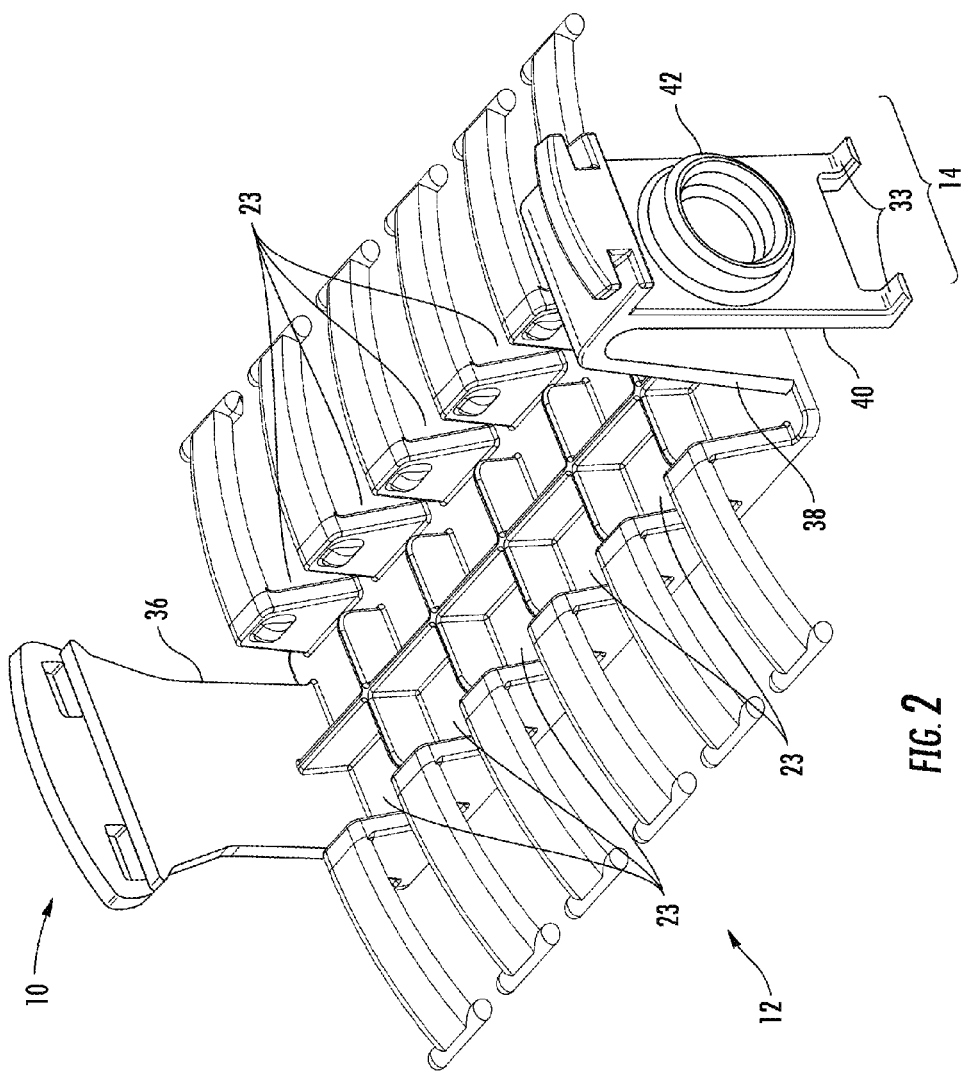
FIG. 2 is a reverse top, perspective view of the retainer assembly and the attachment feature of FIG. 1.

FIG. 2 illustrates a top, perspective view of the fiber body 10 from the perspective of second end section 38, which is a reverse perspective from that of FIG. 1. FIG. 2 is provided to illustrate release button 42 on latch 40. The release button 42 is provided for the technician to push as the technician is squeezing the fiber body holder 10 between the first end section 36 and the latch 40 as described above. This pivots the latch 40 and moves the tabs 33 on the latch 40 toward the second end section 38. The tabs 32 on the first end section 36 may be inserted in and retained by their respective receivers in the mounting surface first, with the tabs 33 on the latch 40 inserted in their respective receivers second. Due to its resiliency, the latch 40 will pivot back to its initial position when the technician releases the release button 42. This also causes the tabs 33 on the latch 40 to move back to their initial position, and thereby, being retained by their respective receivers. The fiber body holder 10, and, thereby, the retainer assembly 12, can be toolessly removed from the mounting surface by the technician pushing the release button 42 and removing the tabs 33 on the latch 40 from the mounting surface, and then removing the tabs 32 on the first end section 36 from the mounting surface.

Figure 3:
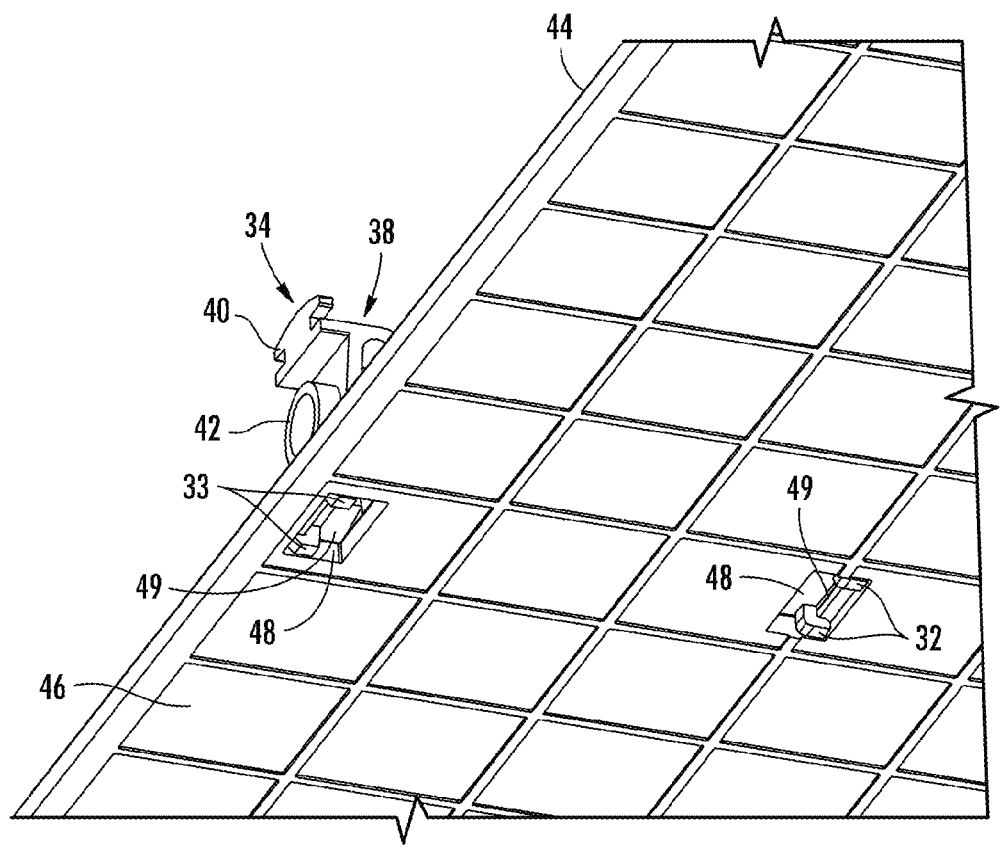
FIG. 3 is an underside perspective view of a mounting surface illustrating the attachment feature of FIG. 1 removably attaching the retainer assembly to the mounting surface.

FIG. 3 is a bottom perspective view of the mounting surface 44 illustrating the underside 46 of the mounting surface 44. In FIG. 3, tabs 32 on the first end section 36 and tabs 33 on the latch 40 are shown inserted in and being retained by a receivers 48. The receivers 48 may have a lip 49. The tabs 32, 33 may be inserted in the receiver 48 and moved so that the tabs 32, 33 friction fit against the lip 49. The tabs 32 and the tabs 33 are similarly designed such that they may be inserted and retained either of the receivers 48 shown in FIG. 3. In this way, the fiber body holder 10 can be oriented and located in different positions on mounting surface 44. Alternatively, the tabs 32 and the tabs 33 may be designed differently such that the fiber body holder 10 may be removably mounted to the mounting surface 44 in a certain orientation.

Figure 4:
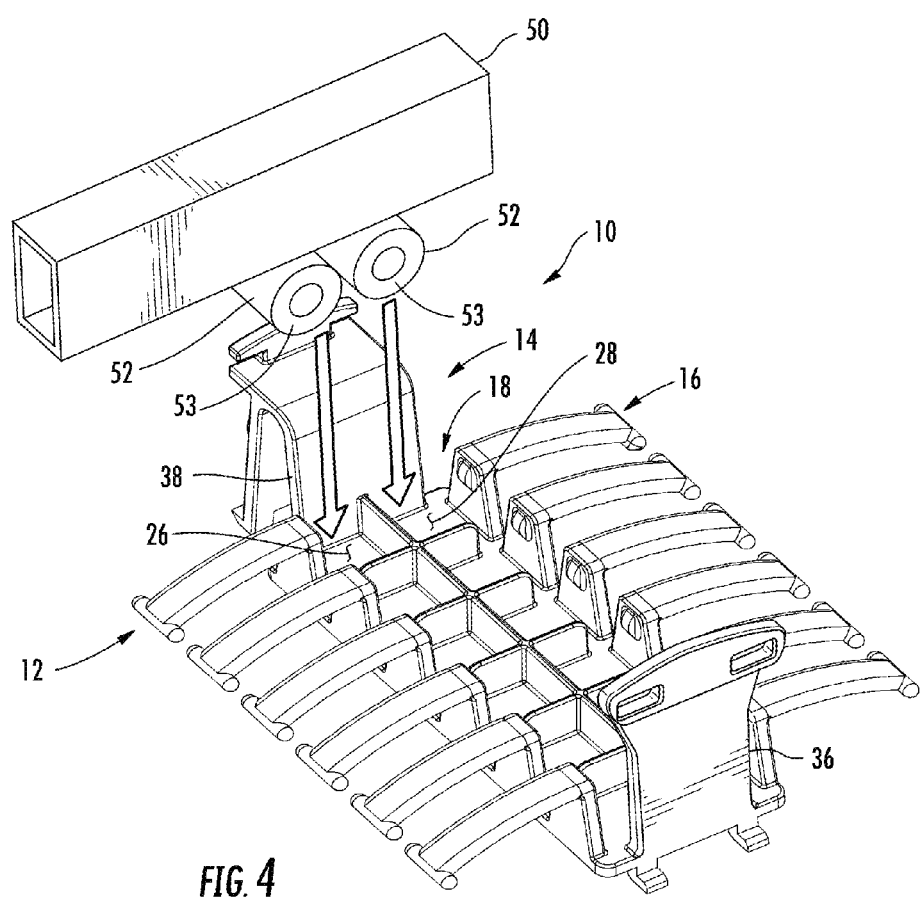
FIG. 4 is a top perspective, partially exploded view of the retainer assembly and the attachment feature of FIG. 1 with a fiber body.

FIG. 4 is a top, perspective view of the fiber body holder 10 with a fiber body 50 shown separate from the fiber body holder 10. The fiber body 50 would insert in the channel 18 of one of the retainers 16 of the retainer assembly 12. In FIG. 4, the fiber body 50 is shown as being inserted into the channel 18 closest to the second end section 38. The fiber body 50 may be inserted into the channel 18 in either of two opposite directions such that the optical fibers may fan out in either direction. Fiber bodies 50 may be inserted into the retainer assembly 12 starting with the channel 18 closest to the second end section 38 and, then, inserted into channels 18 sequentially progressing from the second end section 38 toward the first end section 36. When fiber bodies 50 are inserted in all of the retainers 16 of a fiber body holder 10, the fiber body holder may be considered full or fully loaded and additional fiber bodies would be inserted in retainers 16 of another fiber body holder 10. The fiber body 50 has two mounting bosses 52. One mounting boss 52 inserts into the first segment 26 of the channel 18 and the other mounting boss 52 inserts into the second segment 28 of the channel 18.

Figure 5:
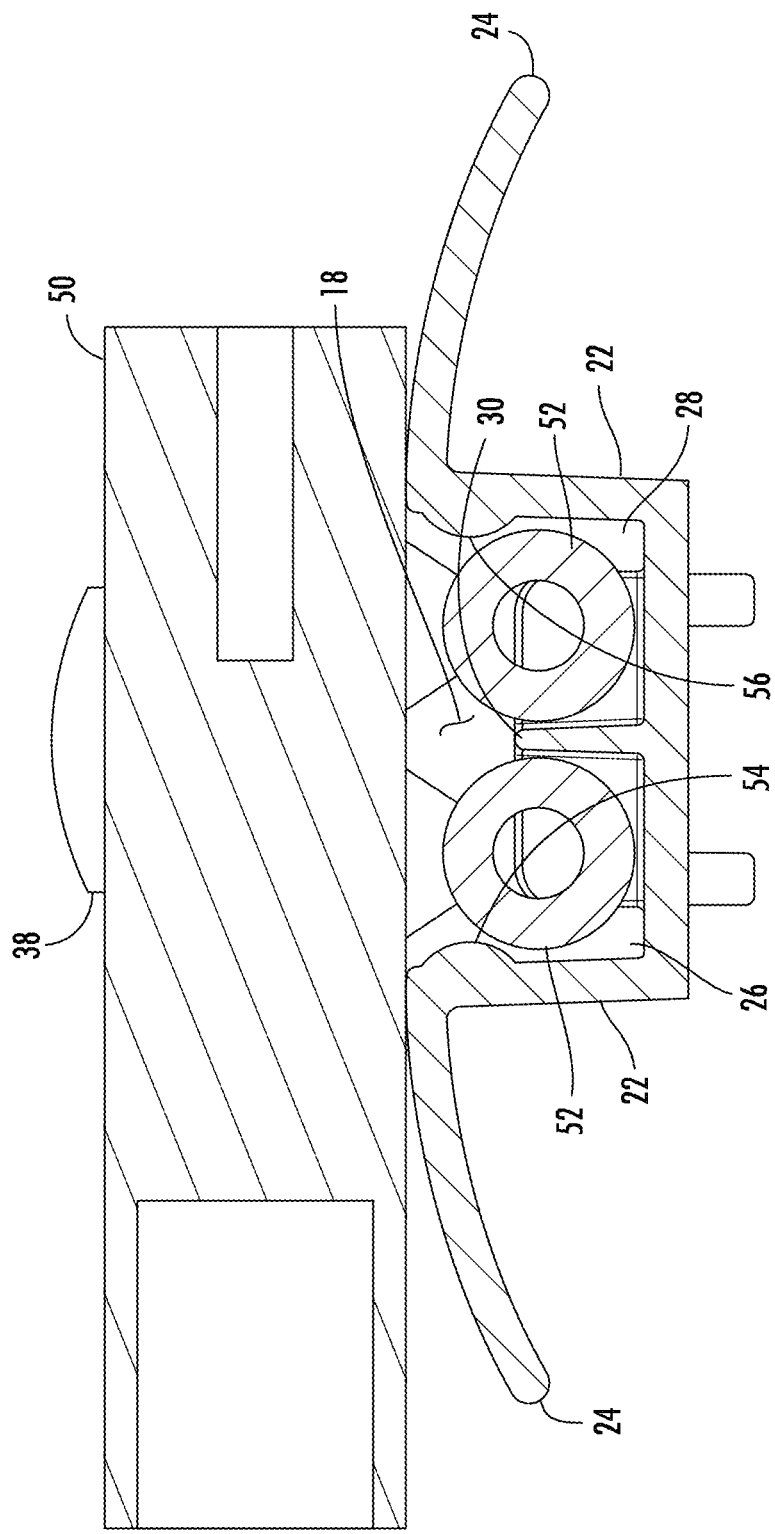
FIG. 5 is a side elevation, section cut view of a fiber body retained by a retainer of the retainer assembly and the attachment feature of FIG. 1.

FIG. 5 shows a section view of a fiber body 50 inserted in the retainer assembly 12 cut through the retainer 16. The mounting bosses 52 are shown inserted in first segment 26 and second segment 28 of the channel 18. As illustrated in FIG. 5, the side wall 22 of the first segment 26 has a first retaining dimple 54 and the side wall 22 of the second segment 28 has a second retaining dimple 56. As the fiber body 50 is being inserted in the retainer 16, the mounting bosses 52 put pressure on the retaining dimples 54, 56 forcing side walls 22 to flex outwardly. This allows the mounting bosses 52 to be inserted in the first segment 26 and the second segment 28. Once the mounting bosses 52 are inserted, the side walls 22 return to their initial positions causing the retaining dimples 54, 56 align adjacent to the mounting bosses 52 in such a way to retain the mounting bosses 52 in the first segment 26 and the second segment 28 of the channel 18. The mounting bosses 52 insert in the channel 18 with one mounting boss 52 on one side of the center wall 30 and the other mounting boss 52 on the other side of the center wall 30. In this way, the center wall 30 prevents the fiber body 50 from rotating. When the fiber body 50 is being removed from the retainer 16, the mounting bosses 52 again put pressure on the retaining dimples 54, 56 forcing side walls 22 to flex outwardly allowing the mounting bosses 52 to pass by the retaining dimples 54, 56 and be removed from the retainer 16. In this way, the retainer 16 may releasably retain the fiber body 50.

Figure 6:
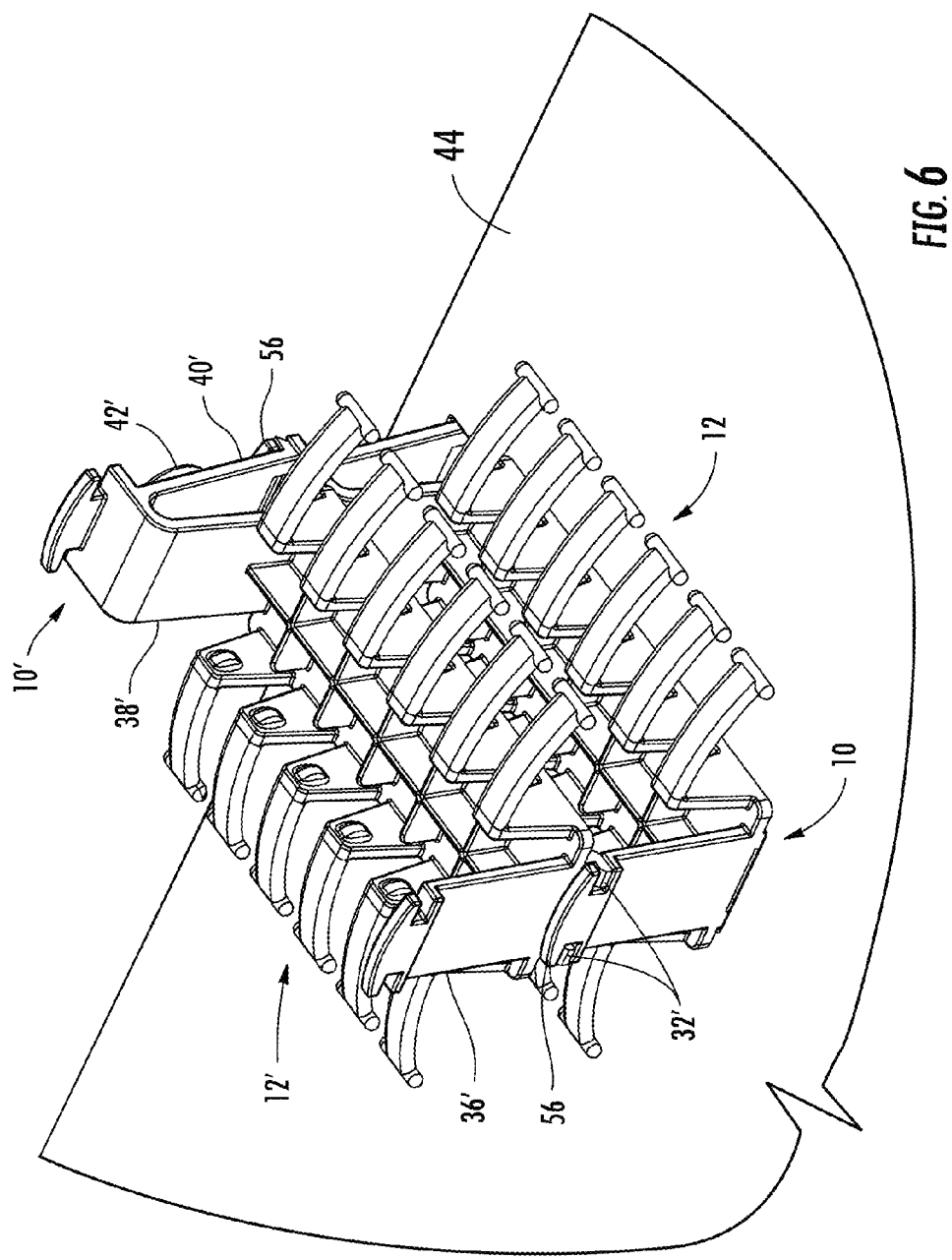
FIG. 6 is a top, perspective view of a second retainer assembly and an attachment feature stacked on top of the retainer assembly and the attachment feature of FIG. 1.

FIG. 6 illustrates the fiber body holder 10 with a second fiber body holder 10' having a second retainer assembly 12' removably attached to the fiber body holder 10 in a stacked orientation. The fiber body holder 10 is shown removably attached to a mounting surface 44. As mentioned above, when all of the retainers 16 of a fiber body holder 10 are releasably retaining fiber bodies 50, additional fiber body holders 10 may be provided for additional fiber bodies 50. One way to do this, as shown in FIG. 6, is for multiple fiber body holders 10 to be stacked on top of each other. For facilitate clarity in discussing FIG. 6, and to distinguish the fiber body holders, the fiber body holder attached to the mounting surface 44 will be referred to as the first fiber body holder 10. The fiber body holder removably attached to the first fiber body holder 10 will be referred to as the second fiber body holder 10'. In FIG. 6, the first fiber body holder 10 and the second fiber body holder 10' are shown as being of a similar design and construction. Thus, the description of the first fiber body holder 10 as set out herein, may also apply to the second fiber body holder 10'. However, it is not necessary that the first fiber body holder 10 and the second fiber body holder 10' be of the same design and construction.

Figure 7:
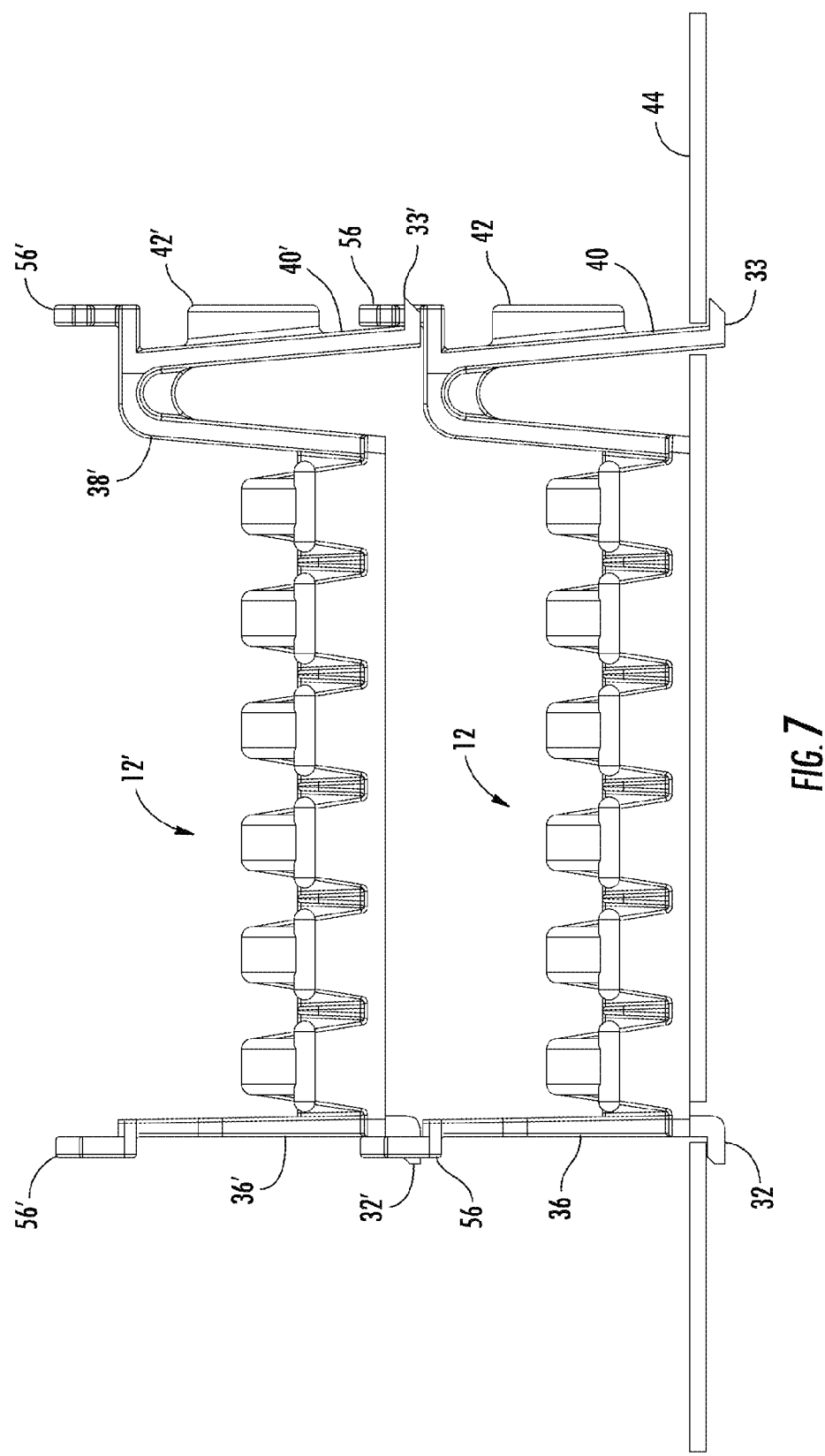
FIG. 7 is a side elevation view of a second retainer assembly and an attachment feature stacked on top of the retainer assembly and an attachment feature of FIG. 5.

FIG. 7 illustrates a side elevation of the second fiber body holder 10' removably attached to the first fiber body holder 10 in a stacked orientation. The first fiber body holder 10 has a stacking feature 56 on the first end section 36 and the second end section 38. The stacking feature 56 is configured to receive tabs 32' and 33' of the attachment feature 14' of the second fiber body holder 10'. Therefore, the second fiber body holder 10' may be removably attached to the first fiber body holder 10 in the same manner as the first fiber body holder 10 is removably attached to the mounting surface 44. In this regard, a release button 42' is provided for the technician to push as the technician is squeezing the fiber body holder 10' between the first end section 36' and the latch 40'. This pivots the latch 40' and moves the tabs 33' on the latch 40' toward the second end section 38'. The tabs 32' on the first end section 36' may be inserted in and retained by the stacking feature 56 connected to the first end section 36 of the of the first fiber body holder 10 first, with the tabs 33' on the latch 40' inserted in and retained by the stacking feature 56 connected to the second end section 38 of the of the first fiber body holder 10.

Due to its resiliency, the latch 40' will pivot back to its initial position when the technician releases the release button 42'. This also causes the tabs 33' on the latch 40' to move back to their initial position, and thereby, being retained by the stacking feature 56. The second fiber body holder 10', and, thereby, the second retainer assembly 12', can be removed from the first fiber body holder 10 by the technician pushing the release button 42' and removing the tabs 33' on the latch 40' from the stacking feature 56 of first fiber body holder 10, and then the tabs 32' on the first end section 36' from the stacking feature 56 of the first fiber body holder 10. Additionally, the second fiber body holder 10' has a stacking feature 56' which not only allows another fiber body holder to be removably attached to the second fiber body holder 10' in a further stacked orientation, but, also, makes the first fiber body holder 10 and the second fiber body holder 10' interchangeable.

Figure 8:
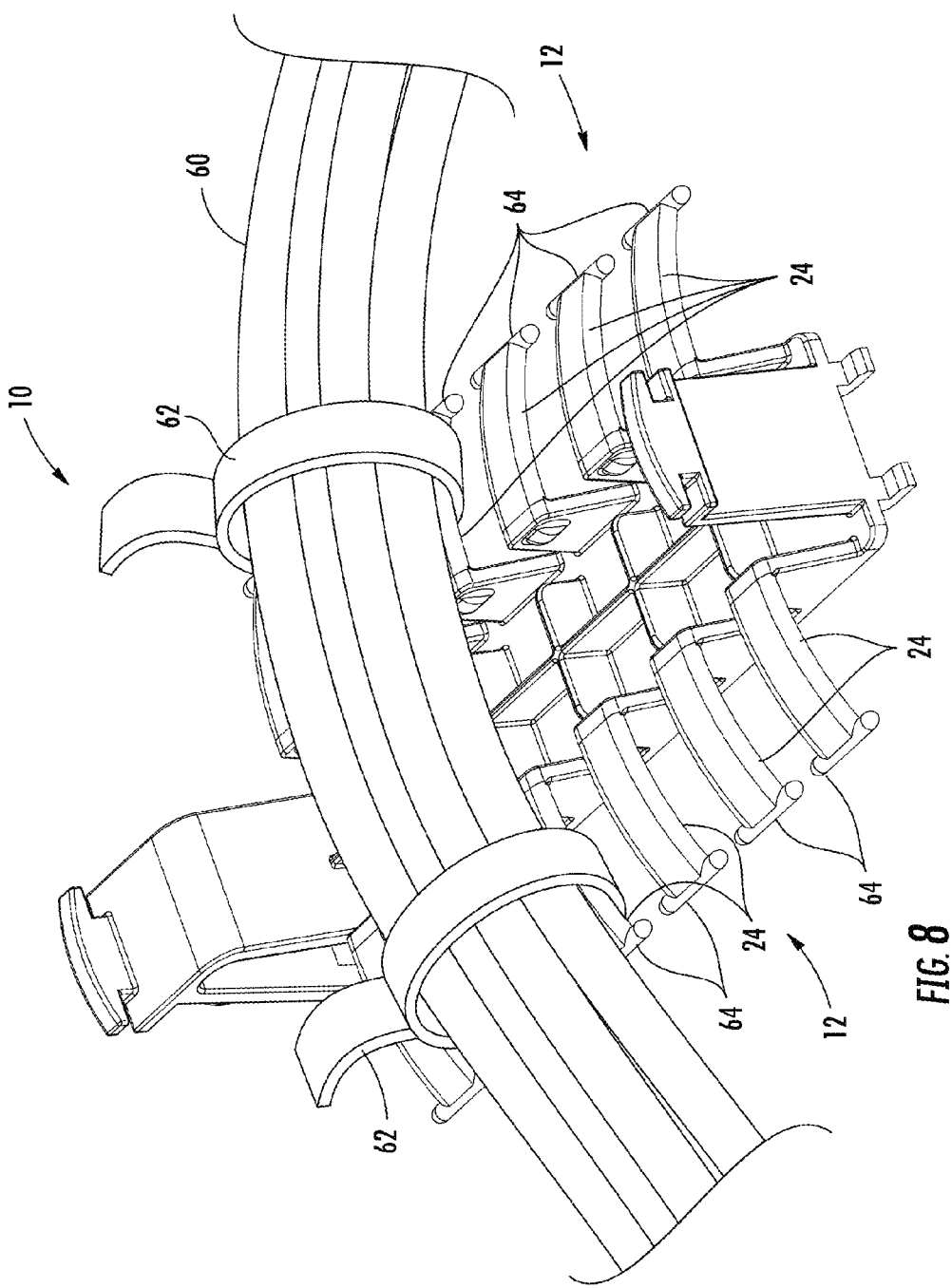
FIG. 8 is a top perspective view of the retainer assembly and the attachment feature of FIG. 1 with optical fibers strain relieved by a retainer.

FIG. 8 illustrates the fiber body holder 10 used to strain relief optical fibers 60. The extension members 24 may be used as fastening members. In this way the optical fibers 60 are attached to the extension members 24 using tie wraps 62. The extension members 24 are terminated by tie wrap retainers 64 which retain the tie wraps on the extension members 24 and inhibit the tie wraps 62 from slipping off of the extension members 24. Alternatively or additionally, Velcro may be used to attach the optical fibers to the extension members 24.

Figure 9:
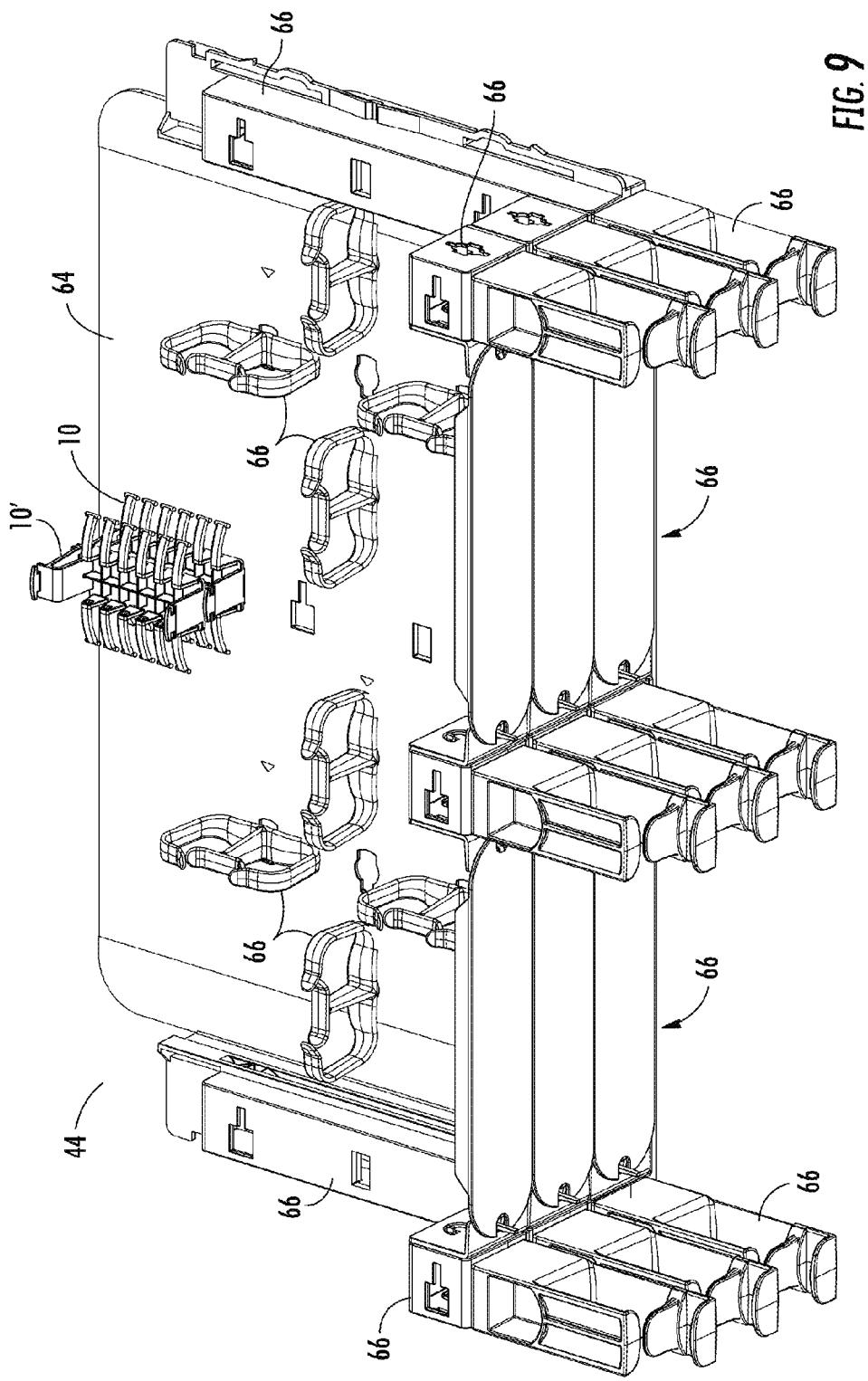
FIG. 9 is a top, perspective view of the second retainer assembly and the attachment feature stacked on top of the retainer assembly and the attachment feature of FIG. 5 removably attached to a fiber optic equipment shelf with other components.

FIG. 9 illustrates the mounting surface 44 as a shelf 64 of fiber optic equipment with the first fiber body holder 10 removably attached to the shelf 64 which may be a type of stackable shelf. The second fiber body holder 10' removably attached to the first fiber body holder 10. In FIG. 9, the shelf 64 is shown as having other fiber optic components 66. The other fiber optic components 66 may be any type of component, as examples, without limitation, adapters, splitters, fan-out devices, slack storage devices, strain relief devices, routing guides, and the like.

FIG. 10 illustrates the shelf 64 shown in FIG. 9 with a fiber optic body 50 being releasably retained by a fiber optic holder 10 removably attached to the shelf 64. Optical fibers 60 route to the fiber optic holder 50 the other fiber optic components 66. At one end, the optical fibers 60 routed to the fiber optic holder 50 may be a fiber optic cable, for example, a 900 µm fiber sleeve with multiple 250 µm optical fibers therein.

FIGS. 11-17 illustrate an exemplary embodiment of a fiber optic apparatus for use as a fiber body holder. The fiber body holder has a retainer assembly with at least one retainer having two channels. The channels are configured to releasably retain a fiber body disposed therein via mounting bosses on the fiber body. An attachment feature connected to a bracket provides for the ability of a technician to attach the fiber body holder to and remove the fiber body holder from the mounting surface. If additional capacity is needed or desired to support additional fiber bodies, a stacking feature may be configured to removably attach a second retainer assembly by removably attaching a second fiber body holder on top of the fiber body holder.

FIG. 11 illustrates a top, perspective view of the embodiment of the fiber body holder 100. The fiber body holder 100 has a retainer assembly 112 and an attachment feature 114. In the embodiment shown in FIG. 11, the retainer assembly 112 has a plurality of retainers 116. Each retainer 116 has a first channel 118 and a second channel 120. The first channel 118 is defined by first end wall 122 and first side wall 124. The second channel 120 is defined by second end wall 126 and second side wall 128. The attachment feature 114 has a flange 130 and a protrusion 132 and is connected to bracket 134. At least one retaining dimple 136 protrudes from the first side wall 124 and the second side wall 128 into the first channel 118 and the second channel 120, respectively. In FIG. 11, four retaining dimples 136 protrude into each of the first channels 118 and the second channels 120 with a two of the four retaining dimples 136 opposite each other to form two opposing pairs of retaining dimples 136 for each first channel 118 and each second channel 120. Stand-offs 140 raise the retainer assembly 112 a certain distance above a mounting surface (not shown in FIG. 11). Supports 142 support the stand-offs of a second fiber body holder which may be removably attached to the fiber body holder 100 as will be discussed below. Apertures 144 defined by the first end walls 122 and second end walls 126 separate the first channels 118 and the second channels 120. A stacking feature 146 having a receiver 148 allows the removable attachment of another fiber body holder to the fiber body holder 100.

Figure 12:
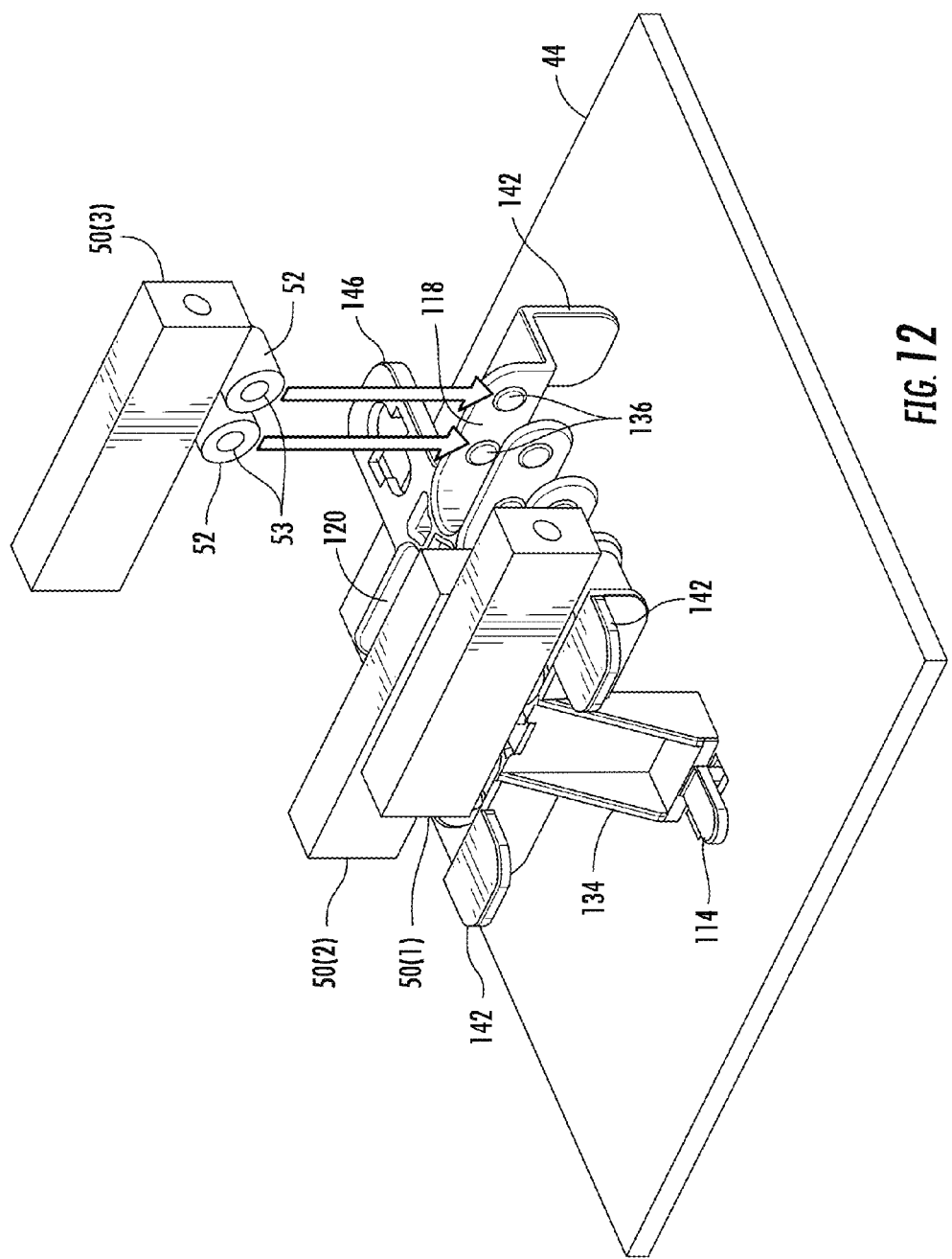
FIG. 12 is a top perspective, partially exploded view of the retainer assembly and an attachment feature removably attaching the retainer assembly to a mounting surface and with fiber bodies retained in the retainer assembly and one fiber body separated therefrom.

FIG. 12 illustrates the fiber body holder 100 removably attached to a mounting surface 44. Two fiber bodies 50(1), 50(2) are shown releasably retained by the retainers 116. The fiber body 50(1) is shown inserted in the first channel 118 of one of the retainers 116, and the fiber body 50(2) is shown in a reverse orientation and inserted in the second channel 120 of another retainer 116. Fiber body 50(3) is shown separate from the fiber body holder 100. The fiber body 50(3) would insert in the first channel 118 of another one of the retainers 116. Each mounting boss 52 of the fiber body 50(3) aligns with an opposing pair of retaining dimples 136. Only one retaining dimple 136 from each opposing pair of retaining dimples 136 is shown in FIG. 12.

The first side walls 124 and the second side walls 128 are resilient. When the fiber body 50 is inserted in the first channel 118 or the second channel 120 the mounting bosses 52 put pressure on the retaining dimples 136 which forces the first side walls 124 or the second side walls 128, as the case may be, to flex. This widens the first channel 118 and/or the second channel 120 allowing the mounting bosses 52 to be inserted in the first channel 118 and/or the second channel 120. When the passage 53 through the mounting bosses 52 reaches the retaining dimples 136, each of pair of opposing retaining dimples 136 positions in respective opposite ends of the passage 53. The first side walls 124 and the second side walls 128 then flex back toward their initial positions. In this way, the retaining dimples 136 retain the mounting boss 52 in the first channel 118 and/or the second channel 120, as the case may be, and, thereby, releasably retain the fiber body 50 in the retainer 116. When the fiber body 50 is being removed from the retainer 116, the mounting bosses 52 put pressure the retaining dimples 136 forcing the retaining dimples 136 out of the respective opening in the passage 53, which forces the first side walls 126 and/or the second side walls 128 to flex outwardly allowing the mounting bosses 52 to be removed from the first and/or second channel 118, 120. In this way, the retainer 16 may releasably retain the fiber body 50.

Figure 13:
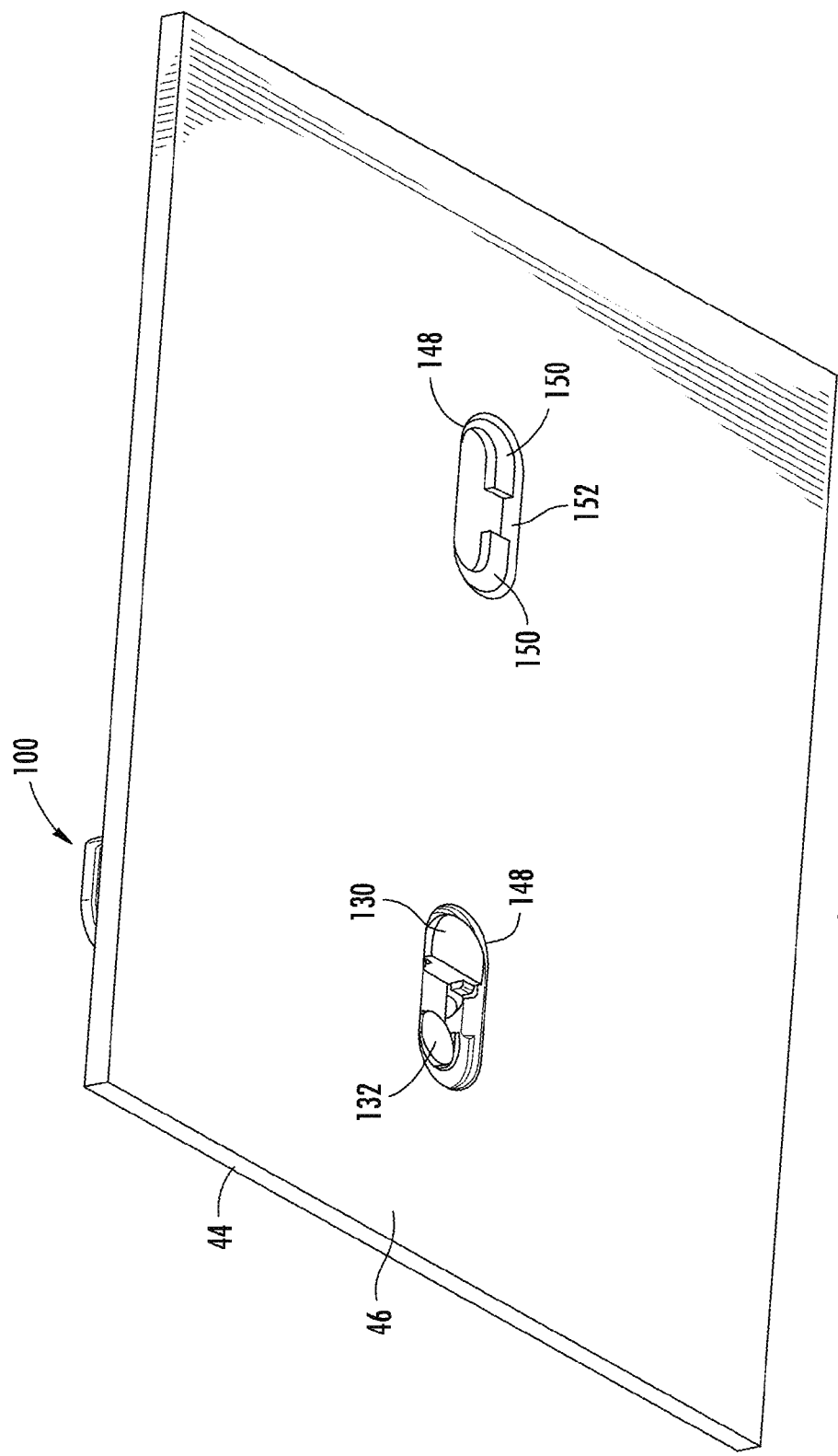
FIG. 13 is an underside perspective view of the mounting surface illustrating the attachment feature of FIG. 12 removably attaching the retainer assembly to the mounting surface.

FIG. 13 illustrates a bottom perspective view of the mounting surface 44 showing the underside 46 of the mounting surface 44. In FIG. 13 two receivers 148 are shown. One receiver 148 has an attachment feature 114 inserted therein, while the other receiver 144 does not. As shown by the receiver 144 without an attachment feature 114, the receiver has a segmented lip 150 extending at least partially around the perimeter of the receiver 144 and indented from the underside 46 of the mounting surface 44. A slot 152 separates the segments of the lip 150. The attachment feature 114 inserts in the receiver 148 by first inserting the flange 130 in the slot 152 and moving the flange 130 over one of the segments of the lip 150. The lip 150 then positions in a notch 154 formed by the flange 130. When the flange 130 is positioned over the lip 150, the protrusion 132 is positioned against the other segment of the lip 150 and friction fits against the lip 150. The flange 130 and the protrusion 132 may be inserted at either segment of the lip 150 allowing the fiber body holder 100 to be removably attached to the mounting surface 44 in two orientations with respect to each receiver 148.

Figure 14:
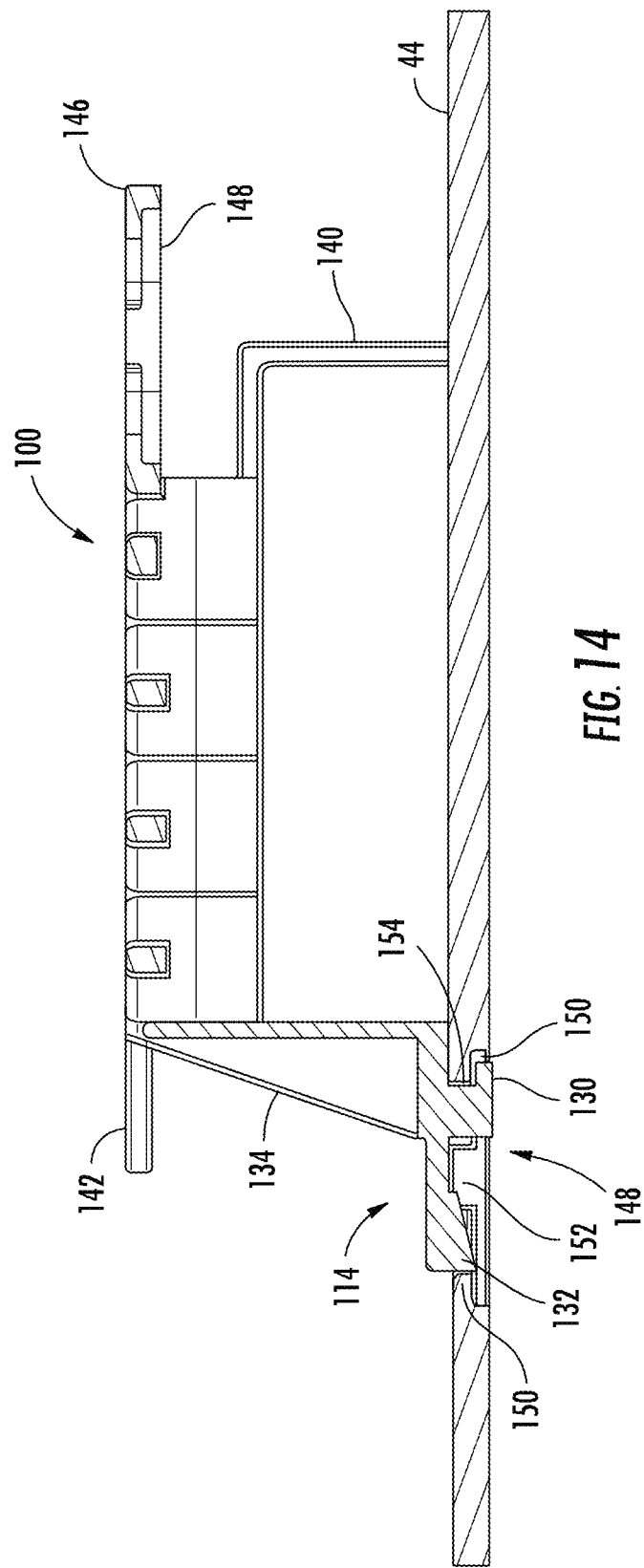
FIG. 14 is a side elevation view of a section cut of the retainer assembly, the attachment feature and the mounting surface of FIG. 12.

FIG. 14 illustrates is a side elevation view of the fiber body holder 100 removably attached to a mounting surface 44 using the attachment feature 114. In FIG. 14, a segment of the lip 150 is shown positioned in the notch 154 formed by the flange 130. The protrusion 132 is friction fit against the other segment of the lip 150. The stand-offs 140 provide raised support for the fiber body holder 100 allowing clearance of the retainer assembly 112 from the mounting surface 44. To remove the fiber body holder 100 from the mounting surface 44, the protrusion 132 is forced out from against the segment of the lip 150, and the flange 130 is then moved toward the slot 152. The attachment feature 114 may then be removed from the receiver 148.

Figure 15:
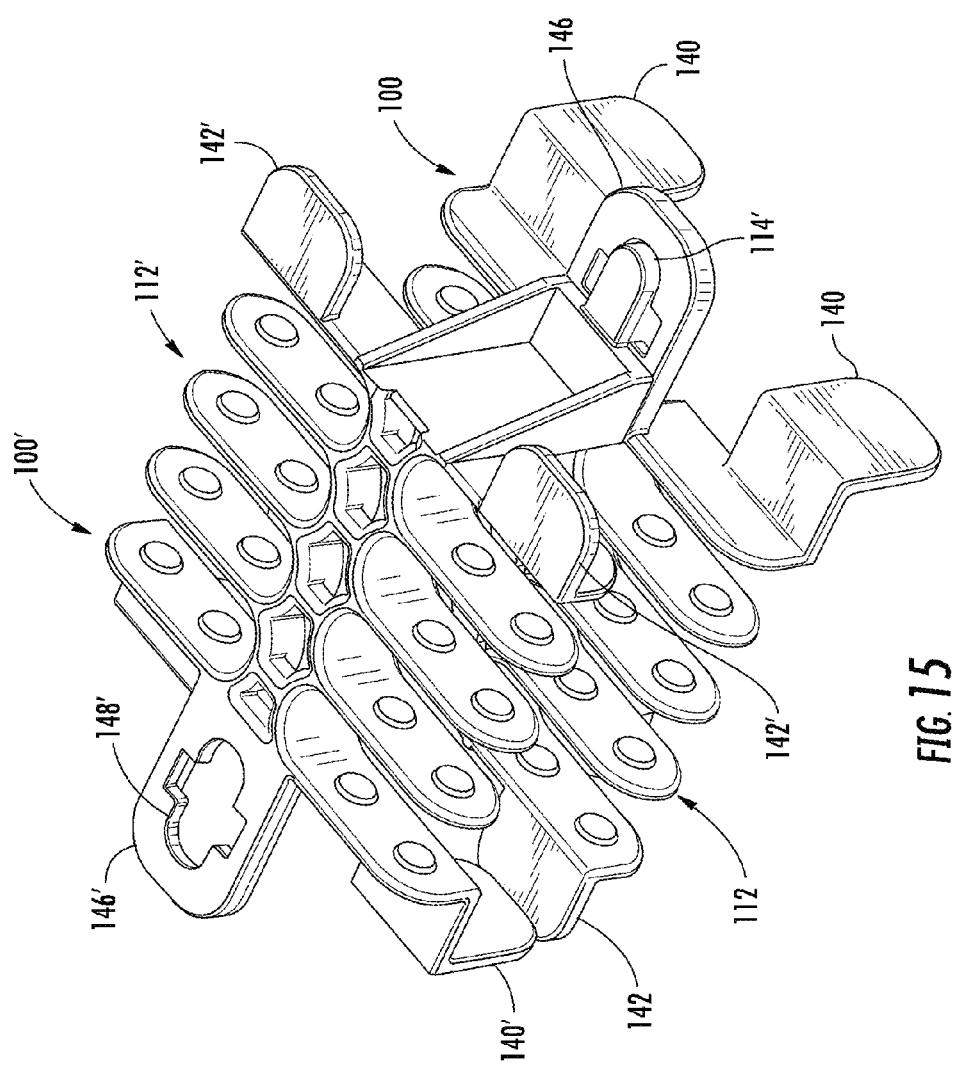
FIG. 15 is a reverse top, perspective view of a second retainer assembly and an attachment feature stacked on top of the retainer assembly and the attachment feature of FIG. 11.

FIG. 15 illustrates the fiber body holder 100 with a second fiber body holder 100' having a second retainer assembly 112' removably attached to the fiber body holder 100 in a stacked orientation. As mentioned above, when all of the retainers 116 of a fiber body holder 100 are releasably retaining fiber bodies 50, additional fiber body holders 100 may be provided for additional fiber bodies 50. One way to do this, as shown in FIG. 15, is for multiple fiber body holders 100 to be stacked on top of each other. To facilitate clarity in discussing FIG. 15, and to distinguish the fiber body holders, the bottom fiber body holder will be referred to as the first fiber body holder 100. The fiber body holder removably attached to the first fiber body holder 100 will be referred to as the second fiber body holder 100'. In FIG. 15, the first fiber body holder 100 and the second fiber body holder 100' are shown as being of a similar design and construction. Thus, the description of the first fiber body holder 100 as set out herein, may also apply to the second fiber body holder 100'. However, it is not necessary that the first fiber body holder 100 and the second fiber body holder 100' be of the same design and construction.

Figure 16:
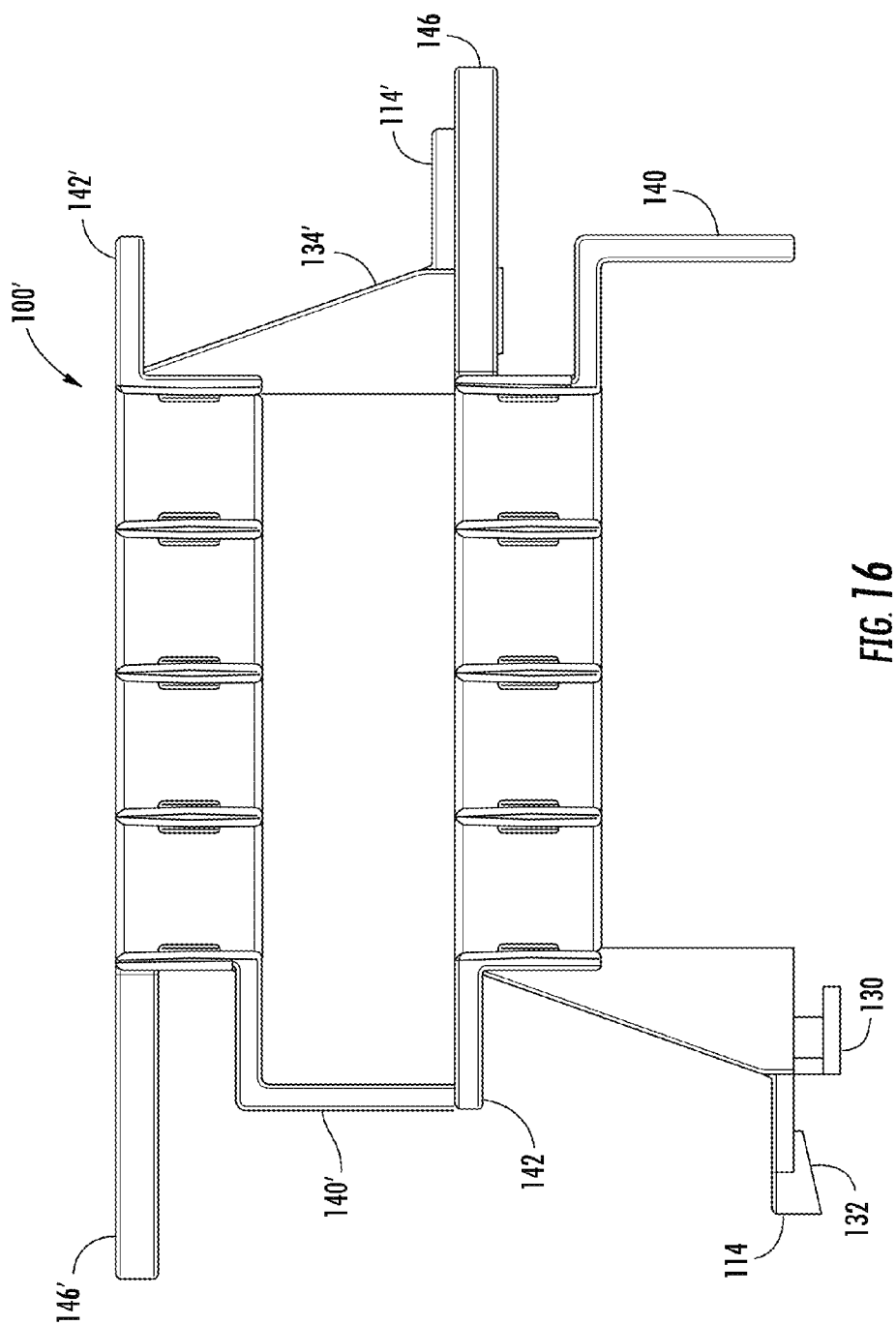
FIG. 16 is a side elevation view of a second retainer assembly and an attachment feature stacked on top of the retainer assembly and an attachment feature of FIG. 15.
Figure 17:
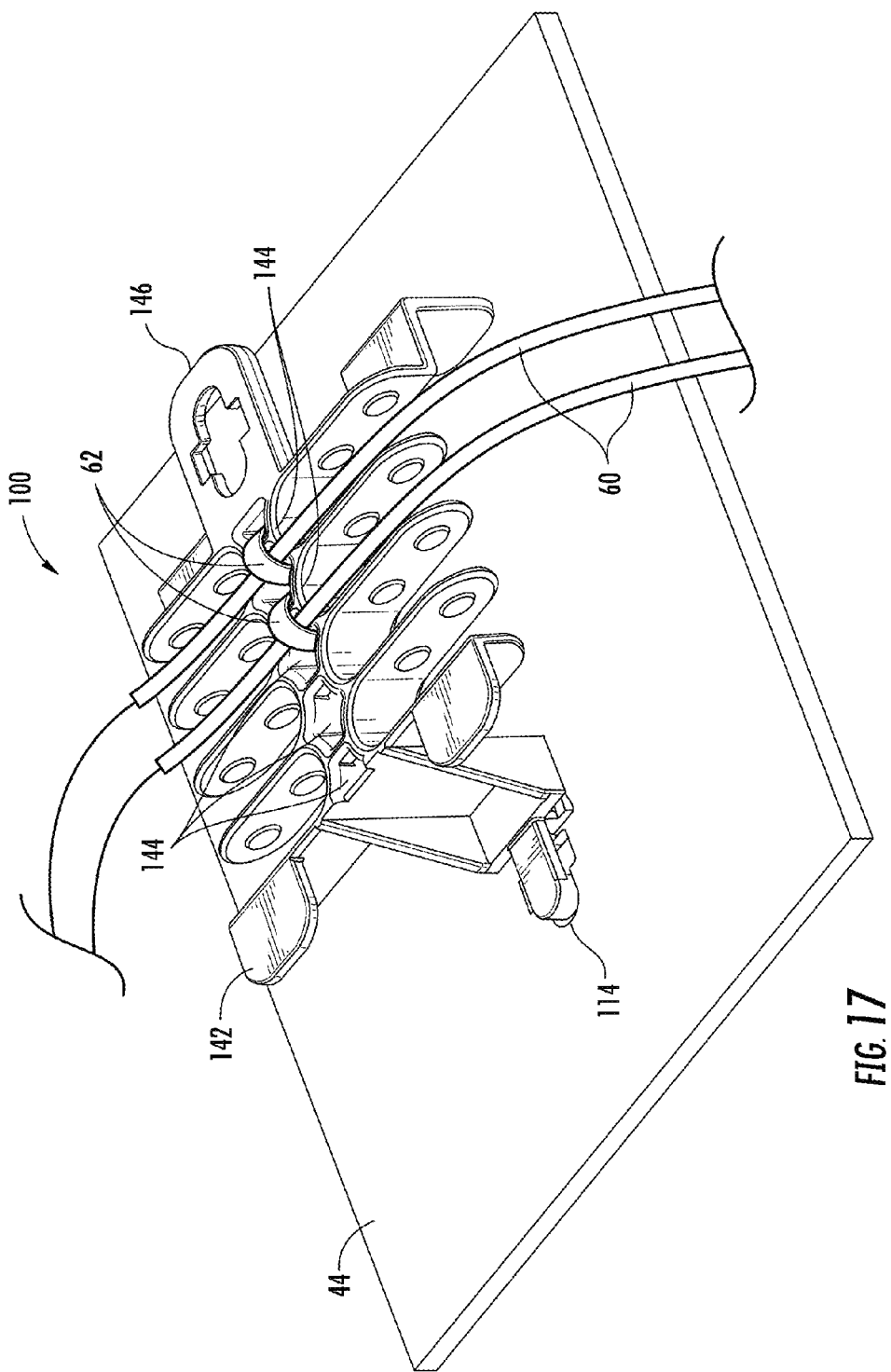

FIG. 16 illustrates a side elevation of the second fiber body holder 100' removably attached to the first fiber body holder 100 in a stacked orientation. The first fiber body holder 100 has a stacking feature 146. The stacking feature 146 has a receiver 148 similar to the receiver 148 in the mounting surface 44 as described above. In this manner, the receiver 148 of the stacking feature 146 is configured to receive the attachment feature 114' of the second fiber body holder 100'. Therefore, the second fiber body holder 100' may be removably attached to the first fiber body holder 100 in the same manner as the first fiber body holder 100 is removably attached to the mounting surface 44. Stand-offs 140' of the second fiber body holder 100' position on and are supported by the supports 142 of the first fiber body holder 100. The stand-off 140' provides raised support for the second fiber body holder 100' allowing clearance of the retainer assembly 112' the second fiber body holder 100' from the retainer assembly 112 of the first fiber body holder 100. To remove the fiber body holder 100' from the first fiber body holder 100, the protrusion 132' is forced out from against the segment of the lip 150, of the receiver 148 of the stacking feature 146. The flange 130' is then moved toward the slot 152. The attachment feature 114' may then be removed from the receiver 148 of the stacking feature 146 allowing the second fiber body holder 100', and, thereby, the second retainer assembly 112' to be separated from the first fiber body holder 100. Additionally, the second fiber body holder 100' has a stacking feature 146' which not only allows another fiber body holder to be removably attached to the second fiber body holder 100' in a further stacked orientation, but, also, allows the first fiber body holder 100 and the second fiber body holder 100' interchangeable.

Figure 17:
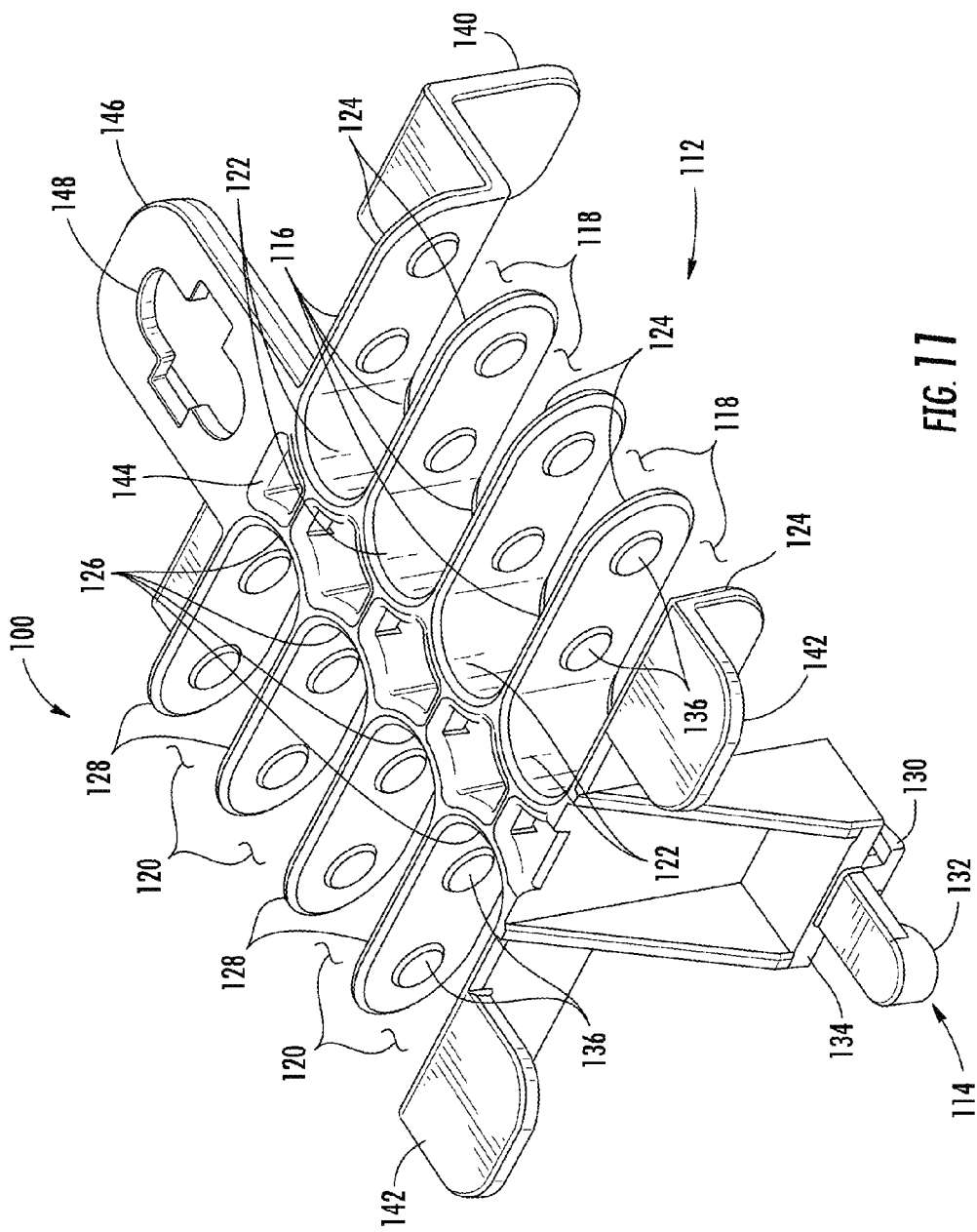
FIG. 17 is a top perspective view of the retainer assembly and the attachment feature of FIG. 11 with optical fibers strain relieved by a retainer.

FIG. 17 illustrates the fiber body holder 100 used to strain relief optical fibers 60. The apertures 144 may be used as fastening members. In this way, the optical fibers 60 are attached to the apertures 144 using tie wraps 62. Alternatively or additionally, Velcro may be used to attach the optical fibers to the apertures 144.

Additionally, as described with respect to the fiber body holder 10, above, with reference to FIGS. 9 and 10, the fiber body holder 100 may be removably attached to a mounting surface 44 which is a shelf 64 of fiber optic equipment, which may be a type of stackable shelf. The shelf 64 may have other fiber optic components 66. The other fiber optic components 66 may be any type of component, as examples, without limitation, adapters, splitters, fan-out devices, slack storage devices, strain relief devices, routing guides, and the like. Further. optical fibers 60 route to the fiber optic holder 50 the other fiber optic components 66. At one end, the optical fibers 60 routed to the fiber optic holder 50 may be a fiber optic cable, for example, a 900 µm fiber sleeve with multiple 250 µm optical fibers therein.

FIGS. 18-22 illustrate an exemplary embodiment of a fiber body holder having a retainer assembly, a bracket and an attachment feature. The bracket has a first side and a second side connected to form an L shape. The bracket is removably attachable to a mounting surface in a first orientation by the first side, and removably attachable to the mounting surface in the second orientation by the second side. In this way, the retainer assembly may be removably attachable to the mounting surface by the attachment feature at the first side. Alternatively, the retainer assembly may be removably attachable to the mounting surface by an attachment feature at the second side.

Figure 18:
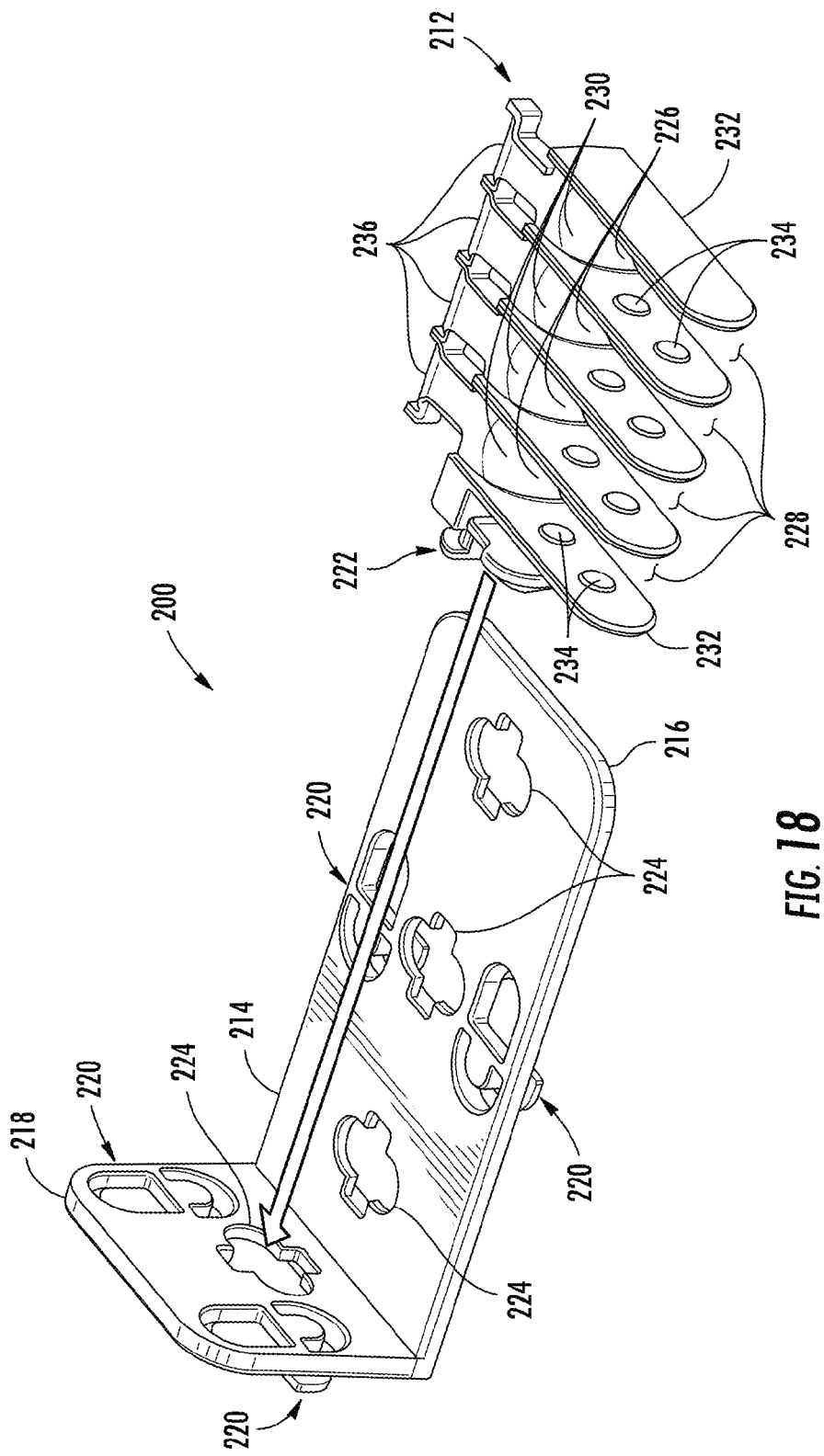
FIG. 18 is a top, perspective exploded view of an exemplary embodiment of a retainer assembly and a bracket in a first orientation.

FIG. 18 is a top, perspective exploded view of a fiber body holder 200 having a retainer assembly 212 and a bracket 214 separate from the retainer assembly 212 in a first orientation. The bracket has a first side 216 and a second side 218 with bracket attachment features 220 on both the first side 216 and the second side 218. In this way, the bracket 214 can be removably attached to a mounting surface (not shown) in the first orientation or a second orientation. In the first orientation as shown in FIG. 18, the first side 216 attaches to a mounting surface via the bracket attachment feature 220 on the first side 216. In the first orientation, the retainer assembly 212 attaches to the second side 218 of the bracket 214 via assembly attachment feature 222. In FIG. 18, the assembly attachment feature 222 inserts into assembly receiver 224 in the second side 218 of the bracket 214. The assembly attachment feature 222 and the assembly receiver 224 are similar to the attachment feature 114 and the receiver 148 described above in the discussion of fiber body holder 100, and, therefore, will not be described again in the discussion of fiber body holder 200. The retainer assembly 212 has a plurality of retainers 226. Each retainer 226 has a channel 228. The channel 228 is defined by an end wall 230 and side walls 232. At least one retaining dimple 234 protrudes from the side walls 232. Supports 236 extend from the end walls 230. The first orientation may be used with a 1U, 2U, 3U or 4U shelf.

Figure 19:
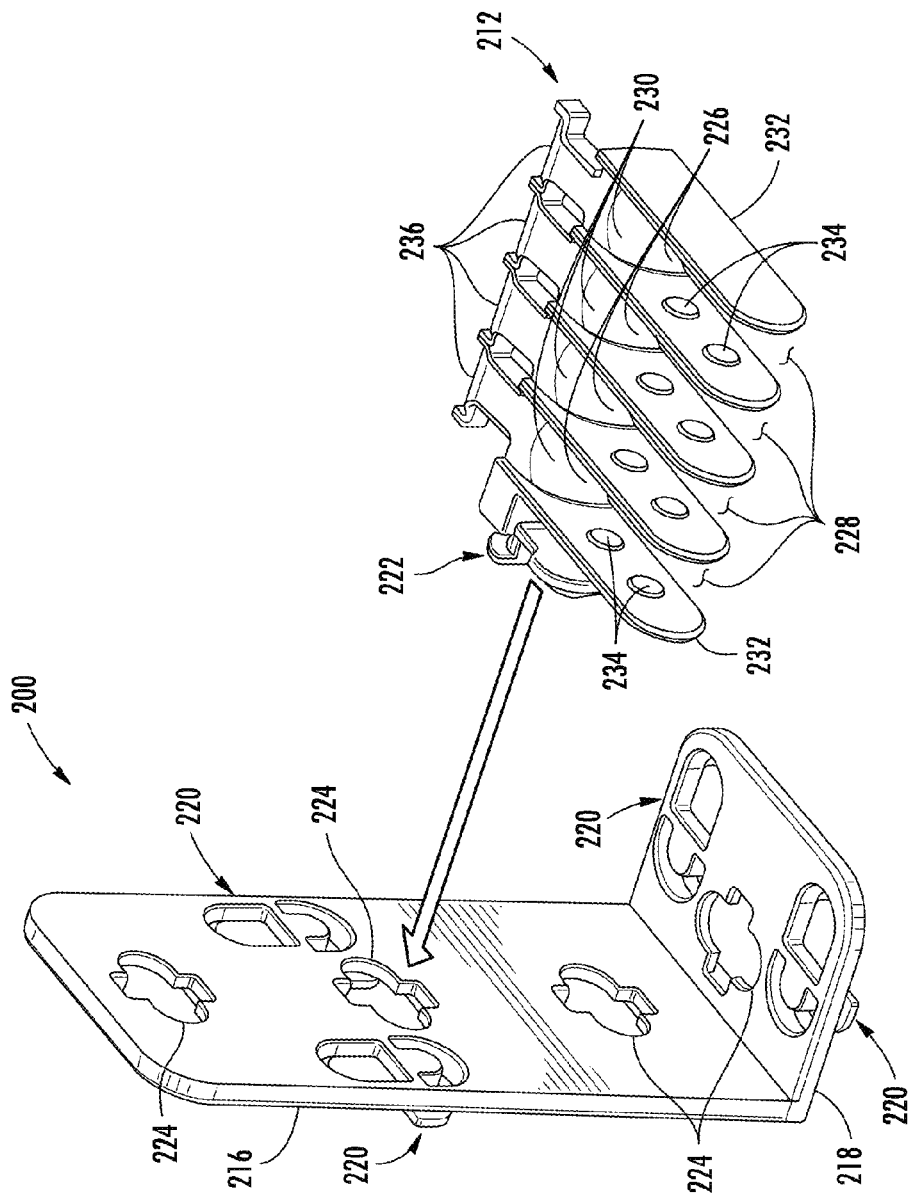
FIG. 19 is a top, perspective exploded view of the retainer assembly and the bracket of FIG. 18 in a second orientation.

FIG. 19 is a top, perspective exploded view of a fiber body holder 200 having a retainer assembly 212 and a bracket 214 separate from the retainer assembly 212 in the second orientation. In the second orientation as shown in FIG. 19, the second side 218 attaches to a mounting surface via the bracket attachment feature 220 on the second side 218. In the second orientation, the retainer assembly 212 attaches to the first side 216 of the bracket 214 via assembly attachment feature 222. The second orientation may be used with a 2U, 3U or 4U shelf.

Figure 20:
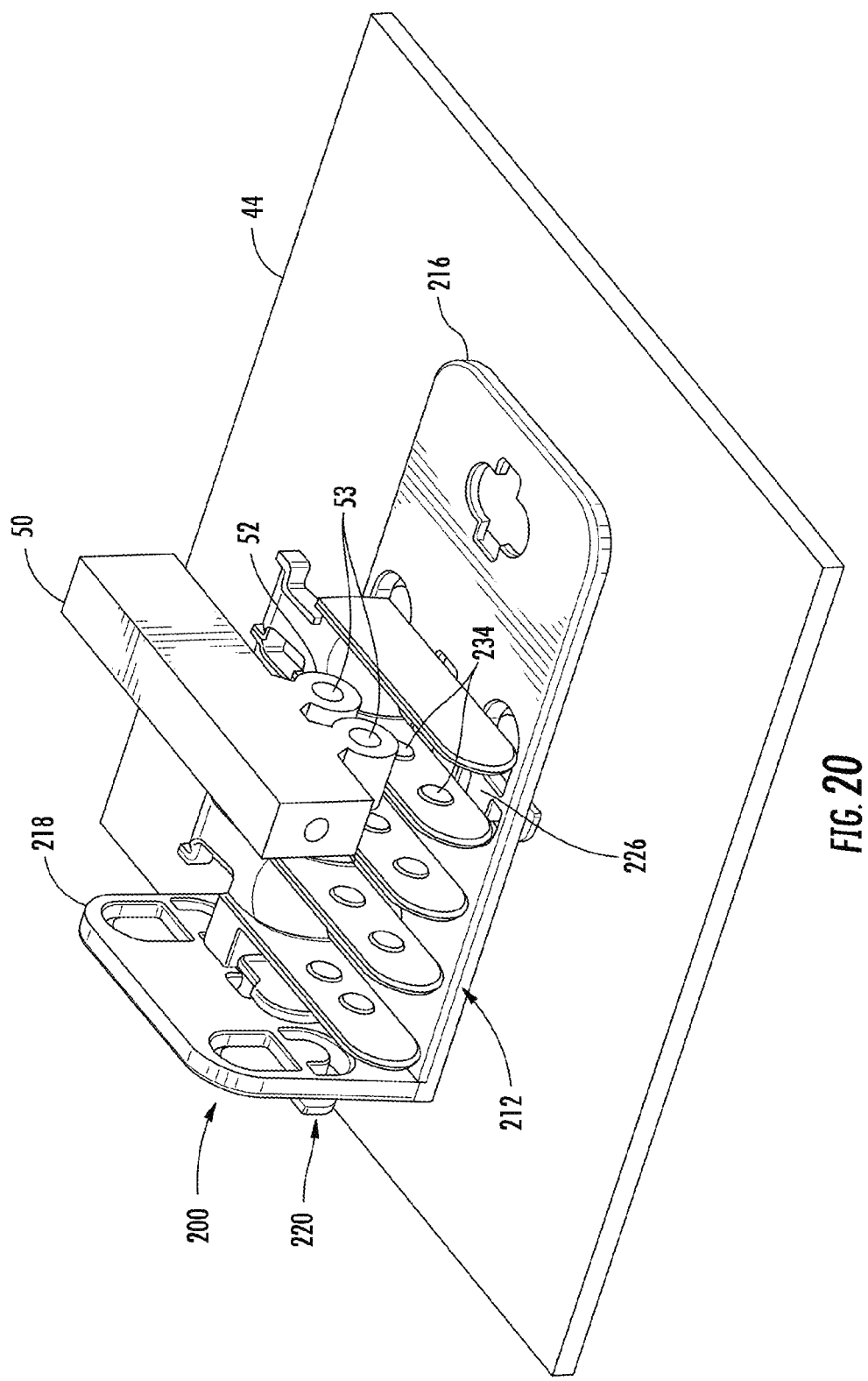
FIG. 20 is a top, perspective, partially exploded view of the retainer assembly and the bracket of FIG. 18 in the first orientation with a fiber body separated therefrom.

FIG. 20 illustrates a partially exploded view of the fiber body holder 200 removably attached to a mounting surface 44 in a first orientation with a fiber body 50 separate from the fiber body holder 200. As discussed above, in the first orientation, the first side 216 is removably attached to the mounting surface 44 and the retainer assembly 212 is removably attached to the second side 218. The fiber body 50 may be inserted in the retainer 226 by the mounting bosses 52. The mounting bosses 52 put pressure on the retaining dimples 234 which forces the side walls 232 to flex. This widens the channel 228 allowing the mounting bosses 52 to be inserted in the channel 228. When the passage 53 through the mounting bosses 52 reaches the retaining dimples 234, a pair of opposing retaining dimples 234 positions in respective opposite ends of the passage 53. The side walls 232 then flex back toward their initial positions. In this way, the retaining dimples 234 retain the mounting boss 52 in the channel 228, thereby, releasably retain the fiber body 50 in the retainer 226. The fiber body 50 may also be supported by the support 236. When the fiber body 50 is being removed from the retainer 226, the mounting bosses 52 put pressure the retaining dimples 234 forcing the retaining dimples 234 out of the respective opening in the passage 53, which forces the first side walls 232 to flex outwardly allowing the mounting bosses 52 to be removed from the channel 228. In this way, the retainer 226 may releasably retain the fiber body 50.

Figure 21:
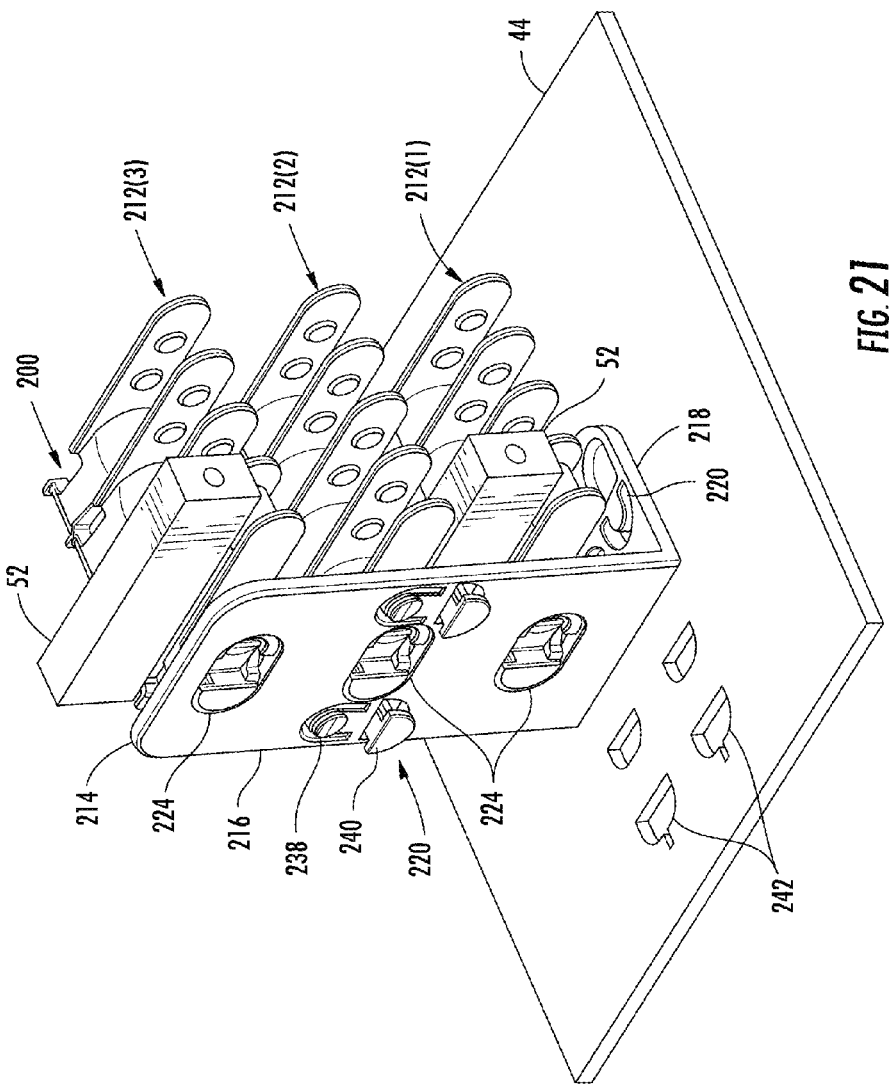
FIG. 21 is a top, perspective view of the retainer assembly and the bracket of FIG. 19 in the second orientation with fiber bodies retained by retainers.

FIG. 21 illustrates a reverse perspective view of the fiber body holder 200 removably attached to a mounting surface 44 in a second orientation with retainer assemblies 212(1), 212(2) and 212(3) removably attached to the first side 216. In FIG. 21, a fiber body 50 is shown releasably retained by a retainer 226 of retainer assembly 212(1) and another fiber body 50 releasably retained by a retainer 226 in retainer assembly 212(2). The retainer assemblies 212(1), 212(2) and 212(3) are removably attached to the first side 216 by respective assembly attachment features 222 received by respective assembly receivers 224. The bracket attachment feature 220 has a release tab 238 and a flange 240 which insert into a bracket receiver 242 to removably attach the bracket 214, and, thereby, the fiber body holder 200 to the mounting surface 44. The bracket receivers 242 removably attaching the bracket 214 illustrated in FIG. 21 are hidden by the second side 218. Two other bracket receivers 242 in the mounting surface 44 are shown, which allow the fiber body holder 200 to be relocated or reoriented on the mounting surface 44.

Figure 22:
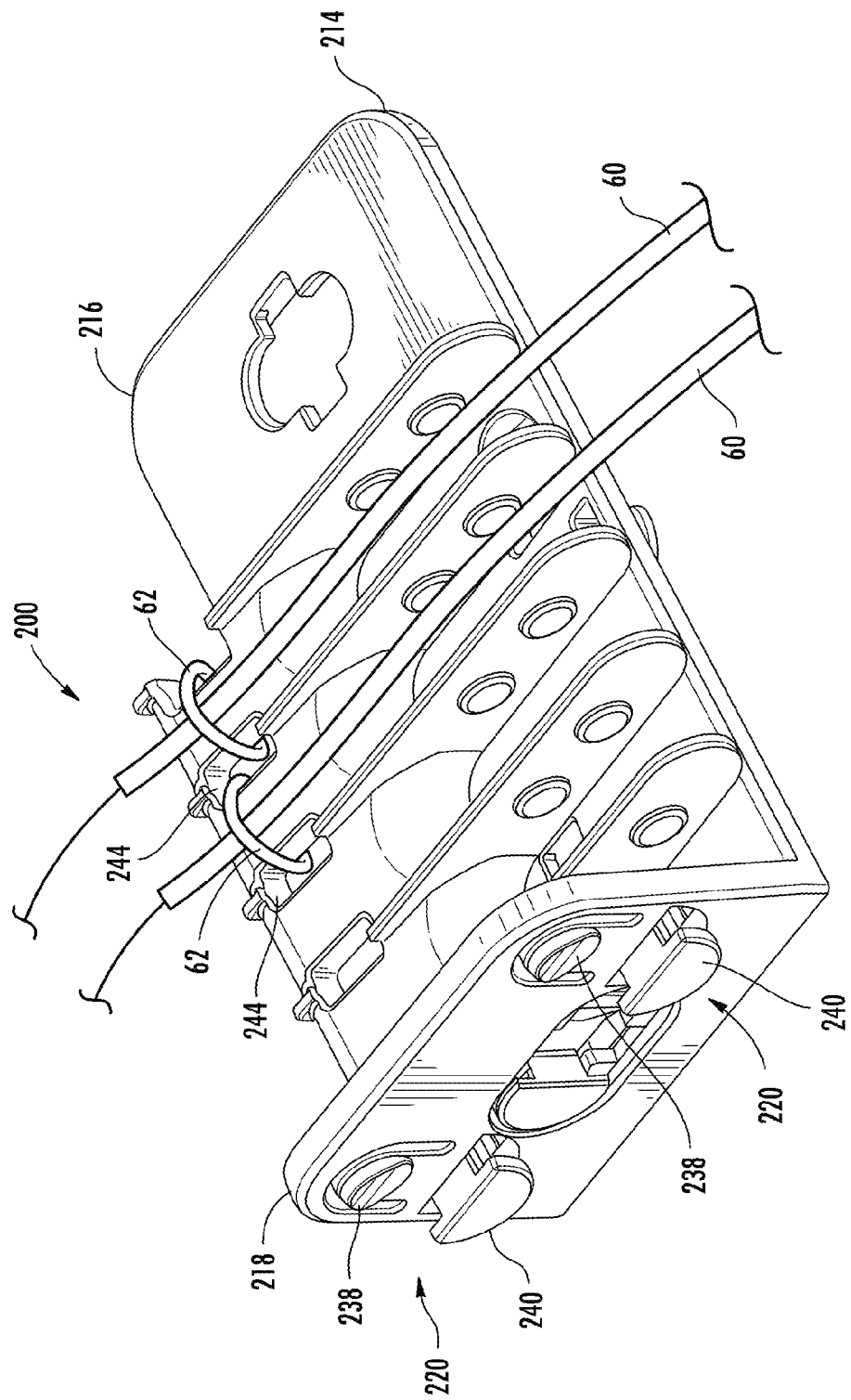
FIG. 22 is a top, perspective view of the retainer assembly and the bracket of FIG. 18 in the first orientation with optical fibers strain relieved by retainers.

FIG. 22 illustrates the fiber body holder 200 used to strain relief optical fibers 60. The apertures 244 may be used as fastening members. In this way, the optical fibers 60 are attached to the apertures 244 using tie wraps 62. Alternatively or additionally, Velcro may be used to attach the optical fibers to the apertures 244.

Additionally, as described with respect to the fiber body holder 10, above, with reference to FIGS. 9 and 10, the fiber body holder 200 may be removably attached to a mounting surface 44 which is a shelf 64 of fiber optic equipment, which may be a type of stackable shelf. The shelf 64 may have other fiber optic components 66. The other fiber optic components 66 may be any type of component, as examples, without limitation, adapters, splitters, fan-out devices, slack storage devices, strain relief devices, routing guides, and the like. Further. optical fibers 60 route to the fiber optic holder 50 the other fiber optic components 66. At one end, the optical fibers 60 routed to the fiber optic holder 50 may be a fiber optic cable, for example, a 900 µm fiber sleeve with multiple 250 µm optical fibers therein.

Figure 23A:
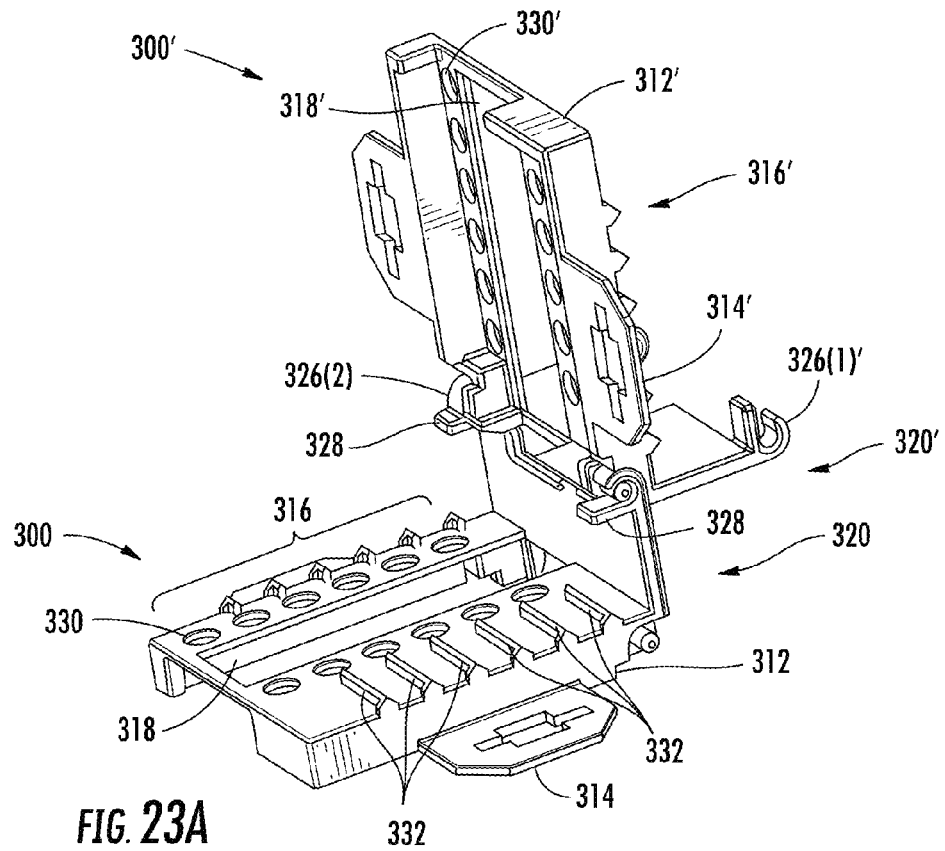
FIG. 23A is a top, perspective view of an exemplary embodiment of a retainer assembly and attachment feature, and a second retainer assembly and attachment feature stacked on top of the retainer assembly and the attachment by a hinge with the second retainer assembly and attachment feature pivoted to an open position.
Figure 23B:
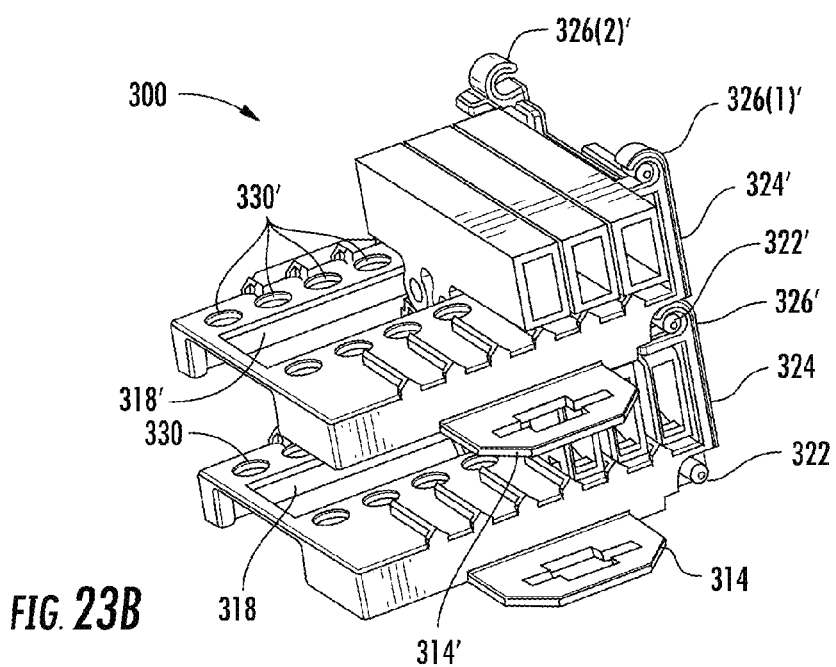
FIG. 23B is a top, perspective view of an exemplary embodiment of a retainer assembly and attachment feature and a second retainer assembly and attachment feature of FIG. 23A with the second retainer assembly and attachment feature pivoted to a closed position.

FIGS. 23A and 23B illustrate an exemplary embodiment of two fiber body holders hingedly attached to each other in a stacked orientation. Each of the fiber body holders has a retainer assembly with at least one retainer and a channel. The channel is configured to releasably retain a fiber body disposed therein via mounting bosses on the fiber body. An attachment feature connected to a bracket provides for the ability of a technician to attach the fiber body holder to and remove the fiber body holder from the mounting surface. A stacking feature may be configured to removably attach the two fiber body holders in the stacked orientation.

FIG. 23A illustrates a first fiber body holder 300 removably attached to a second fiber optic body 300'. In FIG. 23A the second fiber body holder 300' is attached to the first fiber body holder 300 in a stacked orientation in an open position. Each of the first fiber body holder 300 and second fiber body holder 300' has a retainer assembly 312, 312', an attachment feature 314, 314', retainer assembly 316, 316' and a channel 318, 318'. Additionally, each of the first fiber body holder 300 and second fiber body holder 300' has a stacking feature 320, 320'. Each of the stacking feature 320, 320' has two pins 322, 322', stand-off 324, 324' and forward and rearward facing collars 326(1), 326(2), 326(1)', 326(2)'. Additionally, a stop 328, 328' extends from each collar 326, 326'.

Although the first fiber body holder 300 will be described, it should be understood that such description applies to the second fiber body holder 300' unless otherwise indicated. A plurality of the retainers 316 aligns transversely across the retainer assembly 312. Each of the retainers 316 has a protrusion 332 extending from the retainer assembly 312. A plurality of apertures 330 extend through the retainer assembly 312. The channel 318 extends longitudinally in the retainer assembly 312. The mounting bosses 52 of a fiber body 52 inserts into and friction fits within the channel 318 (see FIG. 23B). In this way, the retainer 316 of the retainer assembly 312 releasably retains the fiber body 52. The two pins 322 extend transversely from respective sides of one end of the stand-off 324. The forward facing collar 326(1) and rearward facing collar 326(2) extend from the other end of the stand-off 324 in an arrangement aligned one each with one of the two pins 322.

In this manner, and as shown in FIG. 23A, one of the pins 322 of the first fiber body holder 300 may insert into the forward facing collar 326(1)' of the second fiber body holder 300'. Similarly, the other one of the pins 322 of the first fiber body holder 300 may insert into the rearward facing collar 326(2)' of the second fiber body holder 300'. The pins 322 and the forward facing collar 326(1)' and the rearward facing collar 326(2)' form a hinge the first fiber body holder 300 and the second fiber body holder 300', allowing between the first fiber body holder 300 and the second fiber body holder 300' to pivot about and with respect to each other. The second fiber body holder 300' may be pivoted open, as in FIG. 23A, or closed. In the open position, fiber bodies 52 may be inserted in, removed from, or relocated in the retainers 316 of the retainer assembly 312 in the fiber body holder 300'. Once the fiber bodies 52 are releasably retained by retainers 316 in the retainer assembly 312, the second fiber body holder 300' may be pivoted to the closed position.

FIG. 23B illustrates the first fiber body holder 300 with the second fiber body holder 300' pivoted in the closed position. In FIG. 23B, fiber bodies 50 are shown being releasably retained by retainers 316 of first fiber body holder 300 and the second fiber body holder 300'. Stops 328 limit the travel of the second fiber body holder 300' to provide clearance sufficient clearance for the fiber bodies 50 in the first fiber body holder 300. Depending on the size of the fiber body 50, the fiber body 50 may position between the protrusions 332, as is shown with respect to the first fiber body holder 300 or may position on the protrusion 332' as shown with respect to the second fiber body holder 300'. Similar to the manner in which fiber body holders 10, 100 and 200 may be used to strain relief optical fibers 60, as described above, the fiber body holders 300 and 300' may strain relief optical fibers 60. The apertures 330, 330' may be used as fastening members. In this way, the optical fibers 60 (not shown in FIGS. 23A and 23B) may be attached to the apertures 330, 330' using tie wraps 62. Alternatively or additionally, Velcro may be used to attach the optical fibers to the apertures 330, 330'.

Additionally, as described with respect to the fiber body holder 10, above, with reference to FIGS. 9 and 10, the fiber body holder 300 may be removably attached to a mounting surface 44 which is a shelf 64 of fiber optic equipment, which may be a type of stackable shelf. The shelf 64 may have other fiber optic components 66. The other fiber optic components 66 may be any type of component, as examples, without limitation, adapters, splitters, fan-out devices, slack storage devices, strain relief devices, routing guides, and the like. Further. optical fibers 60 route to the fiber optic holder 50 the other fiber optic components 66. At one end, the optical fibers 60 routed to the fiber optic holder 50 may be a fiber optic cable, for example, a 900 µm fiber sleeve with multiple 250 µm optical fibers therein.

Figure 24A:
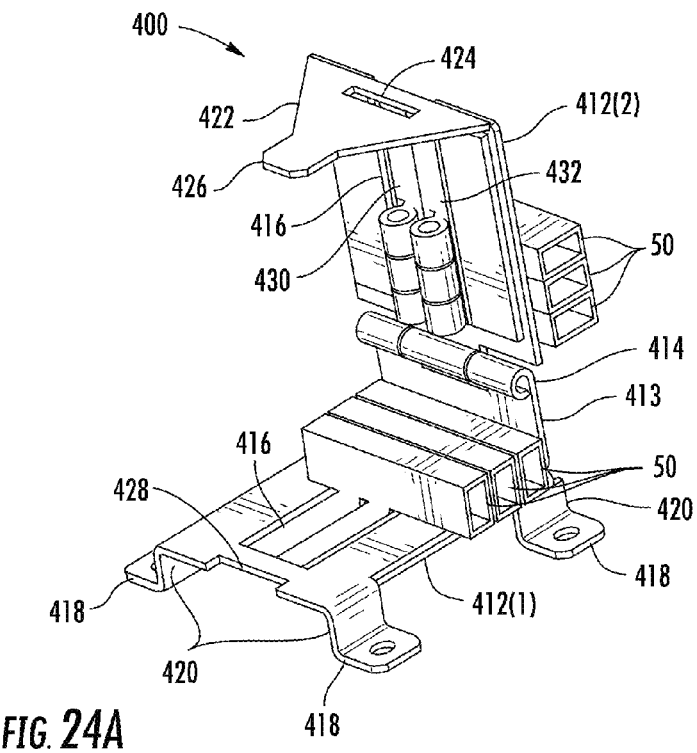
FIG. 24A is a top, perspective view of an exemplary embodiment of a retainer assembly and attachment feature, and a second retainer assembly and attachment feature stacked on top of the retainer assembly and the attachment by a hinge with the second retainer assembly and attachment feature pivoted to an open position.
Figure 24B:
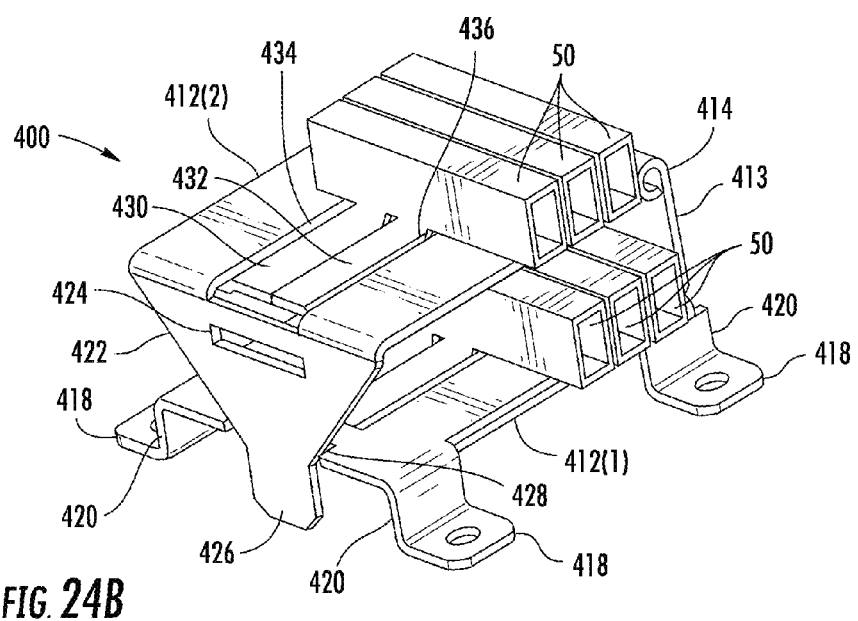
FIG. 24B is a top, perspective view of an exemplary embodiment of a retainer assembly and attachment feature and a second retainer assembly and attachment feature of FIG. 24A with the second retainer assembly and attachment feature pivoted to a closed position.

FIGS. 24A and 24B illustrate an exemplary embodiment of a fiber body holder having two retainer assemblies hingedly attached to each other in a stacked orientation. Each retainer assembly has at least one retainer and a channel. At least one rubber insert extends from a side of the channel. The channel is configured to releasably retain a fiber body disposed therein via mounting bosses on the fiber body by friction fitting the mounting bosses against the at least one rubber insert. An attachment feature connected to a bracket provides for the ability of a technician to attach the fiber body holder to and remove the fiber body holder from the mounting surface.

FIG. 24A illustrates a fiber body holder 400 with a first retainer assembly 412(1) hingedly attached to a second retainer assembly 412(2) by hinge 412 attached to a back 413 allowing the first retainer assembly 412(1) and the second retainer assembly 412(2) to pivot about and with respect to each other. In FIG. 24A, the first retainer assembly 412(1) and the second retainer assembly 412(2) are shown pivoted in the open position. At least one of the first retainer assembly 412(1) and the second retainer assembly 412(2) has a channel 416. In the embodiment shown in FIG. 24A, each of the first retainer assembly 412(1) and the second retainer assembly 412(2) has a channel 416. An attachment feature 418 connected to a bracket 420 allows the fiber body holder 400 to attach to a mounting surface (not shown). A stand-off 422 with aperture 424 extending therethrough and a stand-off tab 426 extends from an end of the second retainer assembly 412(2) opposite the hinge 412. A notch 428 is cut into an end of the first retainer assembly 412(1) opposite the hinge 412.

A first rubber insert 430 and a second rubber insert 432 extend from opposing sides 434 and 436 of the channel 416. The mounting bosses 52 of fiber body 50 insert between the first rubber insert 430 and a second rubber insert 432. The resilience of first rubber insert 430 and a second rubber insert 432 friction fit the mounting bosses 52 in the channel 416, thereby, releasably retaining the fiber body 50 in the retainer assemblies 412(1) and 412(2).

FIG. 24B illustrates the fiber body holder 400 with the first retainer assembly 412(1) the second retainer assembly 412(2) pivoted to a closed position. As shown in FIG. 24B, in the closed position stand-off tab 426 inserts into notch 428. The stand-off 422 and stand-off tab 426 are sized to coordinate with the bracket 420 and the back 413 size. The combined sizes of the stand-off 422 and stand-off tab 426 are, generally, equivalent to the combined size of the bracket 420 and the back 413. In this way. The appropriate amount of clearance can be provided between the first retainer assembly 412(1) and the second retainer assembly 412(2) when in the closed position. Further the fiber body holders 400 may strain relief optical fibers 60. The aperture 424 may be used as a fastening member. In this way, the optical fibers 60 (not shown in FIGS. 24A and 24B) may be attached to the aperture 424 using tie wraps 62. Alternatively or additionally, Velcro may be used to attach the optical fibers to the apertures 424.

Additionally, as described with respect to the fiber body holder 10, above, with reference to FIGS. 9 and 10, the fiber body holder 400 may be removably attached to a mounting surface 44 which is a shelf 64 of fiber optic equipment, which may be a type of stackable shelf. The shelf 64 may have other fiber optic components 66. The other fiber optic components 66 may be any type of component, as examples, without limitation, adapters, splitters, fan-out devices, slack storage devices, strain relief devices, routing guides, and the like. Further, optical fibers 60 route to the fiber optic holder 50 the other fiber optic components 66. At one end, the optical fibers 60 routed to the fiber optic holder 50 may be a fiber optic cable, for example, a 900 μm fiber sleeve with multiple 250 μm optical fibers therein.

Many modifications and other embodiments will come to mind to one skilled in the art having the benefit of the teachings presented in the foregoing descriptions and the associated drawings. Therefore, it is to be understood that the description is not to be limited to the specific embodiments disclosed and that modifications and other embodiments are intended to be included within the scope of the appended claims. It is intended that the description cover the modifications and variations provided they come within the scope of the appended claims and their equivalents. Although specific terms are employed herein, they are used in a generic and descriptive sense only and not for purposes of limitation.

What is claimed is:

1. A fiber optic apparatus, comprising:
   a retainer assembly having at least one retainer configured to releasably retain a fiber body, the at least one retainer comprising:
      a first sidewall;
      a first extension member coupled to the first sidewall;
      a second sidewall;
      a second extension member coupled to the second sidewall;
      wherein the first sidewall and the first extension member are substantially symmetrically disposed about a central axis from the second sidewall and the second extension member, and further wherein the first and the second sidewalls form a portion of a channel therebetween, the channel being configured to receive at least one mounting boss attached to the fiber body, and an attachment feature configured to removably attach the retainer assembly.

2. The fiber optic apparatus of claim 1, wherein the at least one retainer is configured to releasably retain the optical fiber body via that at least one mounting bosses on the fiber body.

3. The fiber optic apparatus of claim 2, wherein each of the first and second sidewalls has a retaining dimple coupled to a portions of the respective sidewall that is facing the channel, wherein the each retaining dimple is configured to secure at least a portion of a mounting boss within the channel.

4. The fiber optic apparatus of claim 2, wherein the each of the first and second sidewalls is configured to receive the at least one mounting boss such that the at least one mounting bosses friction fit between the first and second sidewalls.

5. The fiber optic apparatus of claim 2, wherein at least one of the first and second sidewalls includes at least one rubber insert attached to its face, the at least one rubber insert extending between the first and second sidewalls, and wherein the at least one rubber insert is configured to receive the at least one mounting bosses and releasably retain the at least one mounting boss.

6. The fiber optic apparatus of claim 5, wherein the at least one rubber insert comprises a first rubber insert and a second rubber insert, and wherein the first rubber insert attaches to and extends from the first sidewall, and the second rubber insert attaches to and extends from the second sidewall, and wherein the first rubber insert and the second rubber insert are configured to releasably retain the at least one mounting boss between the first rubber insert and the second rubber insert.

7. The fiber optic apparatus of claim 1, further comprising a stacking feature configured to removably attach a second retainer assembly to the retainer assembly.

8. The fiber optic apparatus of claim 1, wherein the stacking feature is configured to removably attach the second retainer assembly to the retainer assembly via an attachment feature configured to removably attach the second retainer assembly.

9. The fiber optic apparatus of claim 8, wherein when the stacking feature and the attachment feature configured to removably attach the second retainer assembly form a hinge.

10. The fiber optic apparatus of claim 1, further comprising a stand-off configured to raise the at least one retainer above a mounting surface when the retainer assembly is removably attached to the mounting surface.

11. The fiber optic apparatus of claim 1, further comprising a support configured to support a stand-off of a second retainer assembly when the second retainer assembly is removably attached to the retainer assembly.

12. The fiber optic apparatus of claim 7, wherein the retainer assembly and the second retainer assembly are similarly constructed.

13. The fiber optic apparatus of claim 7, wherein the retainer assembly and the second retainer assembly are interchangeable.

14. The fiber optic apparatus of claim 1, further comprising a bracket, wherein the attachment feature is connected to the bracket.

15. The fiber optic apparatus of claim 14, wherein the bracket has a first side and a second side, wherein the first side and the second side are connected to form an L shape.

16. The fiber optic apparatus of claim 15, wherein the bracket is removably attachable to a mounting surface in a first orientation by the first side, and wherein the bracket is removably attachable to the mounting surface in the second orientation by the second side.

17. The fiber optic apparatus of claim 15, wherein the retainer assembly is removably attachable to the mounting surface by the attachment feature at the first side.

18. The fiber optic apparatus of claim 15, wherein the retainer assembly is removably attachable to the mounting surface by an attachment feature at the second side.

19. The fiber optic apparatus of claim 1, wherein the retainer assembly is configured to retain one or more optical fibers to strain relief the one or more optical fibers.

20. The fiber optic apparatus of claim 1, further comprising at least one fastening member adapted to receive at least one of a tie wrap and a Velcro strap.

21. The fiber optic apparatus of claim 20, wherein the at least one fastening member is an extension member.

22. The fiber optic apparatus of claim 20, wherein the at least one fastening member is an aperture.

23. The fiber optic apparatus of claim 1, wherein the at least one retainer is configured to toollessly, releasably retain a fiber body.

24. The fiber optic apparatus of claim 1, wherein the attachment feature is configured to toollessly, removably attach the retainer assembly.

25. A fiber optic assembly, comprising:
a first retainer assembly having at least one retainer comprising a first sidewall and a first extension member coupled to the first sidewall and configured to releasably retain a fiber body, and a second retainer assembly having at least one retainer comprising a second sidewall and a second extensions member coupled to the second sidewall and configured to releasably retain at least one of a fiber body and an optical fiber, wherein the first sidewall and the first extension member are substantially symmetrically disposed about a central axis from the second sidewall and the second extension member, and further wherein the first and the second sidewalls form a portion of a channel therebetween, the channel being configured to receive at least one mounting boss attached to the fiber body;
a first attachment feature for removably attaching the first retainer assembly, and a second attachment feature removably attaching the second retainer assembly;
a first stacking feature, wherein the first stacking feature is configured to removably attach the second retainer assembly to the first retainer assembly via the second attachment feature.

26. The fiber optic assembly of claim 25, wherein the first attachment feature removably attaches the first retainer assembly to a mounting surface.

27. The fiber optic assembly of claim 26, wherein the mounting surface is fiber optic equipment.

28. The fiber optic assembly of claim 27, wherein the fiber optic equipment is a shelf mounted to a chassis in a fiber optic equipment rack.

29. The fiber optic apparatus of claim 25, wherein the at least one retainer is configured to toollessly, releasably retain a fiber body.

30. The fiber optic apparatus of claim 25, wherein the attachment feature is configured to toollessly, removably attach the retainer assembly.

31. The fiber optic apparatus of claim 25, wherein the at least one retainer is configured to toollessly, releasably retain one or more optical fibers to strain relieve the one or more optical fibers.

* * * * *